(12) United States Patent
Micucci et al.

(10) Patent No.: US 10,715,525 B2
(45) Date of Patent: **\*Jul. 14, 2020**

(54) COMPUTER IMPLEMENTED METHODS AND APPARATUS FOR PROVIDING ACCESS TO AN ONLINE SOCIAL NETWORK

(71) Applicant: salesforce.com, inc., San Francisco, CA (US)

(72) Inventors: Michael Scott Micucci, Larkspur, CA (US); Aditya Sesha Kuruganti, Palo Alto, CA (US); Theodore James Summe, San Francisco, CA (US); Kedar Doshi, Palo Alto, CA (US); Leonard Gestrin, San Francisco, CA (US); Sanjaya Lai, San Francisco, CA (US); George Wen Su, San Francisco, CA (US)

(73) Assignee: salesforce.com, inc., San Francisco, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/930,311

(22) Filed: Nov. 2, 2015

(65) Prior Publication Data

US 2016/0057148 A1 Feb. 25, 2016

Related U.S. Application Data

(63) Continuation of application No. 13/540,367, filed on Jul. 2, 2012, now Pat. No. 9,178,753.
(Continued)

(51) Int. Cl.
*G06F 21/62* (2013.01)
*H04L 29/06* (2006.01)
(Continued)

(52) U.S. Cl.
CPC .............. *H04L 63/10* (2013.01); *H04L 41/06* (2013.01); *H04L 63/104* (2013.01); *H04L 67/1044* (2013.01); *H04W 4/21* (2018.02)

(58) Field of Classification Search
CPC ....... H04L 12/185; H04L 67/00; H04L 67/02; G06F 17/3089; G06F 21/62; G06F 21/604; G06F 21/6218
(Continued)

(56) References Cited

U.S. PATENT DOCUMENTS 5,577,188 A 11/1996 Zhu
5,608,872 A 3/1997 Schwartz
(Continued)

OTHER PUBLICATIONS

Saba, "Saba Announces Revolutionary Social Enterprise Platform," Press Release, Mar. 20, 2012, pp. 1-4, Redwood Shores, California.
(Continued)

*Primary Examiner* — Alexander Lagor
*Assistant Examiner* — Kalish K Bell
(74) *Attorney, Agent, or Firm* — Dergosits & Noah LLP; Todd A. Noah

(57) ABSTRACT

Disclosed are systems, apparatus, methods, and computer-readable storage media for providing access to an online social network. The online social network can be specific to an organization having one or more internal users. In some implementations, a request message is received from a requesting user to access social network data of the online social network. The requesting user is identified as an external user of the organization, and it is determined that the requesting user has an authorized status. Access to only a portion of the social network data is provided to the authorized requesting user.

26 Claims, 34 Drawing Sheets

Related U.S. Application Data

(60) Provisional application No. 61/529,420, filed on Aug. 31, 2011.

(51) Int. Cl.
 *H04L 12/24* (2006.01)
 *H04L 29/08* (2006.01)
 *H04W 4/21* (2018.01)

(58) Field of Classification Search
 USPC .................................. 709/219; 726/19, 27
 See application file for complete search history.

(56) References Cited

U.S. PATENT DOCUMENTS

| | | |
|---|---|---|
| 5,649,104 A | 7/1997 | Carleton |
| 5,715,450 A | 2/1998 | Ambrose et al. |
| 5,761,419 A | 6/1998 | Schwartz |
| 5,819,038 A | 10/1998 | Carleton |
| 5,821,937 A | 10/1998 | Tonelli et al. |
| 5,831,610 A | 11/1998 | Tonelli et al. |
| 5,873,096 A | 2/1999 | Lim et al. |
| 5,918,159 A | 6/1999 | Fomukong et al. |
| 5,963,953 A | 10/1999 | Cram et al. |
| 5,983,227 A | 11/1999 | Nazem et al. |
| 6,092,083 A | 7/2000 | Brodersen et al. |
| 6,161,149 A | 12/2000 | Achacoso et al. |
| 6,169,534 B1 | 1/2001 | Raffel et al. |
| 6,178,425 B1 | 1/2001 | Brodersen et al. |
| 6,189,011 B1 | 2/2001 | Lim et al. |
| 6,216,133 B1 | 4/2001 | Masthoff et al. |
| 6,216,135 B1 | 4/2001 | Brodersen et al. |
| 6,233,617 B1 | 5/2001 | Rothwein et al. |
| 6,236,978 B1 | 5/2001 | Tuzhilin et al. |
| 6,266,669 B1 | 7/2001 | Brodersen et al. |
| 6,288,717 B1 | 9/2001 | Dunkle et al. |
| 6,295,530 B1 | 9/2001 | Ritchie et al. |
| 6,324,568 B1 | 11/2001 | Diec et al. |
| 6,324,693 B1 | 11/2001 | Brodersen et al. |
| 6,336,137 B1 | 1/2002 | Lee et al. |
| D454,139 S | 3/2002 | Feldcamp et al. |
| 6,367,077 B1 | 4/2002 | Brodersen et al. |
| 6,393,605 B1 | 5/2002 | Loomans |
| 6,405,220 B1 | 6/2002 | Brodersen et al. |
| 6,411,949 B1 | 6/2002 | Schaffer et al. |
| 6,434,550 B1 | 8/2002 | Warner et al. |
| 6,446,089 B1 | 9/2002 | Brodersen et al. |
| 6,535,909 B1 | 3/2003 | Rust |
| 6,549,908 B1 | 4/2003 | Loomans |
| 6,553,563 B2 | 4/2003 | Ambrose et al. |
| 6,560,461 B1 | 5/2003 | Fomukong et al. |
| 6,574,635 B2 | 6/2003 | Stauber et al. |
| 6,577,726 B1 | 6/2003 | Huang et al. |
| 6,601,087 B1 | 7/2003 | Zhu |
| 6,604,117 B2 | 8/2003 | Lim et al. |
| 6,604,128 B2 | 8/2003 | Diec |
| 6,609,150 B2 | 8/2003 | Lee et al. |
| 6,621,834 B1 | 9/2003 | Scherpbier |
| 6,654,032 B1 | 11/2003 | Zhu |
| 6,665,648 B2 | 12/2003 | Brodersen et al. |
| 6,665,655 B1 | 12/2003 | Warner et al. |
| 6,684,438 B2 | 2/2004 | Brodersen et al. |
| 6,711,565 B1 | 3/2004 | Subramaniam et al. |
| 6,724,399 B1 | 4/2004 | Katchour et al. |
| 6,728,702 B1 | 4/2004 | Subramaniam et al. |
| 6,728,960 B1 | 4/2004 | Loomans et al. |
| 6,732,095 B1 | 5/2004 | Warshavsky et al. |
| 6,732,100 B1 | 5/2004 | Brodersen et al. |
| 6,732,111 B2 | 5/2004 | Brodersen et al. |
| 6,754,681 B2 | 6/2004 | Brodersen et al. |
| 6,763,351 B1 | 7/2004 | Subramaniam et al. |
| 6,763,501 B1 | 7/2004 | Zhu |
| 6,768,904 B2 | 7/2004 | Kim |
| 6,772,229 B1 | 8/2004 | Achacoso et al. |
| 6,782,383 B2 | 8/2004 | Subramaniam et al. |
| 6,804,330 B1 | 10/2004 | Jones et al. |
| 6,826,565 B2 | 11/2004 | Ritchie et al. |
| 6,826,582 B1 | 11/2004 | Chatterjee et al. |
| 6,826,745 B2 | 11/2004 | Coker |
| 6,829,655 B1 | 12/2004 | Huang et al. |
| 6,842,748 B1 | 1/2005 | Warner et al. |
| 6,850,895 B2 | 2/2005 | Brodersen et al. |
| 6,850,949 B2 | 2/2005 | Warner et al. |
| 6,907,566 B1 | 6/2005 | McElfresh et al. |
| 7,062,502 B1 | 6/2006 | Kesler |
| 7,100,111 B2 | 8/2006 | McElfresh et al. |
| 7,269,590 B2 | 9/2007 | Hull et al. |
| 7,340,411 B2 | 3/2008 | Cook |
| 7,356,482 B2 | 4/2008 | Frankland et al. |
| 7,373,599 B2 | 5/2008 | McElfresh et al. |
| 7,401,094 B1 | 7/2008 | Kesler |
| 7,406,501 B2 | 7/2008 | Szeto et al. |
| 7,412,455 B2 | 8/2008 | Dillon |
| 7,454,509 B2 | 11/2008 | Boulter et al. |
| 7,529,741 B2 | 5/2009 | Aravamudan et al. |
| 7,599,935 B2 | 10/2009 | La Rotonda et al. |
| 7,603,331 B2 | 10/2009 | Tuzhilin et al. |
| 7,620,655 B2 | 11/2009 | Larsson |
| 7,644,122 B2 | 1/2010 | Weyer et al. |
| 7,668,861 B2 | 2/2010 | Steven |
| 7,698,160 B2 | 4/2010 | Beaven et al. |
| 7,730,478 B2 | 6/2010 | Weissman |
| 7,747,648 B1 | 6/2010 | Kraft et al. |
| 7,779,039 B2 | 8/2010 | Weissman et al. |
| 7,779,475 B2 | 8/2010 | Jakobson et al. |
| 7,827,208 B2 | 11/2010 | Bosworth et al. |
| 7,851,004 B2 | 12/2010 | Hirao et al. |
| 7,853,881 B1 | 12/2010 | Aly Assal et al. |
| 7,945,653 B2 | 5/2011 | Zuckerberg et al. |
| 7,958,193 B2 | 6/2011 | Augustine et al. |
| 8,005,896 B2 | 8/2011 | Cheah et al. |
| 8,010,663 B2 | 8/2011 | Firminger et al. |
| 8,014,943 B2 | 9/2011 | Jakobson |
| 8,015,495 B2 | 9/2011 | Achacoso et al. |
| 8,032,297 B2 | 10/2011 | Jakobson |
| 8,073,850 B1 | 12/2011 | Hubbard et al. |
| 8,082,301 B2 | 12/2011 | Ahlgren et al. |
| 8,095,413 B1 | 1/2012 | Beaven et al. |
| 8,095,531 B2 | 1/2012 | Weissman et al. |
| 8,095,594 B2 | 1/2012 | Beaven et al. |
| 8,103,611 B2 | 1/2012 | Tuzhilin et al. |
| 8,150,913 B2 | 4/2012 | Cheah et al. |
| 8,185,584 B2 | 5/2012 | Fischer et al. |
| 8,209,308 B2 | 6/2012 | Jakobson et al. |
| 8,209,333 B2 | 6/2012 | Hubbard et al. |
| 8,275,836 B2 | 9/2012 | Beaven et al. |
| 8,335,798 B2 | 12/2012 | Achlioptas |
| 8,407,577 B1 | 3/2013 | Franklin et al. |
| 8,484,111 B2 | 7/2013 | Frankland et al. |
| 8,490,025 B2 | 7/2013 | Jakobson et al. |
| 8,504,681 B1 | 8/2013 | Cooper |
| 8,504,945 B2 | 8/2013 | Jakobson et al. |
| 8,510,664 B2 | 8/2013 | Rueben et al. |
| 8,566,301 B2 | 10/2013 | Rueben et al. |
| 8,646,103 B2 | 2/2014 | Jakobson et al. |
| 8,782,121 B1 | 7/2014 | Chang |
| 8,793,312 B2 | 7/2014 | Tao et al. |
| 8,817,986 B2 | 8/2014 | Chatt et al. |
| 8,972,717 B2 | 3/2015 | Cook et al. |
| 9,037,658 B2 | 5/2015 | Carduner et al. |
| 9,122,851 B2 | 9/2015 | Cook |
| 9,178,753 B2* | 11/2015 | Micucci ............ H04L 67/1044 |
| 9,419,950 B2 | 8/2016 | Cook |
| 2001/0044791 A1 | 11/2001 | Richter et al. |
| 2002/0072951 A1 | 6/2002 | Lee et al. |
| 2002/0082892 A1* | 6/2002 | Raffel ............... G06Q 10/063 |
| | | 705/7.26 |
| 2002/0129352 A1 | 9/2002 | Brodersen et al. |
| 2002/0140731 A1 | 10/2002 | Subramanian et al. |
| 2002/0143997 A1 | 10/2002 | Huang et al. |
| 2002/0162090 A1 | 10/2002 | Parnell et al. |
| 2002/0165742 A1 | 11/2002 | Robbins |
| 2002/0178161 A1 | 11/2002 | Brezin et al. |
| 2003/0004971 A1 | 1/2003 | Gong |

(56) References Cited

U.S. PATENT DOCUMENTS

| | | |
|---|---|---|
| 2003/0018705 A1 | 1/2003 | Chen et al. |
| 2003/0018830 A1 | 1/2003 | Chen et al. |
| 2003/0050979 A1 | 3/2003 | Takahashi |
| 2003/0066031 A1 | 4/2003 | Laane et al. |
| 2003/0066032 A1 | 4/2003 | Ramachandran et al. |
| 2003/0069936 A1 | 4/2003 | Warner et al. |
| 2003/0070000 A1 | 4/2003 | Coker et al. |
| 2003/0070004 A1 | 4/2003 | Mukundan et al. |
| 2003/0070005 A1 | 4/2003 | Mukundan et al. |
| 2003/0074418 A1 | 4/2003 | Coker et al. |
| 2003/0120675 A1 | 6/2003 | Stauber et al. |
| 2003/0151633 A1 | 8/2003 | George et al. |
| 2003/0159136 A1 | 8/2003 | Huang et al. |
| 2003/0187921 A1 | 10/2003 | Diec et al. |
| 2003/0189600 A1 | 10/2003 | Gune et al. |
| 2003/0204427 A1 | 10/2003 | Gune et al. |
| 2003/0206192 A1 | 11/2003 | Chen et al. |
| 2003/0216986 A1 | 11/2003 | Hassan |
| 2004/0001092 A1 | 1/2004 | Rothwein et al. |
| 2004/0010489 A1 | 1/2004 | Rio |
| 2004/0015981 A1 | 1/2004 | Coker et al. |
| 2004/0027388 A1 | 2/2004 | Berg et al. |
| 2004/0128001 A1 | 7/2004 | Levin et al. |
| 2004/0186860 A1 | 9/2004 | Lee et al. |
| 2004/0193510 A1 | 9/2004 | Catahan et al. |
| 2004/0199489 A1 | 10/2004 | Barnes-Leon et al. |
| 2004/0199536 A1 | 10/2004 | Barnes-Leon et al. |
| 2004/0199543 A1 | 10/2004 | Braud |
| 2004/0249854 A1 | 12/2004 | Barnes-Leon et al. |
| 2004/0260534 A1 | 12/2004 | Pak et al. |
| 2004/0260659 A1 | 12/2004 | Chan et al. |
| 2004/0268299 A1 | 12/2004 | Lei et al. |
| 2005/0021750 A1 | 1/2005 | Abrams |
| 2005/0050555 A1 | 3/2005 | Exley et al. |
| 2005/0091098 A1 | 4/2005 | Brodersen et al. |
| 2005/0210102 A1 | 9/2005 | Johnson et al. |
| 2005/0257045 A1 | 11/2005 | Bushman et al. |
| 2007/0265857 A1 | 11/2007 | Shivaji Rao |
| 2008/0040673 A1 | 2/2008 | Zuckerberg et al. |
| 2008/0249972 A1 | 10/2008 | Dillon |
| 2009/0063415 A1 | 3/2009 | Chatfield et al. |
| 2009/0077636 A1* | 3/2009 | Duffie, III ............. G06F 21/335 726/5 |
| 2009/0080635 A1 | 3/2009 | Altberg et al. |
| 2009/0100342 A1 | 4/2009 | Jakobson |
| 2009/0172127 A1 | 7/2009 | Srikanth et al. |
| 2009/0307345 A1 | 12/2009 | Carter et al. |
| 2010/0042511 A1 | 2/2010 | Sundaresan et al. |
| 2010/0132049 A1 | 5/2010 | Vernal et al. |
| 2010/0169789 A1 | 7/2010 | Cheng et al. |
| 2010/0182395 A1* | 7/2010 | Delhoyo ............. H04L 12/1818 348/14.08 |
| 2011/0012222 A1 | 1/2011 | Ainsworth et al. |
| 2011/0047012 A1 | 2/2011 | Sherman |
| 2011/0113096 A1 | 5/2011 | Long et al. |
| 2011/0154445 A1 | 6/2011 | Schmidt-Karaca et al. |
| 2011/0208868 A1 | 8/2011 | Walsh et al. |
| 2011/0302099 A1 | 12/2011 | Jeffries |
| 2011/0307791 A1 | 12/2011 | Pierre et al. |
| 2012/0060120 A1 | 3/2012 | Aravamudan et al. |
| 2012/0075264 A1* | 3/2012 | Kies ....................... G06Q 30/02 345/204 |
| 2012/0192086 A1 | 7/2012 | Ghods et al. |
| 2012/0233137 A1 | 9/2012 | Jakobson et al. |
| 2012/0233209 A1* | 9/2012 | Cheng ............... G06F 17/30312 707/770 |
| 2012/0259675 A1 | 10/2012 | Roehrs et al. |
| 2012/0278428 A1 | 11/2012 | Harrison et al. |
| 2012/0290407 A1 | 11/2012 | Hubbard et al. |
| 2012/0296919 A1 | 11/2012 | Sinha et al. |
| 2013/0073989 A1 | 3/2013 | Harris et al. |
| 2013/0173798 A1 | 7/2013 | Micucci et al. |
| 2013/0218948 A1 | 8/2013 | Jakobson |
| 2013/0218949 A1 | 8/2013 | Jakobson |
| 2013/0218966 A1 | 8/2013 | Jakobson |
| 2013/0254217 A1 | 9/2013 | Xu |
| 2013/0290820 A1 | 10/2013 | Dhanani |
| 2013/0304822 A1 | 11/2013 | Tetreault |
| 2013/0325858 A1 | 12/2013 | Xu |
| 2014/0129942 A1 | 5/2014 | Rathod |
| 2014/0337361 A1 | 11/2014 | Gailis |
| 2014/0359537 A1 | 12/2014 | Jakobson |
| 2015/0006289 A1 | 1/2015 | Jakobson |
| 2015/0007050 A1 | 1/2015 | Jakobson |
| 2015/0095162 A1 | 4/2015 | Jakobson |
| 2015/0172563 A1 | 6/2015 | Jakobson et al. |

OTHER PUBLICATIONS

U.S. Appl. No. 13/986,251, filed Apr. 16, 2013.

Office Action for related U.S. Appl. No. 13/540,367; dated Mar. 20, 2015.

Office Action for related U.S. Appl. No. 13/540,367; dated Sep. 30, 2014.

Office Action for related U.S. Appl. No. 13/540,367; dated Apr. 11, 2014.

Office Action for related U.S. Appl. No. 13/540,367; dated Oct. 18, 2013.

Office Action for related U.S. Appl. No. 13/540,367; dated Sep. 5, 2013.

"Google Plus Users", Google+Ripples, Oct. 31, 2011 [retrieved on Feb. 21, 2012 from Internet at http://www.googleplusers.com/google-ripples.html], 3 pages.

* cited by examiner

Event History Table 910

| Event ID 911 | Object ID 912 | Created by ID 913 |
|---|---|---|
| E1 | O615 | U5 |
| E2 | O489 | U101 |

Comment Table 930

| Event ID 931 | Comment 932 | Time/Date 933 |
|---|---|---|
| E37 | " " | 10-21-2010 5:32 PM |
| E37 | " " | 9-17-2010 |

Field Change Table 920

| Event ID 921 | Old value 922 | New value 923 |
|---|---|---|
| E37 | 300 | 400 |
| E37 | 4.23 | 4.10 |

Post Table 950

| Event ID 951 | Post Text 952 | Time/Date 953 |
|---|---|---|
| E69 | " " | 10-11-2010 4:12 PM |
| E90 | " " | 8-12-2010 |

User Subscription Table 940

| User ID 941 | Object ID 942 |
|---|---|
| U819 | O615 |
| U819 | O489 |
| U719 | O615 |

News Feed Table 960

| User ID 961 | Event ID 962 |
|---|---|
| U819 | E37 |
| U819 | E90 |
| U719 | E37 |

COMPUTER IMPLEMENTED METHODS AND APPARATUS FOR PROVIDING ACCESS TO AN ONLINE SOCIAL NETWORK

PRIORITY AND RELATED APPLICATION DATA

This application is a continuation of U.S. application Ser. No. 13/540,367 filed Jul. 2, 2012, now U.S. Pat. No. 9,178,753, which claims priority to U.S. Provisional Patent Application No. 61/529,420, filed on Aug. 31, 2011, both of which are hereby incorporated by reference in their entirety and for all purposes.

COPYRIGHT NOTICE

A portion of the disclosure of this patent document contains material, which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

TECHNICAL FIELD

This patent document relates generally to providing on-demand services in an online social network using a database system and, more specifically, to techniques for controlling access to information in the online social network.

BACKGROUND

"Cloud computing" services provide shared resources, software, and information to computers and other devices upon request. In cloud computing environments, software can be accessible over the Internet rather than installed locally on in-house computer systems. Cloud computing typically involves over-the-Internet provision of dynamically scalable and often virtualized resources. Technological details can be abstracted from the users, who no longer have need for expertise in, or control over, the technology infrastructure "in the cloud" that supports them.

Database resources can be provided in a cloud computing context. However, using conventional database management techniques, it is difficult to know about the activity of other users of a database system in the cloud or other network. For example, the actions of a particular user, such as a salesperson, on a database resource may be important to the user's boss. The user can create a report about what the user has done and send it to the boss, but such reports may be inefficient, not timely, and incomplete. Also, it may be difficult to identify other users who might benefit from the information in the report.

BRIEF DESCRIPTION OF THE DRAWINGS

The included drawings are for illustrative purposes and serve only to provide examples of possible structures and operations for the disclosed inventive systems, apparatus, and methods for providing access to an online social network. These drawings in no way limit any changes in form and detail that may be made by one skilled in the art without departing from the spirit and scope of the disclosed implementations.

FIG. 7 shows an example of a group feed on a group page according to some implementations.

FIG. 8 shows an example of a record feed containing a feed tracked update, post, and comments according to some implementations.

FIG. 9A shows an example of a plurality of tables that may be used in tracking events and creating feeds according to some implementations.

FIGS. 19A-C show examples of group pages in the form of graphical user interfaces (GUIs) configured to be accessible by different users of an organization, according to some implementations.

FIG. 21A shows an example of a group page in the form of a GUI configured to be accessible by internal users of an organization, according to some implementations.

FIG. 21B shows an example of a page in the form of a GUI configured to be accessible by authorized external users of an organization, according to some implementations.

DETAILED DESCRIPTION

Figure 1A:
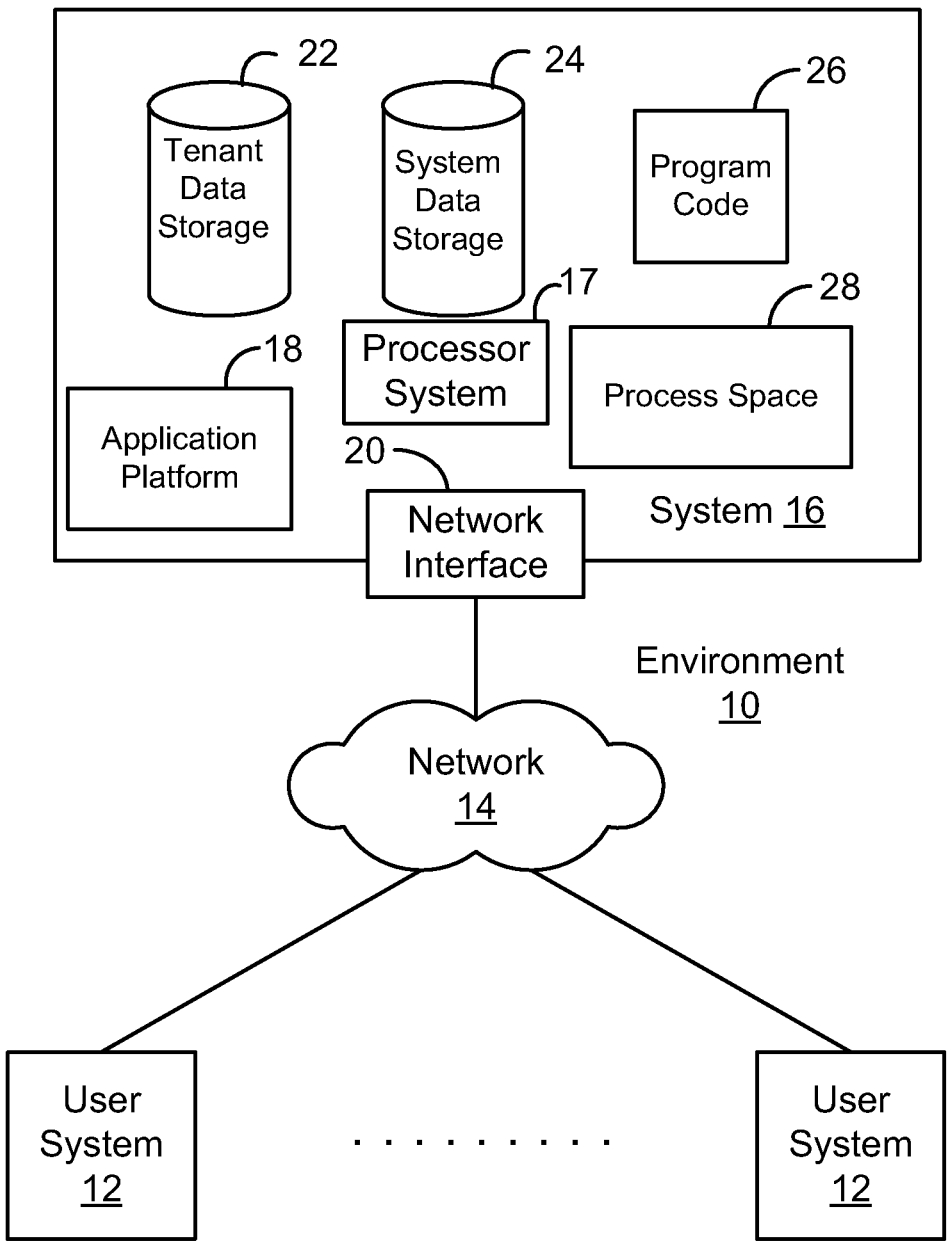
FIG. 1A shows a block diagram of an example of an environment 10 in which an on-demand database service can be used in accordance with some implementations.

Examples of systems, apparatus, and methods according to the disclosed implementations are described in this section. These examples are being provided solely to add context and aid in the understanding of the disclosed implementations. It will thus be apparent to one skilled in the art that implementations may be practiced without some or all of these specific details. In other instances, certain process/method operations, also referred to herein as "blocks," have not been described in detail in order to avoid unnecessarily obscuring implementations. Other applications are possible, such that the following examples should not be taken as definitive or limiting either in scope or setting.

In the following detailed description, references are made to the accompanying drawings, which form a part of the description and in which are shown, by way of illustration, specific implementations. Although these implementations are described in sufficient detail to enable one skilled in the art to practice the disclosed implementations, it is understood that these examples are not limiting, such that other implementations may be used and changes may be made without departing from their spirit and scope. For example, the blocks of methods shown and described herein are not necessarily performed in the order indicated. It should also be understood that the methods may include more or fewer blocks than are indicated. In some implementations, blocks described herein as separate blocks may be combined. Conversely, what may be described herein as a single block may be implemented in multiple blocks.

Various implementations described or referenced herein are directed to different methods, apparatus, systems, and computer-readable storage media for providing access to an online social network, also referred to herein as a social networking system. One example of an online social network is Chatter®, provided by salesforce.com, inc. of San Francisco, Calif. Online social networks are increasingly becoming a common way to facilitate communication among people and groups of people, any of whom can be recognized as users of a social networking system. Some online social networks can be implemented in various settings, including organizations, e.g., enterprises such as companies or business partnerships, academic institutions, or groups within such an organization. For instance, Chatter® can be used by employee users in a division of a business organization to share data, communicate, and collaborate with each other for various purposes.

In some online social networks, users can access one or more information feeds, which include information updates presented as items or entries in the feed. Such a feed item can include a single information update or a collection of individual information updates. A feed item can include various types of data including character-based data, audio data, image data and/or video data. An information feed can be displayed in a graphical user interface (GUI) on a display device such as the display of a computing device as described below. The information updates can include various social network data from various sources and can be stored in an on-demand database service environment. In some implementations, the disclosed methods, apparatus, systems, and computer-readable storage media may be configured or designed for use in a multi-tenant database environment.

In some implementations, an online social network may allow a user to follow data objects in the form of records such as cases, accounts, or opportunities, in addition to following individual users and groups of users. The "following" of a record stored in a database, as described in greater detail below, allows a user to track the progress of that record. Updates to the record, also referred to herein as changes to the record, are one type of information update that can occur and be noted on an information feed such as a record feed or a news feed of a user subscribed to the record. Examples of record updates include field changes in the record, updates to the status of a record, as well as the creation of the record itself. Some records are publicly accessible, such that any user can follow the record, while other records are private, for which appropriate security clearance/permissions are a prerequisite to a user following the record.

Information updates can include various types of updates, which may or may not be linked with a particular record. For example, information updates can be user-submitted messages or can otherwise be generated in response to user actions or in response to events. Examples of messages include: posts, comments, indications of a user's personal preferences such as "likes" and "dislikes", updates to a user's status, uploaded files, and hyperlinks to social network data or other network data such as various documents and/or web pages on the Internet. Posts can include alphanumeric or other character-based user inputs such as words, phrases, statements, questions, emotional expressions, and/or symbols. Comments generally refer to responses to posts, such as words, phrases, statements, answers, questions, and reactionary emotional expressions and/or symbols. Multimedia data can be included in, linked with, or attached to a post or comment. For example, a post can include textual statements in combination with a JPEG image or animated image. A like or dislike can be submitted in response to a particular post or comment. Examples of uploaded files include presentations, documents, multimedia files, and the like.

Users can follow a record by subscribing to the record, as mentioned above. Users can also follow other entities such as other types of data objects, other users, and groups of users. Feed tracked updates regarding such entities are one type of information update that can be received and included in the user's news feed. Any number of users can follow a particular entity and thus view information updates pertaining to that entity on the users' respective news feeds. In some social networks, users may follow each other by establishing connections with each other, sometimes referred to as "friending" one another. By establishing such a connection, one user may be able to see information generated by, generated about, or otherwise associated with another user. For instance, a first user may be able to see information posted by a second user to the second user's personal social network page. One implementation of such a personal social network page is a user's profile page, for example, in the form of a web page representing the user's profile. In one example, when the first user is following the second user, the first user's news feed can receive a post from the second user submitted to the second user's profile feed, also referred to herein as the user's "wall," which is one example of an information feed displayed on the user's profile page.

In some implementations, an information feed may be specific to a group of users of an online social network. For instance, a group of users may publish a news feed. Members of the group may view and post to the group feed in accordance with a permissions configuration for the news feed and the group. Information updates in a group context can also include changes to group status information.

In some implementations, when data such as posts or comments input from one or more users are submitted to an information feed for a particular user, group, object, or other construct within an online social network, an e-mail notification or other type of network communication may be transmitted to all users following the user, group, or object in addition to the inclusion of the data as a feed item in one or more feeds, such as a user's profile feed, a news feed, or a record feed. In some online social networks, the occurrence of such a notification is limited to the first instance of a published input, which may form part of a larger conversation. For instance, a notification may be transmitted for an initial post, but not for comments on the post. In some other implementations, a separate notification is transmitted for each such information update.

Some implementations of the disclosed systems, apparatus, and methods are configured to provide access to online social network data, for instance, to one or more users outside of an organization or group of the organization. As mentioned above, some online social networks are specific to a particular organization, such as an enterprise. Chatter® can be configured to provide a secure online social network within the particular organization. Thus, in some implementations, information sent from internal users such as employees of the organization is often private, e.g., generally confined to the organization and viewable only by other employees of the same organization or group within the organization. Various levels of security can be implemented to protect the information from being accessed by unauthorized users, such as people not employed by the organization. Thus, for instance, employees of a company can freely collaborate with each other by exchanging information and sharing data, while minimizing the risk of the communications being leaked to people outside of the company.

For example, an organization, Org A, has implemented an online social network such as Chatter®. In this example, Chatter® is initially configured in Org A to have a security model with permissions such that only an Org A employee can access and view user profiles, groups, cases, and other various records of Org A. For instance, employee sales agents of Org A are granted permission to access and view cases, leads, opportunities, and other sales-related records. However, the security model has restrictions to prevent any non-employee of Org A from accessing such social network data. Thus, security mechanisms are implemented to block any current or potential customers of Org A from gaining access to the sales-related records used by Org A's sales agents.

In some implementations, the disclosed techniques provide limited exposure to data of an online social network of an organization to people outside of the organization, while maintaining appropriate security restrictions. In certain situations, people outside of the organization can be recognized as authorized external users and gain limited access to some of the social network data. Some of the disclosed implementations balance an external user's limited access and visibility of such social network data with the maintenance of appropriate protection of other organizational data, which should remain off-limits even to authorized external users. In this way, people outside of an organization can desirably collaborate with people inside of the organization for a limited purpose, but the outside user is blocked from gaining access to the organization's private or otherwise confidential social network data.

Thus, individual users and groups of an online social network implemented in a particular organization can open a conversation to include input from users outside of their organization. In another example, two organizations, Org A and Org B, are partnered for a joint research and development project. Employees of the respective organizations desire to collaborate with each other for the project. However, only Org A has implemented an online social network such as Chatter®. Applying some of the techniques disclosed herein, Chatter® can be configured to permit Org B employees to log into Org A's implementation of Chatter® and have limited permission to exchange information with Org A employees involved in the project, and view project-related information updates, technical documents, and various records maintained in Org A's databases. A design collaboration space can be constructed in Org A's Chatter® to achieve the desired balance of productive communication and collaboration between Org A's and Org B's employees, while protecting Org A's private organizational data from disclosure to Org B.

Some implementations of the disclosed systems, apparatus, methods, and computer-readable storage media are configured to provide alerts to users before sharing social network data, for instance, with external users. For example, users who are members of a group in an online social network may have concerns about who else in the group can view posts, comments, and other messages that the users submit to a group feed. As the membership in a particular group changes, or the user does not carefully monitor who are the group members, concerns can arise that confidential, proprietary, or other sensitive information may be shared with the wrong users. Embarrassment and even damage to the group or organization's projects and goals can result if the wrong information is shared with the wrong people.

Some implementations disclosed herein provide mechanisms to manage such concerns.

In some implementations, a dynamic alert notification is generated and displayed when certain conditions are satisfied in association with any of various actions, such as a user creating a message. The alert notification can be displayed before the user clicks on a share or send button to send the message to other users. Various actions can trigger an alert notification such as the identification of certain groups or certain users as intended recipients of user input data. For instance, as soon as a user clicks on a publisher component to generate a post to a group feed of a group having external users, an alert notification can be displayed, which states: "Caution: external users may see this post." In some implementations, the content of the alert notification can vary and can be customized and tailored according to the particular action, the particular data to be shared, and/or the intended recipient(s). The alert notification can be strategically placed in proximity to the publisher component or other region when displayed in a user interface, with the intent that the user sees the notification and desirably is given enough pause to consider, "Should I be writing this to this audience . . . " before clicking the share or send button.

Using the techniques disclosed herein, alert notifications can be displayed in a user interface in a timely manner. In some implementations, the alert notification can be generated and presented as a user engages with a publisher component or otherwise causes input data to be entered, but before submitting the data to a group, user, or other construct within the online social network. In various examples, an alert notification can be prominently displayed responsive to a user engaging, e.g., clicking on a publisher component, hovering a pointer over a "comment" button, initiating a private message, or clicking into any of a variety of designated data entry fields in a region of a displayed user interface. Such alert notifications are contextual, because the content, timing, and placement of the alert can be tailored and presented in the context of a particular action, such as writing a post in a particular component or other designated region of a user interface.

These and other implementations may be embodied in various types of hardware, software, firmware, and combinations thereof. For example, some techniques disclosed herein may be implemented, at least in part, by computer-readable media that include program instructions, state information, etc., for performing various services and operations described herein. Examples of program instructions include both machine code, such as produced by a compiler, and files containing higher-level code that may be executed by a computing device such as a server or other data processing apparatus using an interpreter. Examples of computer-readable media include, but are not limited to, magnetic media such as hard disks, floppy disks, and magnetic tape; optical media such as CD-ROM disks; magneto-optical media; and hardware devices that are specially configured to store program instructions, such as read-only memory ("ROM") devices and random access memory ("RAM") devices. These and other features of the disclosed implementations will be described in more detail below with reference to the associated drawings.

The term "multi-tenant database system" can refer to those systems in which various elements of hardware and software of a database system may be shared by one or more customers. For example, a given application server may simultaneously process requests for a great number of customers, and a given database table may store rows of data such as feed items for a potentially much greater number of customers. The term "query plan" generally refers to one or more operations used to access information in a database system.

A "user profile" or "user's profile" is generally configured to store and maintain data about a given user of the database system. The data can include general information, such as name, title, phone number, a photo, a biographical summary, and a status, e.g., text describing what the user is currently doing. As mentioned below, the data can include messages created by other users. Where there are multiple tenants, a user is typically associated with a particular tenant. For example, a user could be a salesperson of a company, which is a tenant of the database system that provides a database service.

The term "record" generally refers to a data entity, such as an instance of a data object created by a user of the database service, for example, about a particular (actual or potential) business relationship or project. The data object can have a data structure defined by the database service (a standard object) or defined by a user (custom object). For example, a record can be for a business partner or potential business partner (e.g., a client, vendor, distributor, etc.) of the user, and can include information describing an entire company, subsidiaries, or contacts at the company. As another example, a record can be a project that the user is working on, such as an opportunity (e.g., a possible sale) with an existing partner, or a project that the user is trying to get. In one implementation of a multi-tenant database system, each record for the tenants has a unique identifier stored in a common table. A record has data fields that are defined by the structure of the object (e.g., fields of certain data types and purposes). A record can also have custom fields defined by a user. A field can be another record or include links thereto, thereby providing a parent-child relationship between the records.

The terms "information feed" and "feed" are used interchangeably herein and generally refer to a combination (e.g., a list) of feed items or entries with various types of information and data. Such feed items can be stored and maintained in one or more database tables, e.g., as rows in the table(s), that can be accessed to retrieve relevant information to be presented as part of a displayed feed. The term "feed item" (or feed element) refers to an item of information, which can be presented in the feed such as a post submitted by a user. Feed items of information about a user can be presented in a user's profile feed of the database, while feed items of information about a record can be presented in a record feed in the database, by way of example. A profile feed and a record feed are examples of different information feeds. A second user following a first user and a record can receive the feed items associated with the first user and the record for display in the second user's news feed, which is another type of information feed. In some implementations, the feed items from any number of followed users and records can be combined into a single information feed of a particular user.

As examples, a feed item can be a message, such as a user-generated post of text data, and a feed tracked update to a record or profile, such as a change to a field of the record. Feed tracked updates are described in greater detail below. A feed can be a combination of messages and feed tracked updates. Messages include text created by a user, and may include other data as well. Examples of messages include posts, user status updates, and comments. Messages can be created for a user's profile or for a record. Posts can be created by various users, potentially any user, although some restrictions can be applied. As an example, posts can be made to a wall section of a user's profile page (which can include a number of recent posts) or a section of a record that includes multiple posts. The posts can be organized in chronological order when displayed in a graphical user interface (GUI), for instance, on the user's profile page, as part of the user's profile feed. In contrast to a post, a user status update changes a status of a user and can be made by that user or an administrator. A record can also have a status, the update of which can be provided by an owner of the record or other users having suitable write access permissions to the record. The owner can be a single user, multiple users, or a group. In one implementation, there is only one status for a record.

In some implementations, a comment can be made on any feed item. In some implementations, comments are organized as a list explicitly tied to a particular feed tracked update, post, or status update. In some implementations, comments may not be listed in the first layer (in a hierarchal sense) of feed items, but listed as a second layer branching from a particular first layer feed item.

A "feed tracked update," also referred to herein as a "feed update," is one type of information update and generally refers to data representing an event. A feed tracked update can include text generated by the database system in response to the event, to be provided as one or more feed items for possible inclusion in one or more feeds. In one implementation, the data can initially be stored, and then the database system can later use the data to create text for describing the event. Both the data and/or the text can be a feed tracked update, as used herein. In various implementations, an event can be an update of a record and/or can be triggered by a specific action by a user. Which actions trigger an event can be configurable. Which events have feed tracked updates created and which feed updates are sent to which users can also be configurable. Messages and feed updates can be stored as a field or child object of the record. For example, the feed can be stored as a child object of the record.

A "group" is generally a collection of users. In some implementations, the group may be defined as users with a same or similar attribute, or by membership. In some implementations, a "group feed", also referred to herein as a "group news feed", includes any feed item about any user in the group. In some implementations, the group feed includes feed items that are about the group as a whole. In one implementation, the feed items for a group are only posts and comments.

An "entity feed" or "record feed" generally refers to a feed of feed items about a particular record in the database, such as feed tracked updates about changes to the record and posts made by users about the record. An entity feed can be composed of any type of feed item. Such a feed can be displayed on a page such as a web page associated with the record, e.g., a home page of the record. As used herein, a "profile feed" or "user's profile feed" is a feed of feed items about a particular user. In one example, the feed items for a profile feed include posts and comments that other users make about or send to the particular user, and status updates made by the particular user. Such a profile feed can be displayed on a page associated with the particular user. In another example, feed items in a profile feed could include posts made by the particular user and feed tracked updates initiated based on actions of the particular user.

I. General Overview

Systems, apparatus, and methods are provided for implementing enterprise level social and business information networking. Such implementations can provide more efficient use of a database system. For instance, a user of a database system may not easily know when important information in the database has changed, e.g., about a project or client. Implementations can provide feed tracked updates about such changes and other events, thereby keeping users informed.

By way of example, a user can update a record, e.g., an opportunity such as a possible sale of 1000 computers. Once the record update has been made, a feed tracked update about the record update can then automatically be provided, e.g., in a feed, to anyone subscribing to the opportunity or to the user. Thus, the user does not need to contact a manager regarding the change in the opportunity, since the feed tracked update about the update is sent via a feed right to the manager's feed page or other page.

Next, mechanisms and methods for providing systems implementing enterprise level social and business information networking will be described with reference to several implementations. First, an overview of an example of a database system is described, and then examples of tracking events for a record, actions of a user, and messages about a user or record are described. Various implementations about the data structure of feeds, customizing feeds, user selection of records and users to follow, generating feeds, and displaying feeds are also described.

II. System Overview

FIG. 1A shows a block diagram of an example of an environment 10 in which an on-demand database service can be used in accordance with some implementations. Environment 10 may include user systems 12, network 14, database system 16, processor system 17, application platform 18, network interface 20, tenant data storage 22, system data storage 24, program code 26, and process space 28. In other implementations, environment 10 may not have all of these components and/or may have other components instead of, or in addition to, those listed above.

Environment 10 is an environment in which an on-demand database service exists. User system 12 may be implemented as any computing device(s) or other data processing apparatus such as a machine or system that is used by a user to access a database system 16. For example, any of user systems 12 can be a handheld computing device, a mobile phone, a laptop computer, a work station, and/or a network of such computing devices. As illustrated in FIG. 1A (and in more detail in FIG. 1B) user systems 12 might interact via a network 14 with an on-demand database service, which is implemented in the example of FIG. 1A as database system 16.

An on-demand database service, implemented using system 16 by way of example, is a service that is made available to outside users, who do not need to necessarily be concerned with building and/or maintaining the database system. Instead, the database system may be available for their use when the users need the database system, i.e., on the demand of the users. Some on-demand database services may store information from one or more tenants into tables of a common database image to form a multi-tenant database system (MTS). A database image may include one or more database objects. A relational database management system (RDBMS) or the equivalent may execute storage and retrieval of information against the database object(s). Application platform 18 may be a framework that allows the applications of system 16 to run, such as the hardware and/or software, e.g., the operating system. In some implementations, application platform 18 enables creation, managing and executing one or more applications developed by the provider of the on-demand database service, users accessing the on-demand database service via user systems 12, or third party application developers accessing the on-demand database service via user systems 12.

The users of user systems 12 may differ in their respective capacities, and the capacity of a particular user system 12 might be entirely determined by permissions (permission levels) for the current user. For example, where a salesperson is using a particular user system 12 to interact with system 16, that user system has the capacities allotted to that salesperson. However, while an administrator is using that user system to interact with system 16, that user system has the capacities allotted to that administrator. In systems with a hierarchical role model, users at one permission level may have access to applications, data, and database information accessible by a lower permission level user, but may not have access to certain applications, database information, and data accessible by a user at a higher permission level. Thus, different users will have different capabilities with regard to accessing and modifying application and database information, depending on a user's security or permission level, also called authorization.

Network 14 is any network or combination of networks of devices that communicate with one another. For example, network 14 can be any one or any combination of a LAN (local area network), WAN (wide area network), telephone network, wireless network, point-to-point network, star network, token ring network, hub network, or other appropriate configuration. Network 14 can include a TCP/IP (Transfer Control Protocol and Internet Protocol) network, such as the global internetwork of networks often referred to as the "Internet" with a capital "I." The Internet will be used in many of the examples herein. However, it should be understood that the networks that the present implementations might use are not so limited, although TCP/IP is a frequently implemented protocol.

User systems 12 might communicate with system 16 using TCP/IP and, at a higher network level, use other common Internet protocols to communicate, such as HTTP, FTP, AFS, WAP, etc. In an example where HTTP is used, user system 12 might include an HTTP client commonly referred to as a "browser" for sending and receiving HTTP signals to and from an HTTP server at system 16. Such an HTTP server might be implemented as the sole network interface 20 between system 16 and network 14, but other techniques might be used as well or instead. In some implementations, the network interface 20 between system 16 and network 14 includes load sharing functionality, such as round-robin HTTP request distributors to balance loads and distribute incoming HTTP requests evenly over a plurality of servers. At least for users accessing system 16, each of the plurality of servers has access to the MTS' data; however, other alternative configurations may be used instead.

In one implementation, system 16, shown in FIG. 1A, implements a web-based customer relationship management (CRM) system. For example, in one implementation, system 16 includes application servers configured to implement and execute CRM software applications as well as provide related data, code, forms, web pages and other information to and from user systems 12 and to store to, and retrieve from, a database system related data, objects, and Webpage content. With a multi-tenant system, data for multiple tenants may be stored in the same physical database object in tenant data storage 22, however, tenant data typically is arranged in the storage medium(s) of tenant data storage 22 so that data of one tenant is kept logically separate from that of other tenants so that one tenant does not have access to another tenant's data, unless such data is expressly shared. In certain implementations, system 16 implements applications other than, or in addition to, a CRM application. For example, system 16 may provide tenant access to multiple hosted (standard and custom) applications, including a CRM application. User (or third party developer) applications, which may or may not include CRM, may be supported by the application platform 18, which manages creation, storage of the applications into one or more database objects and executing of the applications in a virtual machine in the process space of the system 16.

Figure 1B:
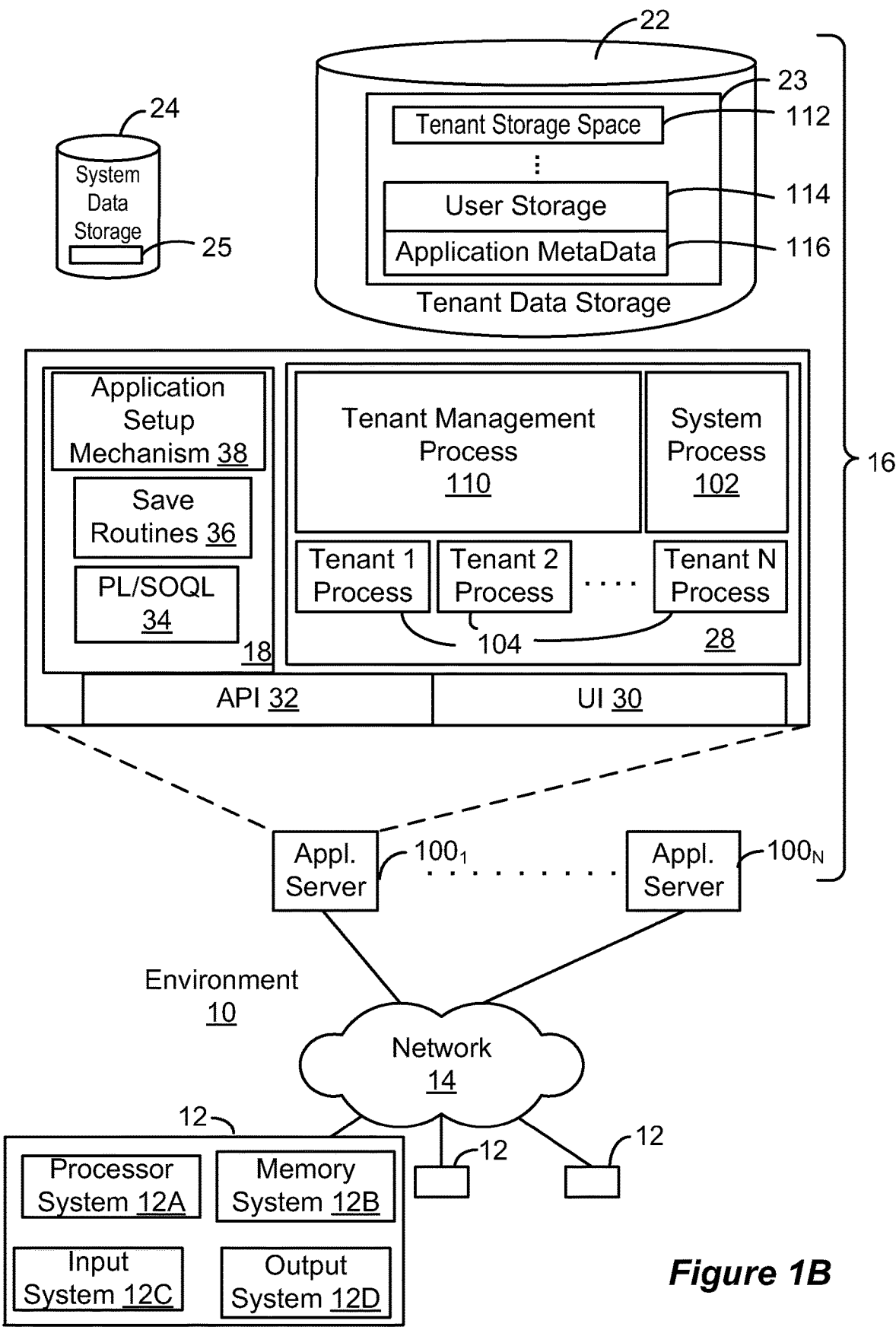
FIG. 1B shows a block diagram of an example of some implementations of elements of FIG. 1A and various possible interconnections between these elements.

One arrangement for elements of system 16 is shown in FIGS. 1A and 1B, including a network interface 20, application platform 18, tenant data storage 22 for tenant data 23, system data storage 24 for system data 25 accessible to system 16 and possibly multiple tenants, program code 26 for implementing various functions of system 16, and a process space 28 for executing MTS system processes and tenant-specific processes, such as running applications as part of an application hosting service. Additional processes that may execute on system 16 include database indexing processes.

Several elements in the system shown in FIG. 1A include conventional, well-known elements that are explained only briefly here. For example, each user system 12 could include a desktop personal computer, workstation, laptop, PDA, cell phone, or any wireless access protocol (WAP) enabled device or any other computing device capable of interfacing directly or indirectly to the Internet or other network connection. The term "computing device" is also referred to herein simply as a "computer". User system 12 typically runs an HTTP client, e.g., a browsing program, such as Microsoft's Internet Explorer browser, Netscape's Navigator browser, Opera's browser, or a WAP-enabled browser in the case of a cell phone, PDA or other wireless device, or the like, allowing a user (e.g., subscriber of the multi-tenant database system) of user system 12 to access, process and view information, pages and applications available to it from system 16 over network 14. Each user system 12 also typically includes one or more user interface devices, such as a keyboard, a mouse, trackball, touch pad, touch screen, pen or the like, for interacting with a graphical user interface (GUI) provided by the browser on a display (e.g., a monitor screen, LCD display, etc.) of the computing device in conjunction with pages, forms, applications and other information provided by system 16 or other systems or servers. For example, the user interface device can be used to access data and applications hosted by system 16, and to perform searches on stored data, and otherwise allow a user to interact with various GUI pages that may be presented to a user. As discussed above, implementations are suitable for use with the Internet, although other networks can be used instead of or in addition to the Internet, such as an intranet, an extranet, a virtual private network (VPN), a non-TCP/IP based network, any LAN or WAN or the like.

According to one implementation, each user system 12 and all of its components are operator configurable using applications, such as a browser, including computer code run using a central processing unit such as an Intel Pentium® processor or the like. Similarly, system 16 (and additional instances of an MTS, where more than one is present) and all of its components might be operator configurable using application(s) including computer code to run using processor system 17, which may be implemented to include a central processing unit, which may include an Intel Pentium® processor or the like, and/or multiple processor units. Non-transitory computer-readable media can have instructions stored thereon/in, that can be executed by or used to program a computing device to perform any of the methods of the implementations described herein. Computer program code 26 implementing instructions for operating and configuring system 16 to intercommunicate and to process web pages, applications and other data and media content as described herein is preferably downloadable and stored on a hard disk, but the entire program code, or portions thereof, may also be stored in any other volatile or non-volatile memory medium or device as is well known, such as a ROM or RAM, or provided on any media capable of storing program code, such as any type of rotating media including floppy disks, optical discs, digital versatile disk (DVD), compact disk (CD), microdrive, and magneto-optical disks, and magnetic or optical cards, nanosystems (including molecular memory ICs), or any other type of computer-readable medium or device suitable for storing instructions and/or data. Additionally, the entire program code, or portions thereof, may be transmitted and downloaded from a software source over a transmission medium, e.g., over the Internet, or from another server, as is well known, or transmitted over any other conventional network connection as is well known (e.g., extranet, VPN, LAN, etc.) using any communication medium and protocols (e.g., TCP/IP, HTTP, HTTPS, Ethernet, etc.) as are well known. It will also be appreciated that computer code for the disclosed implementations can be realized in any programming language that can be executed on a client system and/or server or server system such as, for example, C, C++, HTML, any other markup language, Java™, JavaScript, ActiveX, any other scripting language, such as VBScript, and many other programming languages as are well known may be used. (Java™ is a trademark of Sun Microsystems, Inc.).

According to some implementations, each system 16 is configured to provide web pages, forms, applications, data and media content to user (client) systems 12 to support the access by user systems 12 as tenants of system 16. As such, system 16 provides security mechanisms to keep each tenant's data separate unless the data is shared. If more than one MTS is used, they may be located in close proximity to one another (e.g., in a server farm located in a single building or campus), or they may be distributed at locations remote from one another (e.g., one or more servers located in city A and one or more servers located in city B). As used herein, each MTS could include one or more logically and/or physically connected servers distributed locally or across one or more geographic locations. Additionally, the term "server" is meant to refer to a computing device or system, including processing hardware and process space(s), an associated storage medium such as a memory device or database, and, in some instances, a database application (e.g., OODBMS or RDBMS) as is well known in the art. It should also be understood that "server system" and "server" are often used interchangeably herein. Similarly, the database objects described herein can be implemented as single databases, a distributed database, a collection of distributed databases, a database with redundant online or offline backups or other redundancies, etc., and might include a distributed database or storage network and associated processing intelligence.

FIG. 1B shows a block diagram of an example of some implementations of elements of FIG. 1A and various possible interconnections between these elements. That is, FIG. 1B also illustrates environment 10. However, in FIG. 1B elements of system 16 and various interconnections in some implementations are further illustrated. FIG. 1B shows that user system 12 may include processor system 12A, memory system 12B, input system 12C, and output system 12D. FIG. 1B shows network 14 and system 16. FIG. 1B also shows that system 16 may include tenant data storage 22, tenant data 23, system data storage 24, system data 25, User Interface (UI) 30, Application Program Interface (API) 32, PL/SOQL 34, save routines 36, application setup mechanism 38, applications servers 100₁-100N, system process space 102, tenant process spaces 104, tenant management process space 110, tenant storage space 112, user storage 114, and application metadata 116. In other implementations, environment 10 may not have the same elements as those listed above and/or may have other elements instead of, or in addition to, those listed above.

User system 12, network 14, system 16, tenant data storage 22, and system data storage 24 were discussed above in FIG. 1A. Regarding user system 12, processor system 12A may be any combination of one or more processors. Memory system 12B may be any combination of one or more memory devices, short term, and/or long term memory. Input system 12C may be any combination of input devices, such as one or more keyboards, mice, trackballs, scanners, cameras, and/or interfaces to networks. Output system 12D may be any combination of output devices, such as one or more monitors, printers, and/or interfaces to networks. As shown by FIG. 1B, system 16 may include a network interface 20 (of FIG. 1A) implemented as a set of HTTP application servers 100, an application platform 18, tenant data storage 22, and system data storage 24. Also shown is system process space 102, including individual tenant process spaces 104 and a tenant management process space 110. Each application server 100 may be configured to communicate with tenant data storage 22 and the tenant data 23 therein, and system data storage 24 and the system data 25 therein to serve requests of user systems 12. The tenant data 23 might be divided into individual tenant storage spaces 112, which can be either a physical arrangement and/or a logical arrangement of data. Within each tenant storage space 112, user storage 114 and application metadata 116 might be similarly allocated for each user. For example, a copy of a user's most recently used (MRU) items might be stored to user storage 114. Similarly, a copy of MRU items for an entire organization that is a tenant might be stored to tenant storage space 112. A UI 30 provides a user interface and an API 32 provides an application programmer interface to system 16 resident processes to users and/or developers at user systems 12. The tenant data and the system data may be stored in various databases, such as one or more Oracle☐ databases.

Application platform 18 includes an application setup mechanism 38 that supports application developers' creation and management of applications, which may be saved as metadata into tenant data storage 22 by save routines 36 for execution by subscribers as one or more tenant process spaces 104 managed by tenant management process 110 for example. Invocations to such applications may be coded using PL/SOQL 34 that provides a programming language style interface extension to API 32. A detailed description of some PL/SOQL language implementations is discussed in commonly assigned U.S. Pat. No. 7,730,478, titled METHOD AND SYSTEM FOR ALLOWING ACCESS TO DEVELOPED APPLICATIONS VIA A MULTI-TENANT ON-DEMAND DATABASE SERVICE, by Craig Weissman, issued on Jun. 1, 2010, and hereby incorporated by reference in its entirety and for all purposes. Invocations to applications may be detected by one or more system processes, which manage retrieving application metadata 116 for the subscriber making the invocation and executing the metadata as an application in a virtual machine.

Each application server 100 may be communicably coupled to database systems, e.g., having access to system data 25 and tenant data 23, via a different network connection. For example, one application server 1001 might be coupled via the network 14 (e.g., the Internet), another application server 100N-1 might be coupled via a direct network link, and another application server 100N might be coupled by yet a different network connection. Transfer Control Protocol and Internet Protocol (TCP/IP) are typical protocols for communicating between application servers 100 and the database system. However, it will be apparent to one skilled in the art that other transport protocols may be used to optimize the system depending on the network interconnect used.

In certain implementations, each application server 100 is configured to handle requests for any user associated with any organization that is a tenant. Because it is desirable to be able to add and remove application servers from the server pool at any time for any reason, there is preferably no server affinity for a user and/or organization to a specific application server 100. In one implementation, therefore, an interface system implementing a load balancing function (e.g., an F5 Big-IP load balancer) is communicably coupled between the application servers 100 and the user systems 12 to distribute requests to the application servers 100. In one implementation, the load balancer uses a least connections algorithm to route user requests to the application servers 100. Other examples of load balancing algorithms, such as round robin and observed response time, also can be used. For example, in certain implementations, three consecutive requests from the same user could hit three different application servers 100, and three requests from different users could hit the same application server 100. In this manner, by way of example, system 16 is multi-tenant, wherein system 16 handles storage of, and access to, different objects, data and applications across disparate users and organizations.

As an example of storage, one tenant might be a company that employs a sales force where each salesperson uses system 16 to manage their sales process. Thus, a user might maintain contact data, leads data, customer follow-up data, performance data, goals and progress data, etc., all applicable to that user's personal sales process (e.g., in tenant data storage 22). In an example of a MTS arrangement, since all of the data and the applications to access, view, modify, report, transmit, calculate, etc., can be maintained and accessed by a user system having nothing more than network access, the user can manage his or her sales efforts and cycles from any of many different user systems. For example, if a salesperson is visiting a customer and the customer has Internet access in their lobby, the salesperson can obtain critical updates as to that customer while waiting for the customer to arrive in the lobby.

While each user's data might be separate from other users' data regardless of the employers of each user, some data might be organization-wide data shared or accessible by a plurality of users or all of the users for a given organization that is a tenant. Thus, there might be some data structures managed by system 16 that are allocated at the tenant level while other data structures might be managed at the user level. Because an MTS might support multiple tenants including possible competitors, the MTS should have security protocols that keep data, applications, and application use separate. Also, because many tenants may opt for access to an MTS rather than maintain their own system, redundancy, up-time, and backup are additional functions that may be implemented in the MTS. In addition to user-specific data and tenant-specific data, system 16 might also maintain system level data usable by multiple tenants or other data. Such system level data might include industry reports, news, postings, and the like that are sharable among tenants.

In certain implementations, user systems 12 (which may be client systems) communicate with application servers 100 to request and update system-level and tenant-level data from system 16 that may involve sending one or more queries to tenant data storage 22 and/or system data storage 24. System 16 (e.g., an application server 100 in system 16) automatically generates one or more SQL statements (e.g., one or more SQL queries) that are designed to access the desired information. System data storage 24 may generate query plans to access the requested data from the database.

Each database can generally be viewed as a collection of objects, such as a set of logical tables, containing data fitted into predefined categories. A "table" is one representation of a data object, and may be used herein to simplify the conceptual description of objects and custom objects according to some implementations. It should be understood that "table" and "object" may be used interchangeably herein. Each table generally contains one or more data categories logically arranged as columns or fields in a viewable schema. Each row or record of a table contains an instance of data for each category defined by the fields. For example, a CRM database may include a table that describes a customer with fields for basic contact information such as name, address, phone number, fax number, etc. Another table might describe a purchase order, including fields for information such as customer, product, sale price, date, etc. In some multi-tenant database systems, standard entity tables might be provided for use by all tenants. For CRM database applications, such standard entities might include tables for case, account, contact, lead, and opportunity data objects, each containing pre-defined fields. It should be understood that the word "entity" may also be used interchangeably herein with "object" and "table".

In some multi-tenant database systems, tenants may be allowed to create and store custom objects, or they may be allowed to customize standard entities or objects, for example by creating custom fields for standard objects, including custom index fields. Commonly assigned U.S. Pat. No. 7,779,039, titled CUSTOM ENTITIES AND FIELDS IN A MULTI-TENANT DATABASE SYSTEM, by Weissman et al., issued on Aug. 17, 2010, and hereby incorporated by reference in its entirety and for all purposes, teaches systems and methods for creating custom objects as well as customizing standard objects in a multi-tenant database system. In certain implementations, for example, all custom entity data rows are stored in a single multi-tenant physical table, which may contain multiple logical tables per organization. It is transparent to customers that their multiple "tables" are in fact stored in one large table or that their data may be stored in the same table as the data of other customers.

Figure 2A:
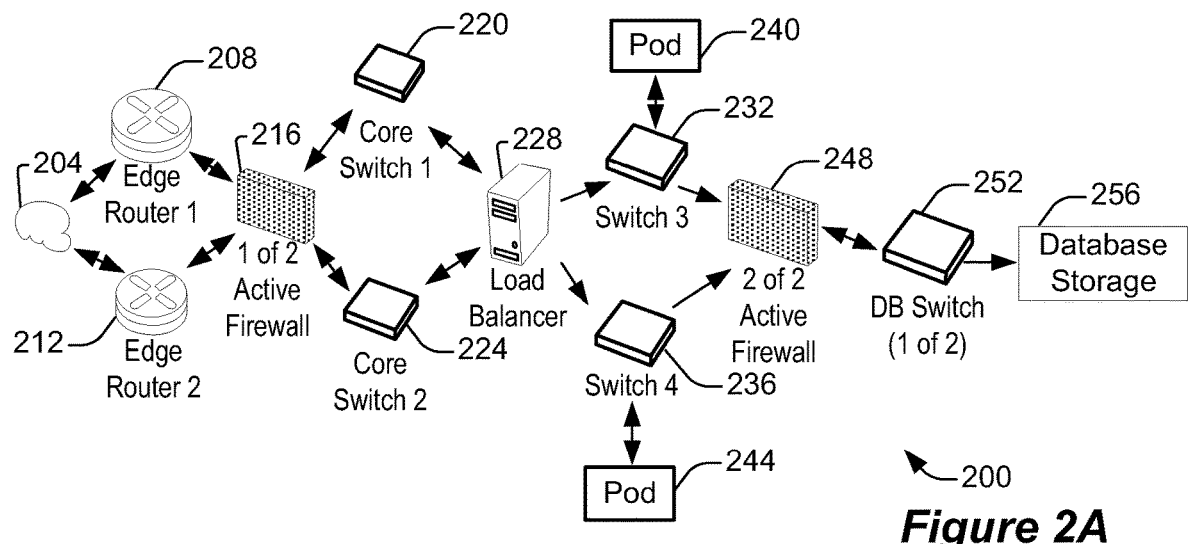
FIG. 2A shows a system diagram illustrating an example of architectural components of an on-demand database service environment 200 according to some implementations.

FIG. 2A shows a system diagram illustrating an example of architectural components of an on-demand database service environment 200 according to some implementations. A client machine located in the cloud 204, generally referring to one or more networks in combination, as described herein, may communicate with the on-demand database service environment via one or more edge routers 208 and 212. A client machine can be any of the examples of user systems 12 described above. The edge routers may communicate with one or more core switches 220 and 224 via firewall 216. The core switches may communicate with a load balancer 228, which may distribute server load over different pods, such as the pods 240 and 244. The pods 240 and 244, which may each include one or more servers and/or other computing resources, may perform data processing and other operations used to provide on-demand services. Communication with the pods may be conducted via pod switches 232 and 236. Components of the on-demand database service environment may communicate with a database storage 256 via a database firewall 248 and a database switch 252.

Figure 2B:
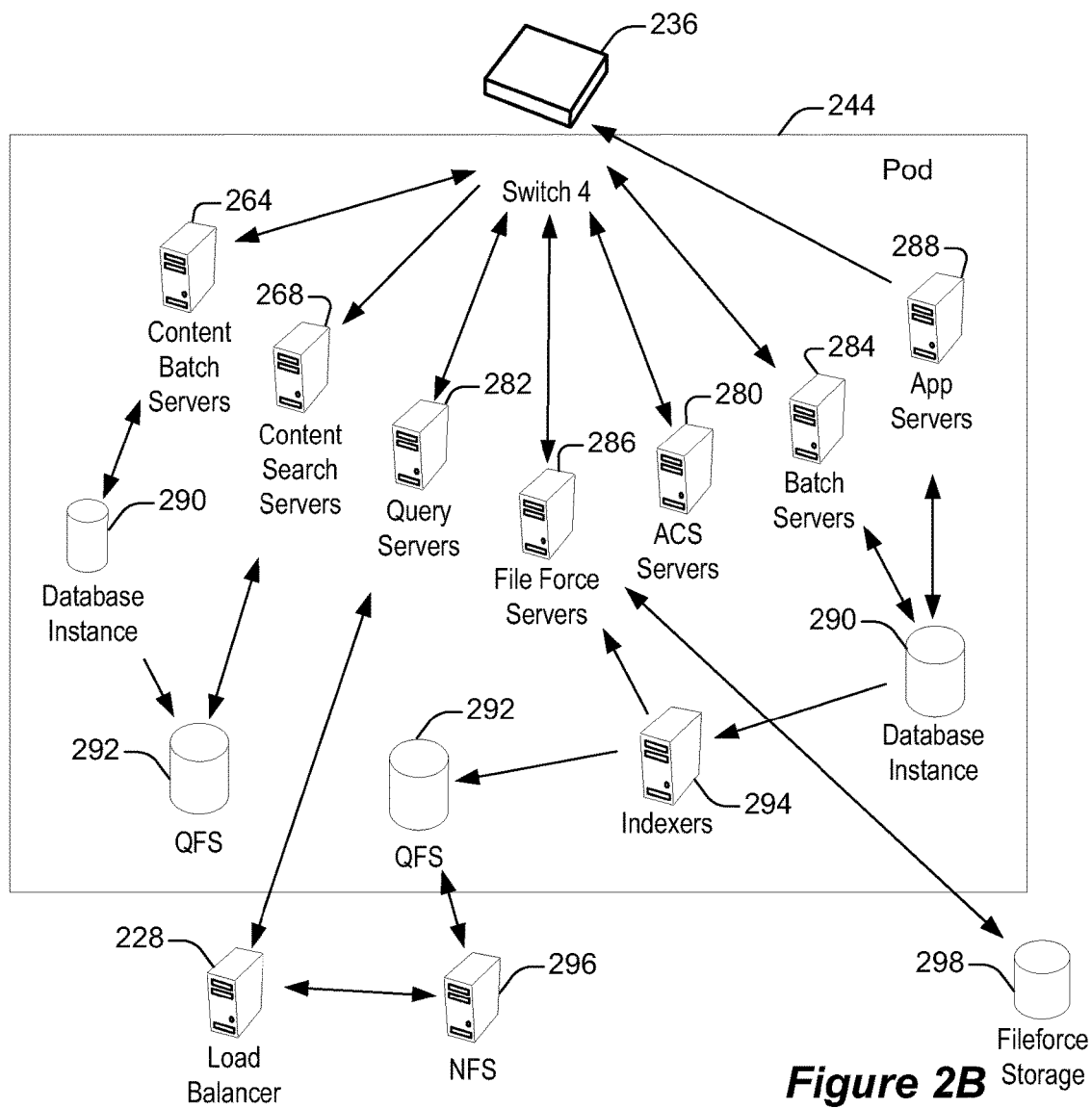
FIG. 2B shows a system diagram further illustrating an example of architectural components of an on-demand database service environment according to some implementations.

As shown in FIGS. 2A and 2B, accessing an on-demand database service environment may involve communications transmitted among a variety of different hardware and/or software components. Further, the on-demand database service environment 200 is a simplified representation of an actual on-demand database service environment. For example, while only one or two devices of each type are shown in FIGS. 2A and 2B, some implementations of an on-demand database service environment may include anywhere from one to many devices of each type. Also, the on-demand database service environment need not include each device shown in FIGS. 2A and 2B, or may include additional devices not shown in FIGS. 2A and 2B.

Moreover, one or more of the devices in the on-demand database service environment 200 may be implemented on the same physical device or on different hardware. Some devices may be implemented using hardware or a combination of hardware and software. Thus, terms such as "data processing apparatus," "machine," "server" and "device" as used herein are not limited to a single hardware device, but rather include any hardware and software configured to provide the described functionality.

The cloud 204 is intended to refer to a data network or plurality of data networks, often including the Internet. Client machines located in the cloud 204 may communicate with the on-demand database service environment to access services provided by the on-demand database service environment. For example, client machines may access the on-demand database service environment to retrieve, store, edit, and/or process information.

In some implementations, the edge routers 208 and 212 route packets between the cloud 204 and other components of the on-demand database service environment 200. The edge routers 208 and 212 may employ the Border Gateway Protocol (BGP). The BGP is the core routing protocol of the Internet. The edge routers 208 and 212 may maintain a table of IP networks or 'prefixes', which designate network reachability among autonomous systems on the Internet.

In one or more implementations, the firewall 216 may protect the inner components of the on-demand database service environment 200 from Internet traffic. The firewall 216 may block, permit, or deny access to the inner components of the on-demand database service environment 200 based upon a set of rules and other criteria. The firewall 216 may act as one or more of a packet filter, an application gateway, a stateful filter, a proxy server, or any other type of firewall.

In some implementations, the core switches 220 and 224 are high-capacity switches that transfer packets within the on-demand database service environment 200. The core switches 220 and 224 may be configured as network bridges that quickly route data between different components within the on-demand database service environment. In some implementations, the use of two or more core switches 220 and 224 may provide redundancy and/or reduced latency.

In some implementations, the pods 240 and 244 may perform the core data processing and service functions provided by the on-demand database service environment. Each pod may include various types of hardware and/or software computing resources. An example of the pod architecture is discussed in greater detail with reference to FIG. 2B.

In some implementations, communication between the pods 240 and 244 may be conducted via the pod switches 232 and 236. The pod switches 232 and 236 may facilitate communication between the pods 240 and 244 and client machines located in the cloud 204, for example via core switches 220 and 224. Also, the pod switches 232 and 236 may facilitate communication between the pods 240 and 244 and the database storage 256.

In some implementations, the load balancer 228 may distribute workload between the pods 240 and 244. Balancing the on-demand service requests between the pods may assist in improving the use of resources, increasing throughput, reducing response times, and/or reducing overhead. The load balancer 228 may include multilayer switches to analyze and forward traffic.

In some implementations, access to the database storage 256 may be guarded by a database firewall 248. The database firewall 248 may act as a computer application firewall operating at the database application layer of a protocol stack. The database firewall 248 may protect the database storage 256 from application attacks such as structure query language (SQL) injection, database rootkits, and unauthorized information disclosure.

In some implementations, the database firewall 248 may include a host using one or more forms of reverse proxy services to proxy traffic before passing it to a gateway router. The database firewall 248 may inspect the contents of database traffic and block certain content or database requests. The database firewall 248 may work on the SQL application level atop the TCP/IP stack, managing applications' connection to the database or SQL management interfaces as well as intercepting and enforcing packets traveling to or from a database network or application interface.

In some implementations, communication with the database storage 256 may be conducted via the database switch 252. The multi-tenant database storage 256 may include more than one hardware and/or software components for handling database queries. Accordingly, the database switch 252 may direct database queries transmitted by other components of the on-demand database service environment (e.g., the pods 240 and 244) to the correct components within the database storage 256.

In some implementations, the database storage 256 is an on-demand database system shared by many different organizations. The on-demand database system may employ a multi-tenant approach, a virtualized approach, or any other type of database approach. An on-demand database system is discussed in greater detail with reference to FIGS. 1A and 1B.

FIG. 2B shows a system diagram further illustrating an example of architectural components of an on-demand database service environment according to some implementations. The pod 244 may be used to render services to a user of the on-demand database service environment 200. In some implementations, each pod may include a variety of servers and/or other systems. The pod 244 includes one or more content batch servers 264, content search servers 268, query servers 282, file force servers 286, access control system (ACS) servers 280, batch servers 284, and app servers 288. Also, the pod 244 includes database instances 290, quick file systems (QFS) 292, and indexers 294. In one or more implementations, some or all communication between the servers in the pod 244 may be transmitted via the switch 236.

In some implementations, the app servers 288 may include a hardware and/or software framework dedicated to the execution of procedures (e.g., programs, routines, scripts) for supporting the construction of applications provided by the on-demand database service environment 200 via the pod 244. In some implementations, the hardware and/or software framework of an app server 288 is configured to execute operations of the services described herein, including performance of the blocks of methods described with reference to FIGS. 15-27. In alternative implementations, two or more app servers 288 may be included and cooperate to perform such methods, or one or more other servers described herein can be configured to perform the disclosed methods.

The content batch servers 264 may handle requests internal to the pod. These requests may be long-running and/or not tied to a particular customer. For example, the content batch servers 264 may handle requests related to log mining, cleanup work, and maintenance tasks.

The content search servers 268 may provide query and indexer functions. For example, the functions provided by the content search servers 268 may allow users to search through content stored in the on-demand database service environment.

The file force servers 286 may manage requests for information stored in the Fileforce storage 298. The Fileforce storage 298 may store information such as documents, images, and basic large objects (BLOBs). By managing requests for information using the file force servers 286, the image footprint on the database may be reduced.

The query servers 282 may be used to retrieve information from one or more file systems. For example, the query system 282 may receive requests for information from the app servers 288 and then transmit information queries to the NFS 296 located outside the pod.

The pod 244 may share a database instance 290 configured as a multi-tenant environment in which different organizations share access to the same database. Additionally, services rendered by the pod 244 may call upon various hardware and/or software resources. In some implementations, the ACS servers 280 may control access to data, hardware resources, or software resources.

In some implementations, the batch servers 284 may process batch jobs, which are used to run tasks at specified times. Thus, the batch servers 284 may transmit instructions to other servers, such as the app servers 288, to trigger the batch jobs.

In some implementations, the QFS 292 may be an open source file system available from Sun Microsystems® of Santa Clara, Calif. The QFS may serve as a rapid-access file system for storing and accessing information available within the pod 244. The QFS 292 may support some volume management capabilities, allowing many disks to be grouped together into a file system. File system metadata can be kept on a separate set of disks, which may be useful for streaming applications where long disk seeks cannot be tolerated. Thus, the QFS system may communicate with one or more content search servers 268 and/or indexers 294 to identify, retrieve, move, and/or update data stored in the network file systems 296 and/or other storage systems.

In some implementations, one or more query servers 282 may communicate with the NFS 296 to retrieve and/or update information stored outside of the pod 244. The NFS 296 may allow servers located in the pod 244 to access information to access files over a network in a manner similar to how local storage is accessed.

In some implementations, queries from the query servers 222 may be transmitted to the NFS 296 via the load balancer 228, which may distribute resource requests over various resources available in the on-demand database service environment. The NFS 296 may also communicate with the QFS 292 to update the information stored on the NFS 296 and/or to provide information to the QFS 292 for use by servers located within the pod 244.

In some implementations, the pod may include one or more database instances 290. The database instance 290 may transmit information to the QFS 292. When information is transmitted to the QFS, it may be available for use by servers within the pod 244 without using an additional database call.

In some implementations, database information may be transmitted to the indexer 294. Indexer 294 may provide an index of information available in the database 290 and/or QFS 292. The index information may be provided to file force servers 286 and/or the QFS 292.

III. Tracking Updates to a Record Stored in a Database

As multiple users might be able to change the data of a record, it can be useful for certain users to be notified when a record is updated. Also, even if a user does not have authority to change a record, the user still might want to know when there is an update to the record. For example, a vendor may negotiate a new price with a salesperson of company X, where the salesperson is a user associated with tenant Y. As part of creating a new invoice or for accounting purposes, the salesperson can change the price saved in the database. It may be important for co-workers to know that the price has changed. The salesperson could send an e-mail to certain people, but this is onerous and the salesperson might not e-mail all of the people who need to know or want to know. Accordingly, some implementations of the disclosed techniques can inform others (e.g., co-workers) who want to know about an update to a record automatically.

Figure 3:
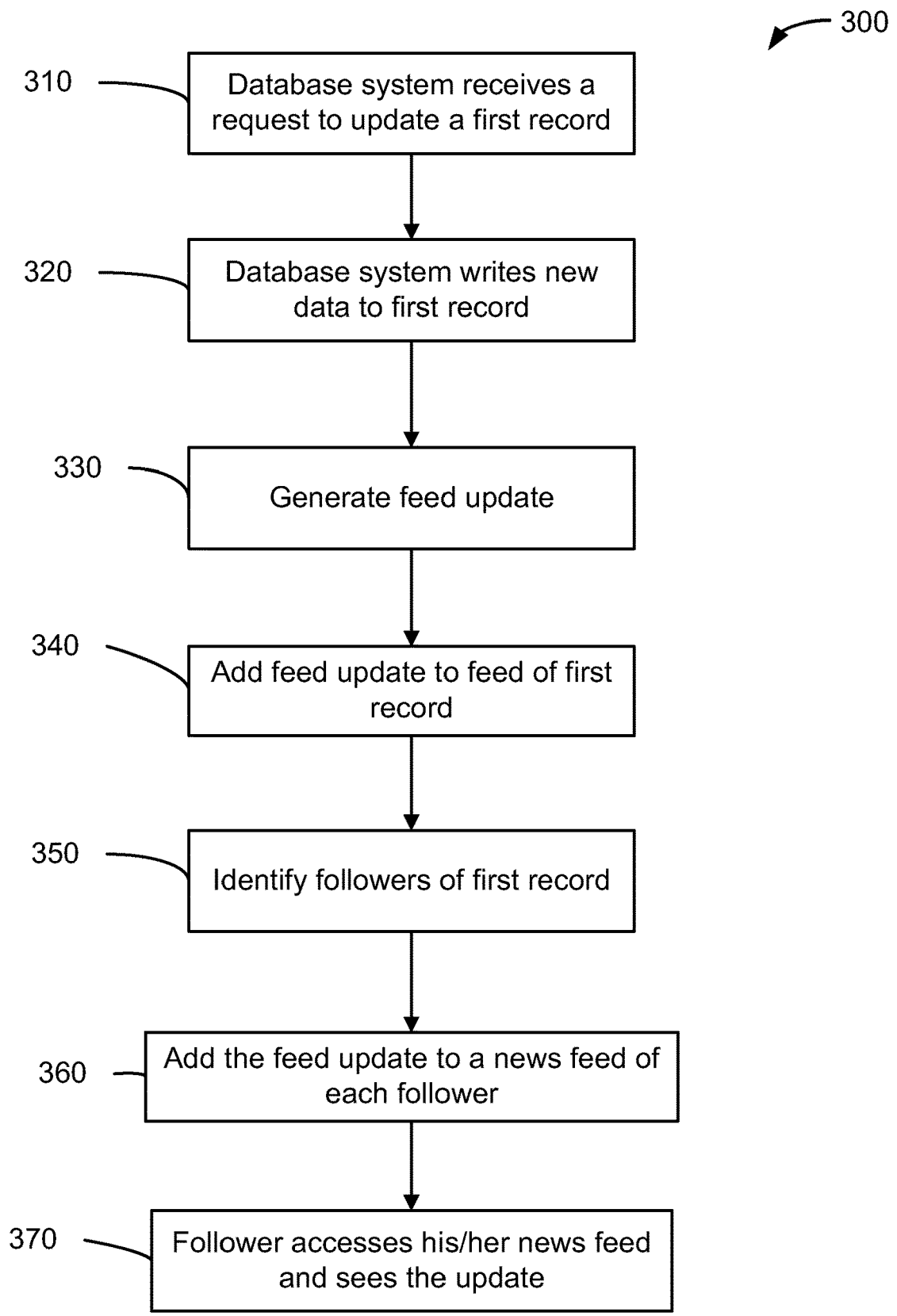
FIG. 3 shows a flowchart of an example of a method 300 for tracking updates to a record stored in a database system, performed in accordance with some implementations.

FIG. 3 shows a flowchart of an example of a method 300 for tracking updates to a record stored in a database system, performed in accordance with some implementations. Method 300 (and other methods described herein) may be implemented at least partially with multi-tenant database system 16, e.g., by one or more processors configured to receive or retrieve information, process the information, store results, and transmit the results. In other implementations, method 300 may be implemented at least partially with a single tenant database system. In various implementations, blocks may be omitted, combined, or split into additional blocks for method 300, as well as for other methods described herein.

In block 310, the database system receives a request to update a first record. In one implementation, the request is received from a first user. For example, a user may be accessing a page associated with the first record, and may change a displayed field and hit save. In another implementation, the database system can automatically create the request. For instance, the database system can create the request in response to another event, e.g., a request to change a field could be sent periodically at a particular date and/or time of day, or a change to another field or object. The database system can obtain a new value based on other fields of a record and/or based on parameters in the system.

The request for the update of a field of a record is an example of an event associated with the first record for which a feed tracked update may be created. In other implementations, the database system can identify other events besides updates to fields of a record. For example, an event can be a submission of approval to change a field. Such an event can also have an associated field (e.g., a field showing a status of whether a change has been submitted). Other examples of events can include creation of a record, deletion of a record, converting a record from one type to another (e.g., converting a lead to an opportunity), closing a record (e.g., a case type record), and potentially any other state change of a record—any of which could include a field change associated with the state change. Any of these events update the record whether by changing a field of the record, a state of the record, or some other characteristic or property of the record. In one implementation, a list of supported events for creating a feed tracked update can be maintained within the database system, e.g., at a server or in a database.

In block 320, the database system writes new data to the first record. In one implementation, the new data may include a new value that replaces old data. For example, a field is updated with a new value. In another implementation, the new data can be a value for a field that did not contain data before. In yet another implementation, the new data could be a flag, e.g., for a status of the record, which can be stored as a field of the record.

In some implementations, a "field" can also include records, which are child objects of the first record in a parent-child hierarchy. A field can alternatively include a pointer to a child record. A child object itself can include further fields. Thus, if a field of a child object is updated with a new value, the parent record also can be considered to have a field changed. In one example, a field could be a list of related child objects, also called a related list.

In block 330, a feed tracked update is generated about the update to the record. In one implementation, the feed tracked update is created in parts for assembling later into a display version. For example, event entries can be created and tracked in a first table, and changed field entries can be tracked in another table that is cross-referenced with the first table. More specifics of such implementations are provided later, e.g., with respect to FIG. 9A. In another implementation, the feed tracked update is automatically generated by the database system. The feed tracked update can convey in words that the first record has been updated and provide details about what was updated in the record and who performed the update. In some implementations, a feed tracked update is generated for only certain types of event and/or updates associated with the first record.

In one implementation, a tenant (e.g., through an administrator) can configure the database system to create (enable) feed tracked updates only for certain types of records. For example, an administrator can specify that records of designated types such as accounts and opportunities are enabled. When an update (or other event) is received for the enabled record type, then a feed tracked update would be generated. In another implementation, a tenant can also specify the fields of a record whose changes are to be tracked, and for which feed tracked updates are created. In one aspect, a maximum number of fields can be specified for tracking, and may include custom fields. In one implementation, the type of change can also be specified, for example, that the value change of a field is to be larger than a threshold (e.g., an absolute amount or a percentage change). In yet another implementation, a tenant can specify which events are to cause a generation of a feed tracked update. Also, in one implementation, individual users can specify configurations specific to them, which can create custom feeds as described in more detail below.

In one implementation, changes to fields of a child object are not tracked to create feed tracked updates for the parent record. In another implementation, the changes to fields of a child object can be tracked to create feed tracked updates for the parent record. For example, a child object of the parent type can be specified for tracking, and certain fields of the child object can be specified for tracking. As another example, if the child object is of a type specified for tracking, then a tracked change for the child object is propagated to parent records of the child object.

In block 340, the feed tracked update is added to a feed for the first record. In one implementation, adding the feed tracked update to a feed can include adding events to a table (which may be specific to a record or be for all or a group of objects), where a display version of a feed tracked update can be generated dynamically and presented in a GUI as a feed item when a user requests a feed for the first record. In another implementation, a display version of a feed tracked update can be added when a record feed is stored and maintained for a record. As mentioned above, a feed may be maintained for only certain records. In one implementation, the feed of a record can be stored in the database associated with the record. For example, the feed can be stored as a field (e.g., as a child object) of the record. Such a field can store a pointer to the text to be displayed for the feed tracked update.

In some implementations, only the current feed tracked update (or other current feed item) may be kept or temporarily stored, e.g., in some temporary memory structure. For example, a feed tracked update for only a most recent change to any particular field is kept. In other implementations, many previous feed tracked updates may be kept in the feed. A time and/or date for each feed tracked update can be tracked. Herein, a feed of a record is also referred to as an entity feed, as a record is an instance of a particular entity object of the database.

In block 350, followers of the first record can be identified. A follower is a user following the first record, such as a subscriber to the feed of the first record. In one implementation, when a user requests a feed of a particular record, such an identification of block 350 can be omitted. In another implementation where a record feed is pushed to a user (e.g., as part of a news feed), then the user can be identified as a follower of the first record. Accordingly, this block can include the identification of records and other objects being followed by a particular user.

In one implementation, the database system can store a list of the followers for a particular record. In various implementations, the list can be stored with the first record or associated with the record using an identifier (e.g., a pointer) to retrieve the list. For example, the list can be stored in a field of the first record. In another implementation, a list of the records that a user is following is used. In one implementation, the database system can have a routine that runs for each user, where the routine polls the records in the list to determine if a new feed tracked update has been added to a feed of the record. In another implementation, the routine for the user can be running at least partially on a user device, which contacts the database to perform the polling.

In block 360, in one implementation, the feed tracked update can be stored in a table, as described in greater detail below. When the user opens a feed, an appropriate query is sent to one or more tables to retrieve updates to records, also described in greater detail below. In some implementations, the feed shows feed tracked updates in reverse chronological order. In one implementation, the feed tracked update is pushed to the feed of a user, e.g., by a routine that determines the followers for the record from a list associated with the record. In another implementation, the feed tracked update is pulled to a feed, e.g., by a user device. This pulling may occur when a user requests the feed, as occurs in block 370. Thus, these actions may occur in a different order. The creation of the feed for a pull may be a dynamic creation that identifies records being followed by the requesting user, generates the display version of relevant feed tracked updates from stored information (e.g., event and field change), and adds the feed tracked updates into the feed. A feed of feed tracked updates of records and other objects that a user is following is also generally referred to herein as a news feed, which can be a subset of a larger information feed in which other types of information updates appear, such as posts.

In yet another implementation, the feed tracked update could be sent as an e-mail to the follower, instead of in a feed. In one implementation, e-mail alerts for events can enable people to be e-mailed when certain events occur. In another implementation, e-mails can be sent when there are posts on a user profile and posts on entities to which the user subscribes. In one implementation, a user can turn on/off email alerts for all or some events. In an implementation, a user can specify what kind of feed tracked updates to receive about a record that the user is following. For example, a user can choose to only receive feed tracked updates about certain fields of a record that the user is following, and potentially about what kind of update was performed (e.g., a new value input into a specified field, or the creation of a new field).

In block 370, a follower can access his/her news feed to see the feed tracked update. In one implementation, the user has just one news feed for all of the records that the user is following. In one aspect, a user can access his/her own feed by selecting a particular tab or other object on a page of an interface to the database system. Once selected the feed can be provided as a list, e.g., with an identifier (e.g., a time) or including some or all of the text of the feed tracked update. In another implementation, the user can specify how the feed tracked updates are to be displayed and/or sent to the user. For example, a user can specify a font for the text, a location of where the feed can be selected and displayed, amount of text to be displayed, and other text or symbols to be displayed (e.g., importance flags).

Figure 4:
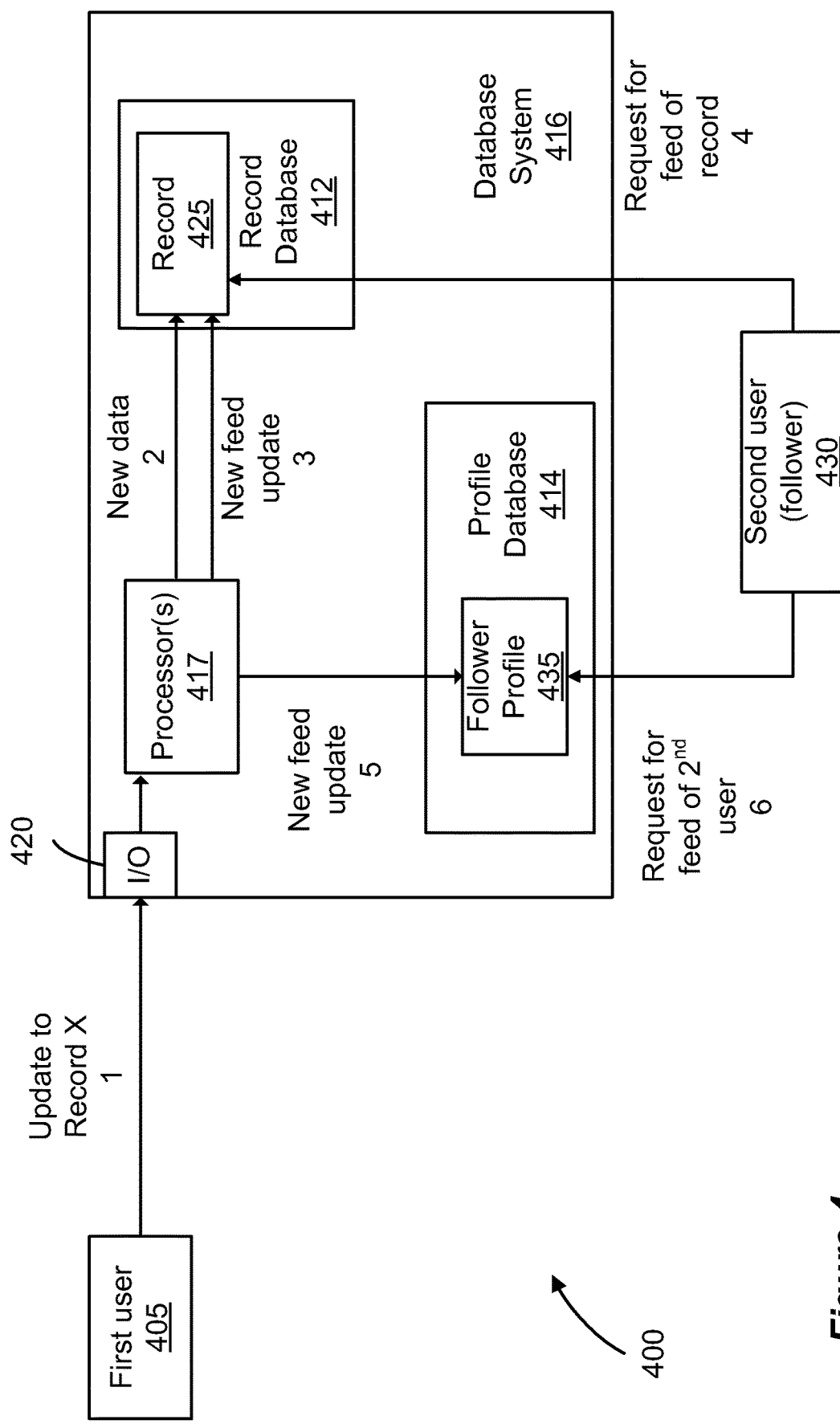
FIG. 4 shows a block diagram of an example of components of a database system configuration 400 performing a method for tracking an update to a record according to some implementations.

FIG. 4 shows a block diagram of an example of components of a database system configuration 400 performing a method for tracking an update to a record according to some implementations. Database system configuration 400 can perform implementations of method 300, as well as implementations of other methods described herein.

A first user 405 sends a request 1 to update record 425 in database system 416. Although an update request is described, other events that are being tracked are equally applicable. In various implementations, the request 1 can be sent via a user interface (e.g., 30 of FIG. 1B) or an application program interface (e.g., API 32). An I/O port 420 can accommodate the signals of request 1 via any input interface, and send the signals to one or more processors 417. The processor 417 can analyze the request and determine operations to be performed. Herein, any reference to a processor 417 can refer to a specific processor or any set of processors in database system 416, which can be collectively referred to as processor 417.

Processor 417 can determine an identifier for record 425, and send commands with the new data 2 of the request to record database 412 to update record 425. In one implementation, record database 412 is where tenant storage space 112 of FIG. 1B is located. The request 1 and new data commands 2 can be encapsulated in a single write transaction sent to record database 412. In one implementation, multiple changes to records in the database can be made in a single write transaction.

Processor 417 can also analyze request 1 to determine whether a feed tracked update is to be created, which at this point may include determining whether the event (e.g., a change to a particular field) is to be tracked. This determination can be based on an interaction (i.e., an exchange of data) with record database 412 and/or other databases, or based on information stored locally (e.g., in cache or RAM) at processor 417. In one implementation, a list of record types that are being tracked can be stored. The list may be different for each tenant, e.g., as each tenant may configure the database system to its own specifications. Thus, if the record 425 is of a type not being tracked, then the determination of whether to create a feed tracked update can stop there.

The same list or a second list (which can be stored in a same location or a different location) can also include the fields and/or events that are tracked for the record types in the first list. This list can be searched to determine if the event is being tracked. A list may also contain information having the granularity of listing specific records that are to be tracked (e.g., if a tenant can specify the particular records to be tracked, as opposed to just type).

As an example, processor 417 may obtain an identifier associated with record 425 (e.g., obtained from request 1 or database 412), potentially along with a tenant identifier, and cross-reference the identifier with a list of records for which feed tracked updates are to be created. Specifically, the record identifier can be used to determine the record type and a list of tracked types can be searched for a match. The specific record may also be checked if such individual record tracking was enabled. The name of the field to be changed can also be used to search a list of tracking-enabled fields. Other criteria besides field and events can be used to determine whether a feed tracked update is created, e.g., type of change in the field. If a feed tracked update is to be generated, processor 417 can then generate the feed tracked update.

In some implementations, a feed tracked update is created dynamically when a feed (e.g., the entity feed of record 425) is requested. Thus, in one implementation, a feed tracked update can be created when a user requests the entity feed for record 425. In this implementation, the feed tracked update may be created (e.g., assembled), including re-created, each time the entity feed is to be displayed to any user. In one implementation, one or more event history tables can keep track of previous events so that the feed tracked update can be re-created.

In another implementation, a feed tracked update can be created at the time the event occurs, and the feed tracked update can be added to a list of feed items. The list of feed items may be specific to record 425, or may be an aggregate of feed items including feed items for many records. Such an aggregate list can include a record identifier so that the feed items for the entity feed of record 425 can be easily retrieved. For example, after the feed tracked update has been generated, processor 417 can add the new feed tracked update 3 to a feed of record 425. As mentioned above, in one implementation, the feed can be stored in a field (e.g., as a child object) of record 425. In another implementation, the feed can be stored in another location or in another database, but with a link (e.g., a connecting identifier) to record 425. The feed can be organized in various ways, e.g., as a linked list, an array, or other data structure.

A second user 430 can access the new feed tracked update 3 in various ways. In one implementation, second user 430 can send a request 4 for the record feed. For example, second user 430 can access a home page (detail page) of the record 425 (e.g., with a query or by browsing), and the feed can be obtained through a tab, button, or other activation object on the page. The feed can be displayed on the screen or downloaded.

In another implementation, processor 417 can add the new feed tracked update 5 to a feed (e.g., a news feed) of a user that is following record 425. In one implementation, processor 417 can determine each of the followers of record 425 by accessing a list of the users that have been registered as followers. This determination can be done for each new event (e.g., update 1). In another implementation, processor 417 can poll (e.g., with a query) the records that second user 430 is following to determine when new feed tracked updates (or other feed items) are available. Processor 417 can use a follower profile 435 of second user 430 that can contain a list of the records that the second user 430 is following. Such a list can be contained in other parts of the database as well. Second user 430 can then send a request 6 to his/her profile 435 to obtain a feed, which contains the new feed tracked update. The user's profile 435 can be stored in a profile database 414, which can be the same or different than database 412.

In some implementations, a user can define a news feed to include new feed tracked updates from various records, which may be limited to a maximum number. In one implementation, each user has one news feed. In another implementation, the follower profile 435 can include the specifications of each of the records to be followed (with the criteria for what feed tracked updates are to be provided and how they are displayed), as well as the feed.

Some implementations can provide various types of record (entity) feeds. Entity Feeds can exist for record types like account, opportunity, case, and contact. An entity feed can tell a user about the actions that people have taken on that particular record or on one its related records. The entity feed can include who made the action, which field was changed, and the old and new values. In one implementation, entity feeds can exist on all supported records as a list that is linked to the specific record. For example, a feed could be stored in a field that allows lists (e.g., linked lists) or as a child object.

IV. Tracking Actions of a User

In addition to knowing about events associated with a particular record, it can be helpful for a user to know what a particular user is doing. In particular, it might be nice to know what the user is doing without the user having to generate the feed tracked update (e.g., a user submitting a synopsis of what the user has done). Accordingly, implementations can automatically track actions of a user that trigger events, and feed tracked updates can be generated for certain events.

Figure 5:
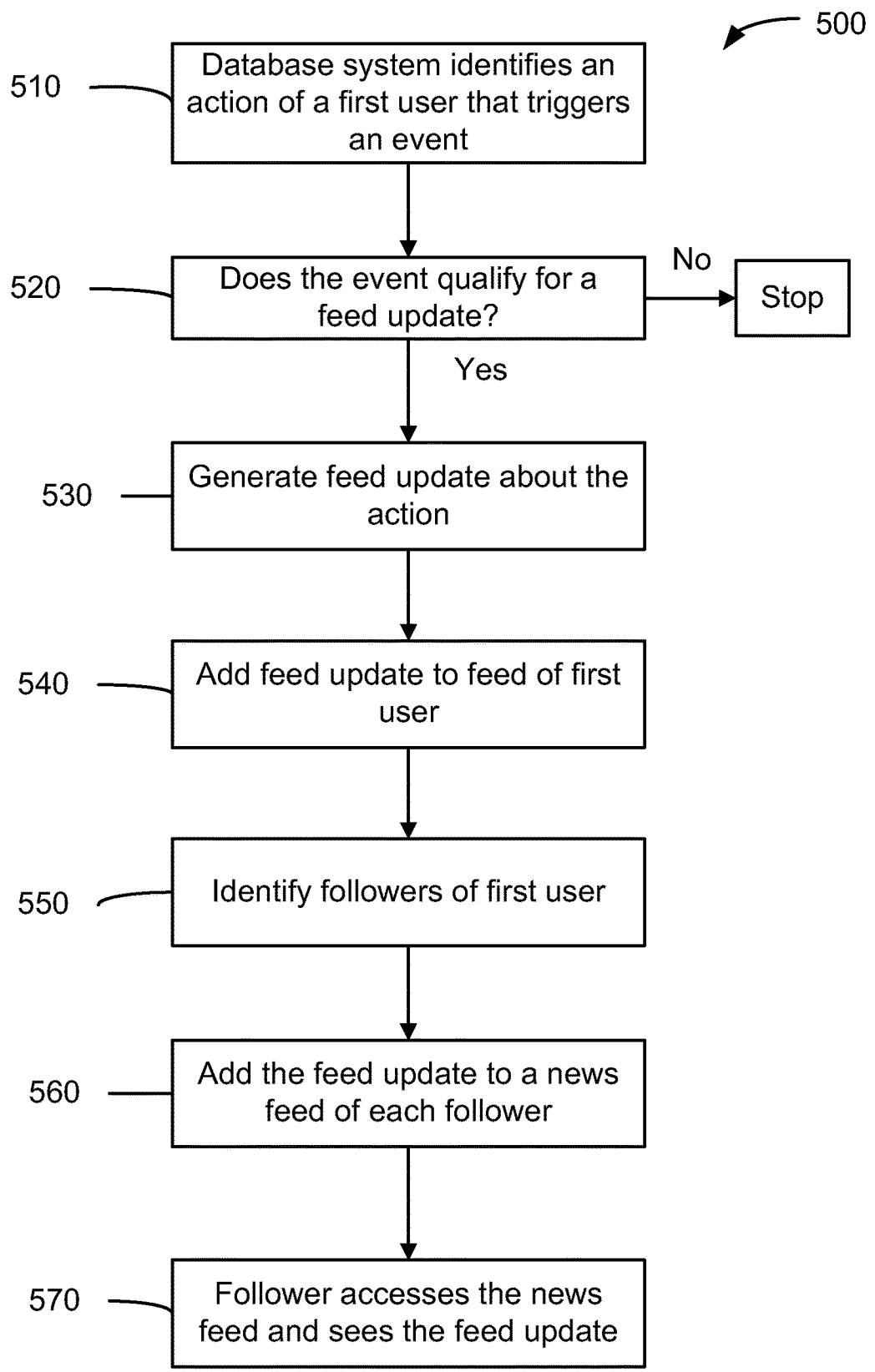
FIG. 5 shows a flowchart of an example of a method 500 for tracking actions of a user of a database system, performed in accordance with some implementations.

FIG. 5 shows a flowchart of an example of a method 500 for tracking actions of a user of a database system, performed in accordance with some implementations. Method 500 may be performed in addition to method 300. The operations of method 300, including order of blocks, can be performed in conjunction with method 500 and other methods described herein. Thus, a feed can be composed of changes to a record and actions of users.

In block 510, a database system (e.g., 16 of FIGS. 1A and 1B) identifies an action of a first user. In one implementation, the action triggers an event, and the event is identified. For example, the action of a user requesting an update to a record can be identified, where the event is receiving a request or is the resulting update of a record. The action may thus be defined by the resulting event. In another implementation, only certain types of actions (events) are identified. Which actions are identified can be set as a default or can be configurable by a tenant, or even configurable at a user level. In this way, processing effort can be reduced since only some actions are identified.

In block 520, it is determined whether the event qualifies for a feed tracked update. In one implementation, a predefined list of events (e.g., as mentioned herein) can be created so that only certain actions are identified. In one implementation, an administrator (or other user) of a tenant can specify the type of actions (events) for which a feed tracked update is to be generated. This block may also be performed for method 300.

In block 530, a feed tracked update is generated about the action. In an example where the action is an update of a record, the feed tracked update can be similar or the same as the feed tracked update created for the record. The description can be altered though to focus on the user as opposed to the record. For example, "John D. has closed a new opportunity for account XYZ" as opposed to "an opportunity has been closed for account XYZ."

In block 540, the feed tracked update is added to a profile feed of the first user when, e.g., the user clicks on a tab to open a page in a browser program displaying the feed. In one implementation, a feed for a particular user can be accessed on a page of the user's profile, in a similar manner as a record feed can be accessed on a detail page of the record. In another implementation, the first user may not have a profile feed and the feed tracked update may just be stored temporarily before proceeding. A profile feed of a user can be stored associated with the user's profile. This profile feed can be added to a news feed of another user.

In block 550, followers of the first user are identified. In one implementation, a user can specify which type of actions other users can follow. Similarly, in one implementation, a follower can select what actions by a user the follower wants to follow. In an implementation where different followers follow different types of actions, which users are followers of that user and the particular action can be identified, e.g., using various lists that track what actions and criteria are being followed by a particular user. In various implementations, the followers of the first user can be identified in a similar manner as followers of a record, as described above for block 350.

In block 560, the feed tracked update is added to a news feed of each follower of the first user when, e.g., the follower clicks on a tab to open a page displaying the news feed. The feed tracked update can be added in a similar manner as the feed items for a record feed. The news feed can contain feed tracked updates both about users and records. In another implementation, a user can specify what kind of feed tracked updates to receive about a user that the user is following. For example, a user could specify feed tracked updates with particular keywords, of certain types of records, of records owned or created by certain users, particular fields, and other criteria as mentioned herein.

In block 570, a follower accesses the news feed and sees the feed tracked update. In one implementation, the user has just one news feed for all of the records that the user is following. In another implementation, a user can access his/her own feed (i.e. feed about his/her own actions) by selecting a particular tab or other object on a page of an interface to the database system. Thus, a feed can include feed tracked updates about what other users are doing in the database system. When a user becomes aware of a relevant action of another user, the user can contact the co-worker, thereby fostering teamwork.

V. Generation of a Feed Tracked Update

As described above, some implementations can generate text describing events (e.g., updates) that have occurred for a record and actions by a user that trigger an event. A database system can be configured to generate the feed tracked updates for various events in various ways.

A. Which Events to Generate a Feed Tracked Update

In a database system, there are various events that can be detected. However, the operator of the database system and/or a tenant may not want to detect every possible event as this could be costly with regards to performance. Accordingly, the operator and/or the tenant can configure the database system to only detect certain events. For example, an update of a record may be an event that is to be detected.

Out of the events that are detected, a tenant (including a specific user of the tenant) may not want a feed tracked update about each detected event. For example, all updates to a record may be identified at a first level. Then, based on specifications of an administrator and/or a specific user of a tenant, another level of inquiry can be made as to whether a feed tracked update is to be generated about the detected event. For example, the events that qualify for a feed tracked update can be restricted to changes for only certain fields of the record, and can differ depending on which user is receiving the feed. In one implementation, a database system can track whether an event qualifies for a feed tracked update for any user, and once the feed tracked update is generated, it can be determined who is to receive the feed tracked update.

Supported events (events for which a feed tracked update is generated) can include actions for standard fields, custom fields, and standard related lists. Regarding standard fields, for the entity feed and the profile feed, a standard field update can trigger a feed tracked update to be presented in that feed. In one implementation, which standard field can create a feed tracked update can be set by an administrator to be the same for every user. In another implementation, a user can set which standard fields create a feed tracked update for that user's news feed. Custom fields can be treated the same or differently than standard fields.

The generation of a feed item can also depend on a relationship of an object to other objects (e.g., parent-child relationships). For example, if a child object is updated, a feed tracked update may be written to a feed of a parent of the child object. The level of relationship can be configured, e.g., only 1 level of separation (i.e. no grandparent-grandchild relationship). Also, in one implementation, a feed tracked update is generated only for objects above the objects being updated, i.e., a feed tracked update is not written for a child when the parent is updated.

In some implementations, for related lists of a record, a feed tracked update is written to its parent record (1 level only) when the related list item is added, and not when the list item is changed or deleted. For example: user A added a new opportunity XYZ for account ABC. In this manner, entity feeds can be controlled so as not to be cluttered with feed tracked updates about changes to their related items. Any changes to the related list item can be tracked on their own entity feed, if that related list item has a feed on it. In this implementation, if a user wants to see a feed of the related list item then the user can subscribe to it. Such a subscription might be when a user cares about a specific opportunity related to a specific account. A user can also browse to that object's entity feed. Other implementations can create a feed tracked update when a related entity is changed or deleted.

In one implementation, an administrator (of the system or of a specific tenant) can define which events of which related objects are to have feed tracked updates written about them in a parent record. In another implementation, a user can define which related object events to show. In one implementation, there are two types of related lists of related objects: first class lookup and second class lookup. Each of the records in the related lists can have a different rule for whether a feed tracked update is generated for a parent record. Each of these related lists can be composed as custom related lists. In various implementations, a custom related list can be composed of custom objects; the lists can contain a variety of records or items (e.g., not restricted to a particular type of record or item), and can be displayed in a customized manner.

In one implementation, a first class lookup contains records of a child record that can exist by itself. For example, the contacts on an account exist as a separate record and also as a child record of the account. In another implementation, a record in a first class lookup can have its own feed, which can be displayed on its detail page.

In one implementation, a second class lookup can have line items existing only in the context of their parent record (e.g., activities on an opportunity, contact roles on opportunity/contact). In one implementation, the line items are not objects themselves, and thus there is no detail page, and no place to put a feed. In another implementation, a change in a second class lookup can be reported on the feed of the parent.

Some implementations can also create feed tracked updates for dependent field changes. A dependent field change is a field that changes value when another field changes, and thus the field has a value that is dependent on the value of the other field. For example, a dependent field might be a sum (or other formula) that totals values in other fields, and thus the dependent field would change when one of the fields being summed changes. Accordingly, in one implementation, a change in one field could create feed tracked updates for multiple fields. In other implementations, feed tracked updates are not created for dependent fields.

B. How the Feed Tracked Update is Generated

After it is determined that a feed tracked update is going to be generated, some implementations can also determine how the feed tracked update is generated. In one implementation, different methods can be used for different events, e.g., in a similar fashion as for the configurability of which events feed tracked updates are generated. A feed tracked update can also include a description of multiple events (e.g., john changed the account status and amount).

In one implementation, the feed tracked update is a grammatical sentence, thereby being easily understandable by a person. In another implementation, the feed tracked update provides detailed information about the update. In various examples, an old value and new value for a field may be included in the feed tracked update, an action for the update may be provided (e.g., submitted for approval), and the names of particular users that are responsible for replying or acting on the feed tracked update may be also provided. The feed tracked update can also have a level of importance based on settings chosen by the administrator, a particular user requesting an update, or by a following user who is to receive the feed tracked update, which fields is updated, a percentage of the change in a field, the type of event, or any combination of these factors.

The system may have a set of heuristics for creating a feed tracked update from the event (e.g., a request to update). For example, the subject may be the user, the record, or a field being added or changed. The verb can be based on the action requested by the user, which can be selected from a list of verbs (which may be provided as defaults or input by an administrator of a tenant). In one implementation, feed tracked updates can be generic containers with formatting restrictions, As an example of a feed tracked update for a creation of a new record, "Mark Abramowitz created a new Opportunity for IBM-20,000 laptops with Amount as $3.5 M and Sam Palmisano as Decision Maker." This event can be posted to the profile feed for Mark Abramowitz and the entity feed for record of Opportunity for IBM-20,000 laptops. The pattern can be given by (AgentFullName) created a new (ObjectName)(RecordName) with [(FieldName) as (FieldValue) [, / and] ]* [[added/changed/removed] (RelatedListRecordName) [as/to/as] (RelatedListRecordValue) [, / and] ]*. Similar patterns can be formed for a changed field (standard or custom) and an added child record to a related list.

VI. Tracking Commentary from or about a User

Some implementations can also have a user submit text, instead of the database system generating a feed tracked update. As the text is submitted as part or all of a message by a user, the text can be about any topic. Thus, more information than just actions of a user and events of a record can be conveyed. In one implementation, the messages can be used to ask a question about a particular record, and users following the record can provide comments and responses.

Figure 6:
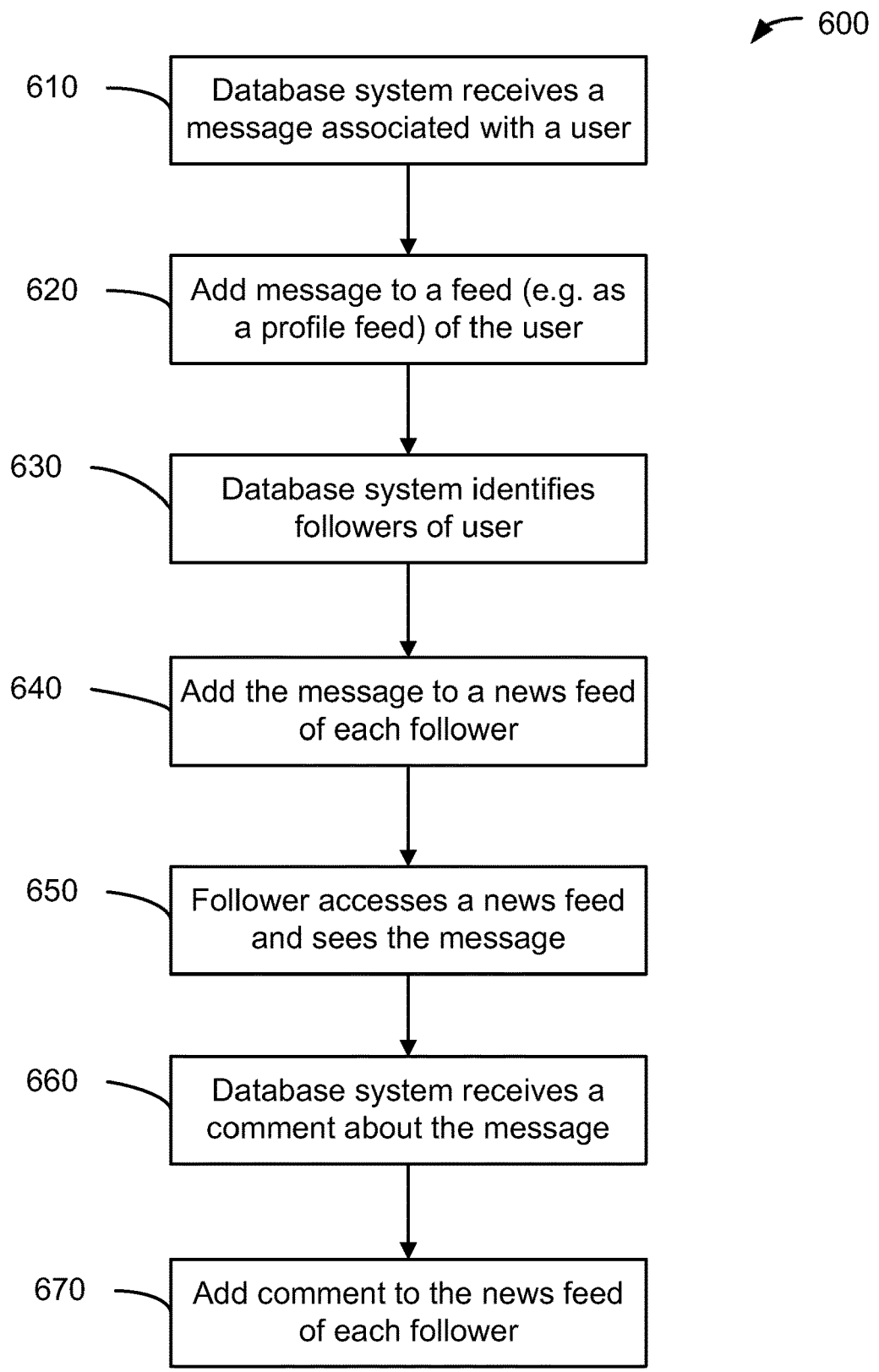
FIG. 6 shows a flowchart of an example of a method 600 for creating a news feed from messages created by a user about a record or another user, performed in accordance with some implementations.

FIG. 6 shows a flowchart of an example of a method 600 for creating a news feed from messages created by a user about a record or another user, performed in accordance with some implementations. In one implementation, method 600 can be combined with methods 300 and 500. In one aspect, a message can be associated with the first user when the first user creates the message (e.g., a post or comment about a record or another user). In another aspect, a message can be associated with the first user when the message is about the first user (e.g., posted by another user on the first user's profile feed).

In block 610, the database system receives a message (e.g., a post or status update) associated with a first user. The message (e.g., a post or status update) can contain text and/or multimedia content submitted by another user or by the first user. In one implementation, a post is for a section of the first user's profile page where any user can add a post, and where multiple posts can exist. Thus, a post can appear on the first user's profile page and can be viewed when the first user's profile is visited. For a message about a record, the post can appear on a detail page of a record. Note the message can appear in other feeds as well. In another implementation, a status update about the first user can only be added by the first user. In one implementation, a user can only have one status message.

In block 620, the message is added to a table, as described in greater detail below. When the feed is opened, a query filters one or more tables to identify the first user, identify other persons that the user is following, and retrieve the message. Messages and record updates are presented in a combined list as the feed. In this way, in one implementation, the message can be added to a profile feed of the first user, which is associated (e.g., as a related list) with the first user's profile. In one implementation, the posts are listed indefinitely. In another implementation, only the most recent posts (e.g., last 50) are kept in the profile feed. Such implementations can also be employed with feed tracked updates. In yet another implementation, the message can be added to a profile of the user adding the message.

In block 630, the database system identifies followers of the first user. In one implementation, the database system can identify the followers as described above for method 500. In various implementations, a follower can select to follow a feed about the actions of the first user, messages about the first user, or both (potentially in a same feed).

In block 640, the message is added to a news feed of each follower. In one implementation, the message is only added to a news feed of a particular follower if the message matches some criteria, e.g., the message includes a particular keyword or other criteria. In another implementation, a message can be deleted by the user who created the message. In one implementation, once deleted by the author, the message is deleted from all feeds to which the message had been added.

In block 650, the follower accesses a news feed and sees the message. For example, the follower can access a news feed on the follower's own profile page. As another example, the follower can have a news feed sent to his/her own desktop without having to first go to a home page.

In block 660, the database system receives a comment about the message. The database system can add the comment to a feed of the same first user, much as the original message was added. In one implementation, the comment can also be added to a feed of a second user who added the comment. In one implementation, users can also reply to the comment. In another implementation, users can add comments to a feed tracked update, and further comments can be associated with the feed tracked update. In yet another implementation, making a comment or message is not an action to which a feed tracked update is created. Thus, the message may be the only feed item created from such an action.

In one implementation, if a feed tracked update or post is deleted, its corresponding comments are deleted as well. In another implementation, new comments on a feed tracked update or post do not update the feed tracked update timestamp. Also, the feed tracked update or post can continue to be shown in a feed (profile feed, record feed, or news feed) if it has had a comment within a specified timeframe (e.g., within the last week). Otherwise, the feed tracked update or post can be removed in an implementation.

In some implementations, all or most feed tracked updates can be commented on. In other implementations, feed tracked updates for certain records (e.g., cases or ideas) are not commentable. In various implementations, comments can be made for any one or more records of opportunities, accounts, contacts, leads, and custom objects.

In block 670, the comment is added to a news feed of each follower. In one implementation, a user can make the comment within the user's news feed. Such a comment can propagate to the appropriate profile feed or record feed, and then to the news feeds of the following users. Thus, feeds can include what people are saying, as well as what they are doing. In one aspect, feeds are a way to stay up-to-date (e.g., on users, opportunities, etc.) as well as an opportunity to reach out to co-workers/partners and engage them around common goals.

In some implementations, users can rate feed tracked updates or messages (including comments). A user can choose to prioritize a display of a feed so that higher rated feed items show up higher on a display. For example, in an implementation where comments are answers to a specific question, users can rate the different status posts so that a best answer can be identified. As another example, users are able to quickly identify feed items that are most important as those feed items can be displayed at a top of a list. The order of the feed items can be based on an importance level (which can be determined by the database system using various factors, some of which are mentioned herein) and based on a rating from users. In one implementation, the rating is on a scale that includes at least 3 values. In another implementation, the rating is based on a binary scale.

Besides a profile for a user, a group can also be created. In various implementations, the group can be created based on certain criteria that are common to the users, can be created by inviting users, or can be created by receiving requests to join from a user. In one implementation, a group feed can be created, with messages being added to the group feed when someone adds a message to the group as a whole. For example, a group page may have a section for posts. In another implementation, a message can be added to a group feed when a message is added about any one of the members. In yet another implementation, a group feed can include feed tracked updates about actions of the group as a whole (e.g., when an administrator changes data in a group profile or a record owned by the group), or about actions of an individual member.

Figure 7:
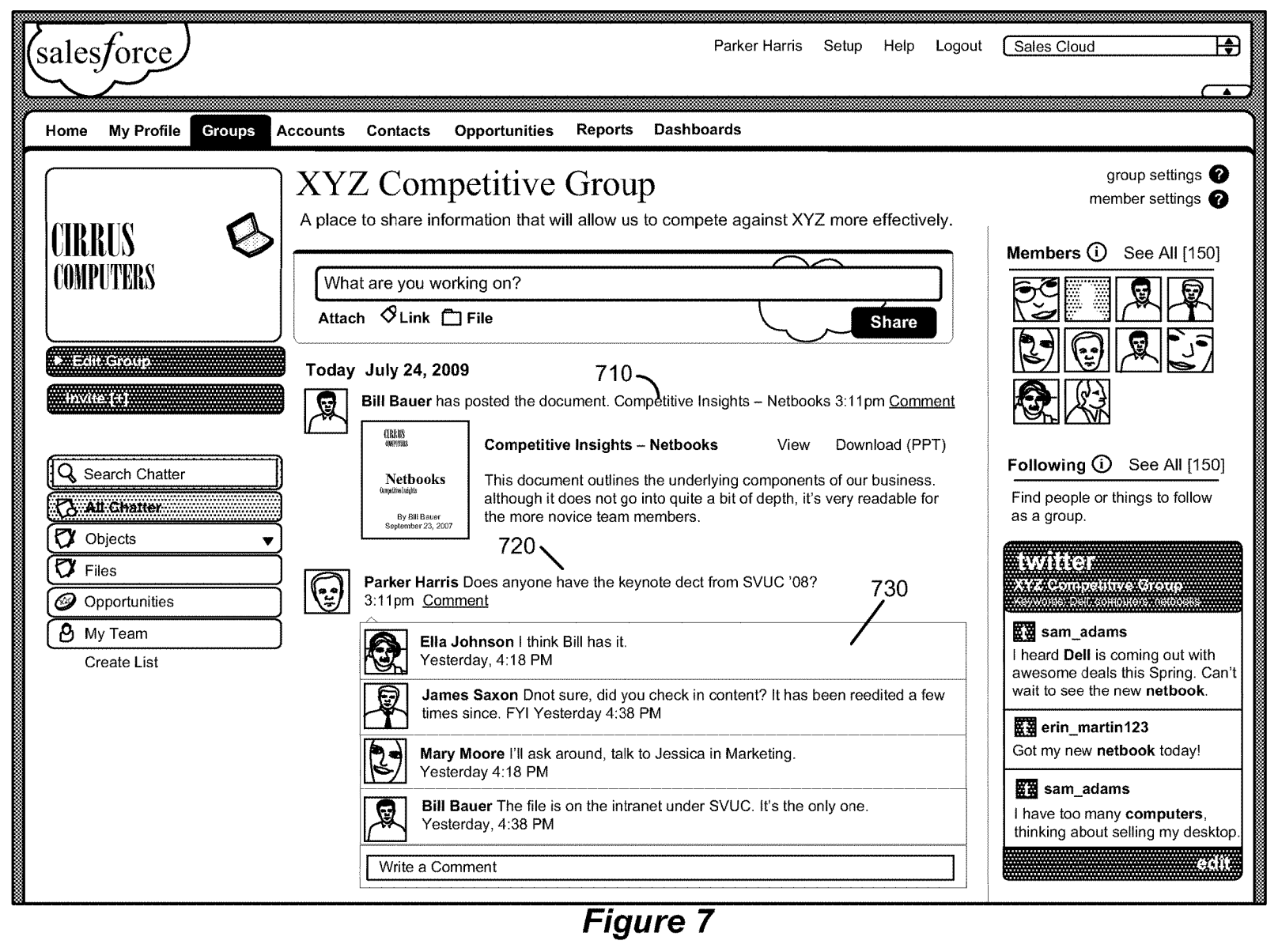

FIG. 7 shows an example of a group feed on a group page according to some implementations. As shown, a feed item 710 shows that a user has posted a document to the group object. The text "Bill Bauer has posted the document Competitive Insights" can be generated by the database system in a similar manner as feed tracked updates about a record being changed. A feed item 720 shows a post to the group, along with comments 730 from Ella Johnson, James Saxon, Mary Moore and Bill Bauer.

Figure 8:
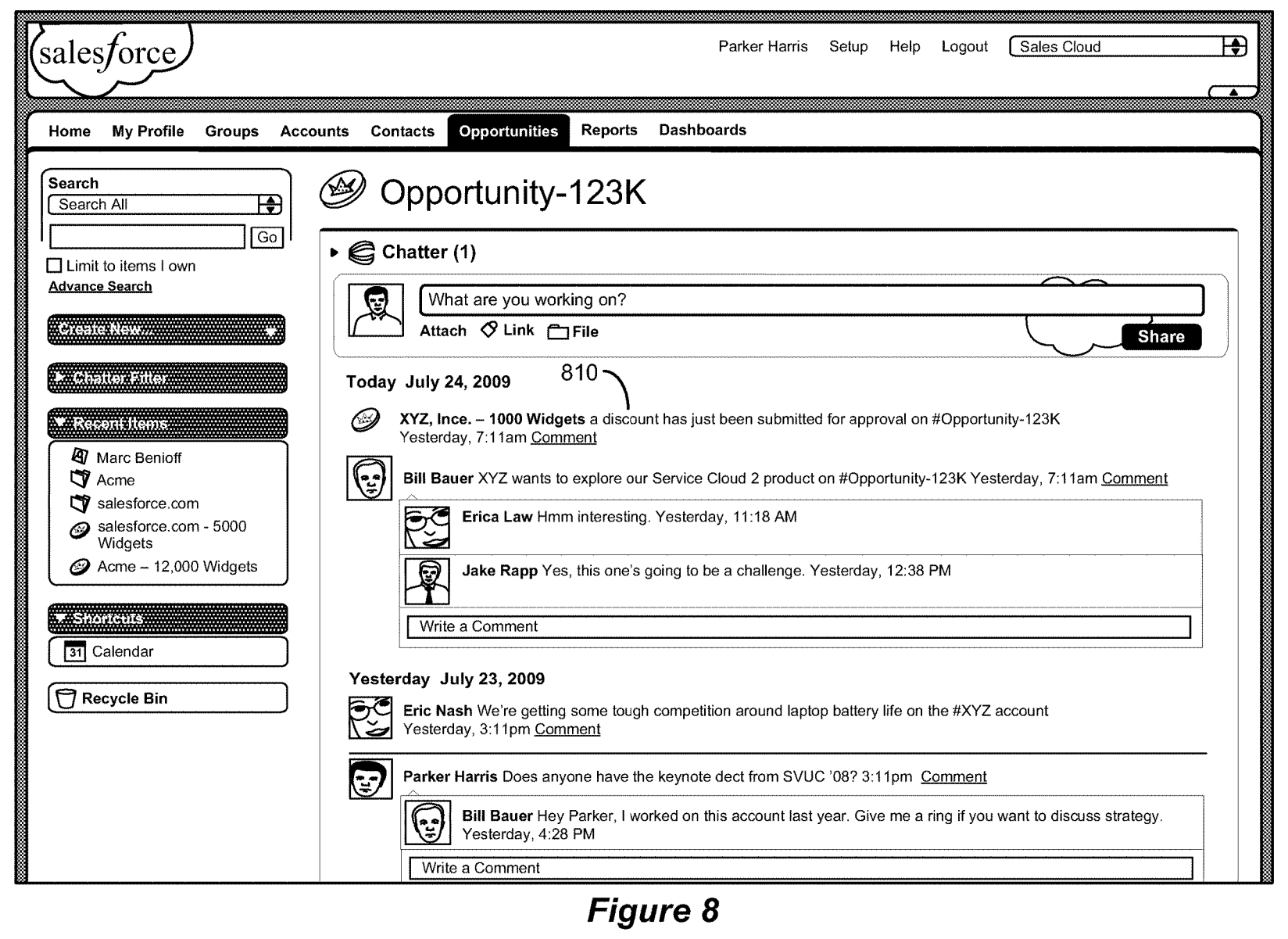

FIG. 8 shows an example of a record feed containing a feed tracked update, post, and comments according to some implementations. Feed item 810 shows a feed tracked update based on the event of submitting a discount for approval. Other feed items show posts, e.g., from Bill Bauer, that are made to the record and comments, e.g., from Erica Law and Jake Rapp, that are made on the posts.

VII. Infrastructure for a Feed

A. Tables Used to Create a Feed

FIG. 9A shows an example of a plurality of feed tracked update tables that may be used in tracking events and creating feeds according to some implementations. The tables of FIG. 9A may have entries added, or potentially removed, as part of tracking events in the database from which feed items are creates or that correspond to feed items. In one implementation, each tenant has its own set of tables that are created based on criteria provided by the tenant.

An event history table 910 can provide a feed tracked update of events from which feed items are created. In one aspect, the events are for objects that are being tracked. Thus, table 910 can store and change feed tracked updates for feeds, and the changes can be persisted. In various implementations, event history table 910 can have columns of event ID 911, object ID 912 (also called parent ID), and created by ID 913. The event ID 911 can uniquely identify a particular event and can start at 1 (or other number or value).

Each new event can be added chronologically with a new event ID, which may be incremented in order. An object ID 912 can be used to track which record or user's profile is being changed. For example, the object ID can correspond to the record whose field is being changed or the user whose feed is receiving a post. The created by ID 913 can track the user who is performing the action that results in the event, e.g., the user that is changing the field or that is posting a message to the profile of another user.

In some other implementations, event history table 910 can have one or more of the following variables with certain attributes: ORGANIZATION_ID being CHAR(15 BYTE), FEEDS_ENTITY_HIFEED TRACKED UPDATE_ID being CHAR(15 BYTE), PARENT_ID being CHAR(15 BYTE), CREATED_BY being CHAR(15 BYTE), CREATED_DATE being a variable of type DATE, DIVISION being a NUMBER, KEY_PREFIX being CHAR(3 BYTE), and DELETED being CHAR(1 BYTE). The parent ID can provide an ID of a parent object in case the change is promulgated to the parent. The key prefix can provide a key that is unique to a group of records, e.g., custom records (objects). The deleted variable can indicate that the feed items for the event are deleted, and thus the feed items are not generated. In one implementation, the variables for each event entry or any entry in any of the tables may not be nullable. In another implementation, all entries in the event history table 910 are used to create feed items for only one object, as specified by the object ID 912. For example, one feed tracked update cannot communicate updates on two records, such as updates of an account field and an opportunity field.

In one implementation, a name of an event can also be stored in table 910. In one implementation, a tenant can specify events that they want tracked. In an implementation, event history table 910 can include the name of the field that changed (e.g., old and new values). In another implementation, the name of the field, and the values, are stored in a separate table. Other information about an event (e.g., text of comment, feed tracked update, post or status update) can be stored in event history table 910, or in other tables, as is now described.

A field change table 920 can provide a feed tracked update of the changes to the fields. The columns of table 920 can include an event ID 921 (which correlates to the event ID 911), an old value 922 for the field, and the new value 923 for the field. In one implementation, if an event changes more than one field value, then there can be an entry for each field changed. As shown, event ID 921 has two entries for event E37.

In some other implementations, field change table 920 can have one or more of the following variables with certain attributes: ORGANIZATION_ID being CHAR(15 BYTE), FEEDS_ENTITY_HIFEED TRACKED UPDATE_FIELDS_ID being CHAR(15 BYTE) and identifying each entry, FEEDS_ENTITY_HIFEED TRACKED UPDATE_ID being CHAR(15 BYTE), FIELD_KEY being VARCHAR2 (120 BYTE), DATA_TYPE being CHAR(1 BYTE), OLDVAL_STRING VARCHAR2 being (765 BYTE), NEWVAL_STRING being VARCHAR2(765 BYTE), OLDVAL_FIRST_NAME being VARCHAR2(765 BYTE), NEWVAL_FIRST_NAME being VARCHAR2(765 BYTE), OLDVAL_LAST_NAME being VARCHAR2(765 BYTE), NEWVAL_LAST_NAME being VARCHAR2(765 BYTE), OLDVAL_NUMBER being NUMBER, NEWVAL_NUMBER being NUMBER, OLDVAL_DATE being DATE, NEWVAL_DATE being DATE, and DELETED being CHAR(1 BYTE). In one implementation, one or more of the variables for each entry in any of the tables may be nullable.

In one implementation, the data type variable (and/or other variables) is a non-API-insertable field. In another implementation, variable values can be derived from the record whose field is being changed. Certain values can be transferred into typed columns old/new value string, old/new value number or old/new value date depending upon the derived values. In another implementation, there can exist a data type for capturing add/deletes for child objects. The child ID can be tracked in the foreign-key column of the record. In yet another implementation, if the field name is pointing to a field in the parent entity, a field level security (FLS) can be used when a user attempts to a view a relevant feed item. Herein, security levels for objects and fields are also called access checks and determinations of authorization. In one aspect, the access can be for create, read, write, update, or delete of objects.

In one implementation, the field name (or key) can be either a field name of the entity or one of the values in a separate list. For example, changes that do not involve the update of an existing field (e.g., a close or open) can have a field name specified in an enumerated list. This enumerated list can store "special" field name sentinel values for non-update actions that a tenant wants to track. In one aspect, the API just surfaces these values and the caller has to check the enumerated values to see if it is a special field name.

A comment table 930 can provide a feed tracked update of the comments made regarding an event, e.g., a comment on a post or a change of a field value. The columns of table 930 can include an event ID 921 (which correlates to the event ID 911), the comment column 932 that stores the text of the comment, and the time/date 933 of the comment. In one implementation, there can be multiple comments for each event. As shown, event ID 921 has two entries for event E37.

In some other implementations, comment table 930 can have one or more of the following variables with certain attributes: ORGANIZATION_ID being CHAR(15 BYTE), FEEDS_COMMENTS_ID being CHAR(15 BYTE) and uniquely identifying each comment, PARENT_ID being CHAR(15 BYTE), CREATED_BY being CHAR(15 BYTE), CREATED_DATE being DATE, COMMENTS being VARCHAR2(420 BYTE), and DELETED being CHAR(1 BYTE).

A user subscription table 940 can provide a list of the objects being followed (subscribed to) by a user. In one implementation, each entry has a user ID 941 of the user doing the following and one object ID 942 corresponding to the object being followed. In one implementation, the object being followed can be a record or a user. As shown, the user with ID U819 is following object IDs O615 and O489. If user U819 is following other objects, then additional entries may exist for user U819. Also as shown, user U719 is also following object O615. The user subscription table 940 can be updated when a user adds or deletes an object that is being followed.

In some other implementations, user subscription table 940 can be composed of two tables (one for records being followed and one for users being followed). One table can have one or more of the following variables with certain attributes: ORGANIZATION_ID being CHAR(15 BYTE), ENTITY_SUBSCRIPTION_ID being CHAR(15 BYTE), PARENT_ID being CHAR(15 BYTE), CREATED_BY being CHAR(15 BYTE), CREATED_DATE being DATE, and DELETED being CHAR(1 BYTE). Another table can have one or more of the following variables with certain attributes: ORGANIZATION_ID being CHAR(15 BYTE), USER_SUBSCRIPTIONS_ID being CHAR(15 BYTE), USER_ID being CHAR(15 BYTE), CREATED_BY being CHAR(15 BYTE), and CREATED_DATE being DATE.

In one implementation, regarding a profile feed and a news feed, these are read-only views on the event history table 910 specialized for these feed types. Conceptually the news feed can be a semi-join between the user subscription table 940 and the event history table 910 on the object IDs 912 and 942 for the user. In one aspect, these entities can have polymorphic parents and can be subject to a number of restrictions detailed herein, e.g., to limit the cost of sharing checks.

In one implementation, entity feeds are modeled in the API as a feed associate entity (e.g., AccountFeed, CaseFeed, etc). A feed associate entity includes information composed of events (e.g., event IDs) for only one particular record type. Such a list can limit the query (and sharing checks) to a specific record type. In one aspect, this structuring of the entity feeds can make the query run faster. For example, a request for a feed of a particular account can include the record type of account. In one implementation, an account feed table can then be searched, where the table has account record IDs and corresponding event IDs or pointers to particular event entries in event history table 910. Since the account feed table only contains some of the records (not all), the query can run faster.

In one implementation, there may be objects with no events listed in the event history table 910, even though the record is being tracked. In this case, the database service can return a result indicating that no feed items exist.

In another implementation, tables can also exist for audit tracking, e.g., to examine that operations of the system (e.g., access checks) are performing accurately. In one implementation, audit change-event history tables can be persisted (e.g., in bulk) synchronously in the same transaction as feed events are added to event history table 910. In another implementation, entries to the two sets of table can be persisted in asynchronous manner (e.g., by forking a bulk update into a separate java thread). In one aspect, some updates to any of the tables can get lost if the instance of the table goes down while the update has not yet finished. This asynchronous manner can limit an impact performance on save operations. In some implementations, a field "persistence type" (tri state: AUDIT, FEEDS or BOTH) can be added to capture user preferences, as opposed to being hard coded.

B. Feed Item

A feed item can represent an individual field change of a record, creation and deletion of a record, or other events being tracked for a record or a user. In one implementation, all of the feed items in a single transaction (event) can be grouped together and have the same event ID. A single transaction relates to the operations that can be performed in a single communication with the database. In another implementation where a feed is an object of the database, a feed item can be a child of a profile feed, news feed, or entity feed. If a feed item is added to multiple feeds, the feed item can be replicated as a child of each feed to which the feed item is added.

In one implementation, a feed item is visible only when its parent feed is visible, which can be the same as needing read access on the feed's parent (which can be by the type of record or by a specific record). The feed item's field may be only visible when allowed under field-level security (FLS). Unfortunately, this can mean that the parent feed may be visible, but the child may not be because of FLS. Such access rules are described in more detail below. In one implementation, a feed item can be read-only. In this implementation, after being created, the feed item cannot be changed.

In multi-currency organizations, a feed item can have an extra currency code field. This field can give the currency code for the currency value in this field. In one aspect, the value is undefined when the data type is anything other than currency.

C. Feed Comment

In some implementations, a comment exists as an item that depends from feed tracked updates, posts, status updates, and other items that are independent of each other. Thus, a feed comment object can exist as a child object of a feed item object. For example, comment table 930 can be considered a child table of event history table 910. In one implementation, a feed comment can be a child of a profile feed, news feed, or entity feed that is separate from other feed items.

In various implementations, a feed comment can have various permissions for the following actions. For read permission, a feed comment can be visible if the parent feed is visible. For create permission, if a user has access to the feed (which can be tracked by the ID of the parent feed), the user can add a comment. For delete, only a user with modify all data permission or a user who added the comment can delete the comment. Also delete permission can involve access on the parent feed. An update of a comment can be restricted, and thus not be allowed.

In one implementation, regarding a query restriction, a feed comment cannot be queried directly, but can be queried only via the parent feed. An example is "select id, parentid, (select . . . from feedcomment) from entityfeed". In another implementation, a feed comment can be directly queries, e.g., by querying comment table 930. A query could include the text of a comment or any other column of the table.

In another implementation, regarding soft delete behavior, a feed comment table does not have a soft delete column. A soft delete allows an undelete action. In one implementation, a record can have a soft delete. Thus, when the record is deleted, the feed (and its children) can be soft deleted. Therefore, in one aspect, a feed comment cannot be retrieved via the "query" verb (which would retrieve only the comment), but can be retrieved via "queryAll" verb though. An example is queryAll("select id, (select id, commentbody from feedcomments) from accountfeed where parentid='001x000xxx3MkADAA0'"); // where '001x000xxx3MkADAA0' has been soft deleted. When a hard delete (a physical delete) happens, the comment can be hard deleted from the database.

In one implementation, regarding an implicit delete, feeds with comments are not deleted by a reaper (a routine that performs deletion). In another implementation, a user cannot delete a feed. In yet another implementation, upon lead convert (e.g., to an opportunity or contact), the feed items of the lead can be hard deleted. This implementation can be configured to perform such a deletion for any change in record type. In various implementations, only the comments are hard deleted upon a lead convert, other convert, or when the object is deleted (as mentioned above).

In one implementation, viewing a feed pulls up the most recent messages or feed tracked updates (e.g., 25) and searches the most recent (e.g., 4) comments for each feed item. The comments can be identified via the comment table 930. In one implementation, a user can request to see more comments, e.g., by selecting a see more link.

In some implementations, user feeds and/or entity feeds have a last comment date field. In various implementations, the last comment date field is stored as a field of a record or a user profile. For feeds with no comments, this can be the same as the created date. Whenever a new comment is created, the associated feed's last comment date can be updated with the created date of the comment. The last comment date is unchanged if a feed comment is deleted. A use case is to allow people to order their queries to see the feeds, which have been most recently commented on.

D. Creating Custom Feeds by Customizing the Event History Table

In some implementations, a tenant (e.g., through an administrator) or a specific user of a tenant can specify the types of events for which feed items are created. A user can add more events or remove events from a list of events that get added to the event history table 910. In one implementation, a trigger can be added as a piece of code, rule, or item on a list for adding a custom event to the event history table 910. These custom events can provide customers the ability to create their own custom feeds and custom feed items to augment or replace implicitly generated feeds via event history table 910. Implicitly generated feed data can be created when feed-tracking is enabled for certain entities/field-names. In one implementation, in order to override implicit feeds, feed tracking can be turned off and then triggers can be defined by the user to add events to the event history table 910. In other implementations, users are not allowed to override the default list of events that are added to table 910, and thus cannot define their own triggers for having events tracked.

For example, upon lead convert or case close, a default action to be taken by the system may be to add multiple events to event history table 910. If a customer (e.g., a tenant or a specific user) does not want each of these events to show up as feed items, the customer can turn off tracking for the entities and generate custom feeds by defining customized triggers (e.g., by using an API) upon the events. As another example, although data is not changed, a customer may still want to track an action on a record (e.g., status changes if not already being tracked, views by certain people, retrieval of data, etc.).

In one implementation, if a user does not want a feed item to be generated upon every change on a given field, but only if the change exceeds a certain threshold or range, then such custom feeds can be conditionally generated with the customized triggers. In one implementation, the default tracking for the record or user may be turned off for this customization so that the events are only conditionally tracked. In another implementation, a trigger can be defined that deletes events that are not desired, so that default tracking can still be turned on for a particular object type. Such conditional tracking can be used for other events as well.

In some implementations, defining triggers to track certain events can be done as follows. A user can define an object type to track. This object type can be added to a list of objects that can be tracked for a particular tenant. The tenant can remove object types from this list as well. Custom objects and standard objects can be on the list, which may, for example, be stored in cache or RAM of a server or in the database. Generally only one such list exists for a tenant, and users do not have individual lists for themselves, although in some implementations, they may particularly when the number of users in a tenant is small.

In one implementation, a tenant can select which records of an object type are to be tracked. In another implementation, once an object type is added to the tracking list of object types, then all records of that type are tracked. The tenant can then specify the particulars of how the tracking is to be performed. For example, the tenant can specify triggers as described above, fields to be tracked, or any of the customizations mentioned herein.

In some implementations, when a feed is defined as an object in the database (e.g., as a child object of entity records that can be tracked), a particular instance of the feed object (e.g., for a particular record) can be create-able and delete-able. In one implementation, if a user has access to a record then the user can customize the feed for the record. In one implementation, a record may be locked to prevent customization of its feed.

One method of creating a custom feed for users of a database system according to implementations is now described. Any of the following blocks can be performed wholly or partially with the database system, and in particular by one or more processor of the database system.

In block A, one or more criteria specifying which events are to be tracked for possible inclusion into a feed to be displayed are received from a tenant. In block B, data indicative of an event is received. In block C, the event is analyzed to determine if the criteria are satisfied. In block D, if the criteria are satisfied, at least a portion of the data is added to a table (e.g., one or more of the tables in FIG. 9A) that tracks events for inclusion into at least one feed for a user of the tenant. The feed in which feed items of an event may ultimately be displayed can be a news feed, record feed, or a profile feed.

E. Creating Custom Feeds with Filtering

After feed items have been generated, they can be filtered so that only certain feed items are displayed, which may be tailored to a specific tenant and/or user. In one implementation, a user can specify changes to a field that meet certain criteria for the feed item to show up in a feed displayed to the user, e.g., a news feed or even an entity feed displayed directly to the user. In one implementation, the criteria can be combined with other factors (e.g., number of feed items in the feed) to determine which feed items to display. For instance, if a small number of feed items exist (e.g., below a threshold), then all of the feed items may be displayed.

In one implementation, a user can specify the criteria via a query on the feed items in his/her new feed, and thus a feed may only return objects of a certain type, certain types of events, feed tracked updates about certain fields, and other criteria mentioned herein. Messages can also be filtered according to some criteria, which may be specified in a query. Such an added query can be added onto a standard query that is used to create the news feed for a user. A first user could specify the users and records that the first user is following in this manner, as well as identify the specific feed items that the first user wants to follow. The query could be created through a graphical interface or added by a user directly in a query language. Other criteria could include receiving only posts directed to a particular user or record, as opposed to other feed items.

In one implementation, the filters can be run by defining code triggers, which run when an event, specific or otherwise, occurs. The trigger could then run to perform the filtering at the time the event occurs or when a user (who has certain defined triggers, that is configured for a particular user) requests a display of the feed. A trigger could search for certain terms (e.g., vulgar language) and then remove such terms or not create the feed item. A trigger can also be used to send the feed item to a particular person (e.g., an administrator) who does not normally receive the feed item were it not for the feed item containing the flagged terms.

F. Access Checks

In one implementation, a user can access a feed of a record if the user can access the record. The security rules for determining whether a user has access to a record can be performed in a variety of ways, some of which are described in commonly assigned U.S. Pat. No. 8,095,531, titled METHODS AND SYSTEMS FOR CONTROLLING ACCESS TO CUSTOM OBJECTS IN A DATABASE, by Weissman et al., issued on Jan. 10, 2012, and hereby incorporated by reference in its entirety and for all purposes. For example, a security level table can specify whether a user can see a particular type of record and/or particular records. In one implementation, a hierarchy of positions within a tenant is used. For example, a manager can inherit the access levels of employees that the manager supervises. Field level security (FLS) can also be used to determine whether a particular feed tracked update about an update to a field can be seen by the user. The field change table 920 can be used to identify a field name or field ID, and then whether the user has read access to that field can be determined from an FLS table. For example, if a user could not see a field of a social security number, the feed of the user provided to the user would not include any feed items related to the social security number field.

In one implementation, a user can edit a feed of a record if the user has access to the record, e.g., deleting or editing a feed item. In another implementation, a user (besides an administrator) cannot edit a feed item, except for performing an action from which a feed item can be created. In one example, a user is first has to have access to a particular record and field for a feed item to be created based on an action of the user. In this case, an administrator can be considered to be a user with MODIFY-ALL-DATA security level. In yet another implementation, a user who created the record can edit the feed.

G. Posts

In one implementation, the text of posts are stored in a child table (post table 950), which can be cross-referenced with event history table 910. Post table 950 can include event ID 951 (to cross-reference with event ID 911), post text 952 to store the text of the post, and time/date 953. An entry in post table 950 can be considered a feed post object. Posts for a record can also be subject to access checks. In one implementation, if a user can view a record then all of the posts can be seen, i.e. there is not an additional level of security check as there is for FLS. In another implementation, an additional security check could be done, e.g., by checking on whether certain keywords (or phrases) exist in the post. For instance, a post may not be not provided to specified users if a certain keyword exists, or only provided to specified users if a keyword exists. In another implementation, a table can exist for status updates.

VIII. Subscribing to Users and Records to Follow

As described above, a user can follow users, groups, and records. Implementations can provide mechanisms for a user to manage which users, groups, and records that the user is currently following. In one implementation, a user can be limited to the number of users and records (collectively or separately) that the user can follow. For example, a user may be restricted to only following 10 users and 15 records, or as another example, 25 total. Alternatively, the user may be permitted to follow more or less users.

In one implementation, a user can go to a page of a record and then select to follow that object (e.g., with a button marked "follow" or "join"). In another implementation, a user can search for a record and have the matching records show up in a list. The search can include criteria of records that the user might want to follow. Such criteria can include the owner, the creation date, last comment date, and numerical values of particular fields (e.g., an opportunity with a value of more than $10,000).

A follow button (or other activation object) can then reside next to each record in the resulting list, and the follow button can be selected to start following the record. Similarly, a user can go to a profile page of a user and select to follow the user, or a search for users can provide a list, where one or more users can be selected for following from the list. The selections of subscribing and unsubscribing can add and delete rows in table 920.

In some implementations, a subscription center acts as a centralized place in a database application (e.g., application platform 18) to manage which records a user subscribes to, and which field updates the user wants to see in feed tracked updates. The subscription center can use a subscription table to keep track of the subscriptions of various users. In one implementation, the subscription center shows a list of all the items (users and records) a user is subscribed to. In another implementation, a user can unsubscribe to subscribed objects from the subscription center.

A. Automatic Subscription

In one implementation, an automatic subscription feature can ensure that a user is receiving certain feeds. In this manner, a user does not have to actively select certain objects to follow. Also, a tenant can ensure that a user is following objects that the user needs to be following.

In various implementations for automatically following users, a default for small organizations can be to follow everyone. For big organizations, the default can be to follow a manager and peers. If a user is a manager, the default can be to follow the manager's supervisor, peers, and people that the manager supervises (subordinates). In other implementations for automatically following records, records that the user owns may be automatically followed and/or records recently viewed (or changed) may be automatically followed.

In one example, a new record is created. The owner (not necessarily the user who created the entity) is subscribed to the entity. If ownership is changed, the new owner may automatically be subscribed to follow the entity. Also, after a lead convert, the user doing the lead convert may be automatically subscribed to the new account, opportunity, or contact resulting from the lead convert. In one implementation, the auto subscription is controlled by user preference. That is a user or tenant can have the auto subscribe feature enabled or not. In one aspect, the default is to have the auto-subscribe turned on.

Figure 9B:
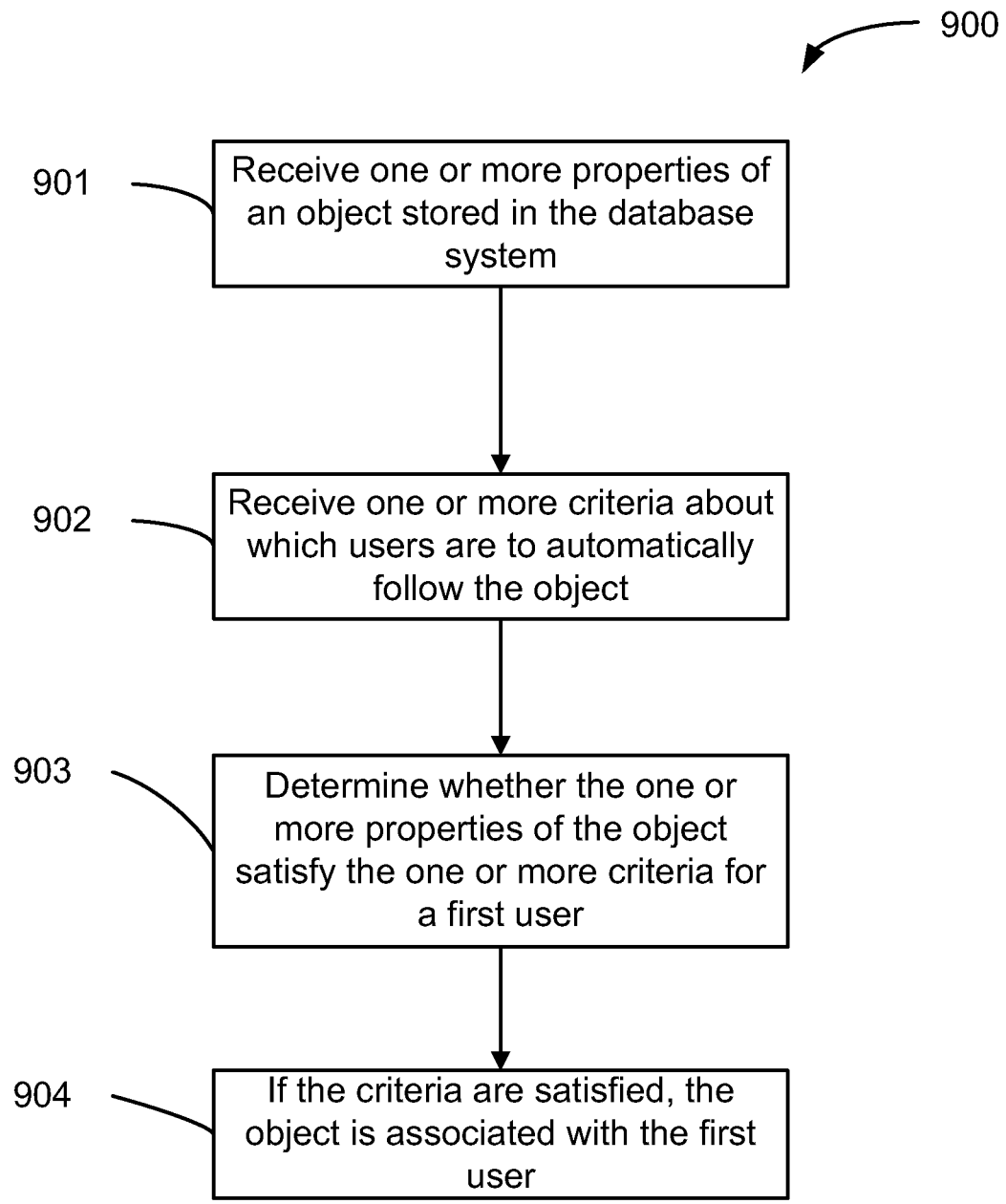
FIG. 9B shows a flowchart of an example of a method 900 for automatically subscribing a user to an object in a database system, performed in accordance with some implementations.

FIG. 9B shows a flowchart of an example of a method 900 for automatically subscribing a user to an object in a database system, performed in accordance with some implementations. Any of the following blocks can be performed wholly or partially with the database system, and in particular by one or more processor of the database system.

In block 901, one or more properties of an object stored in the database system are received. The properties can be received from administrators of the database system, or from users of the database system (which may be an administrator of a customer organization). The properties can be records or users, and can include any of the fields of the object that are stored in the database system. Examples of properties of a record include: an owner of the record, a user that converted the record from one record type to another record type, whether the first user has viewed the record, and a time the first user viewed the record. Examples of properties of a user include: which organization (tenant) the user is associated with, the second user's position in the same organization, and which other users the user had e-mailed or worked with on projects.

In block 902, the database system receives one or more criteria about which users are to automatically follow the object. The criteria can be received from administrators of the database system, or from one or more users of the database system. The users may be an administrator of a customer organization, which can set tenant-wide criteria or criteria for specific users (who may also set the criteria themselves). Examples of the criteria can include: an owner or creator of a record is to follow the record, subordinates of an owner or creator of a record are to follow the record, a user is to follow records recently viewed (potentially after a specific number of views), records that a user has changed values (potentially with a date requirement), records created by others in a same business group as the user. Examples of the criteria can also include: a user is to follow his/her manager, the user's peers, other users in the same business group as the user, and other users that the user has e-mailed or worked with on a project. The criteria can be specific to a user or group of users (e.g., users of a tenant).

In block 903, the database system determines whether the one or more properties of the object satisfy the one or more criteria for a first user. In one implementation, this determination can occur by first obtaining the criteria and then determining objects that satisfy the criteria. The determination can occur periodically, at time of creation of an object, or at other times. If different users have different criteria, then the criteria for a particular user or group could be searched at the same time. Since users of different tenants normally cannot view objects of another tenant, certain criteria does not have to be checked. In another implementation, this determination can occur by looking at certain properties and then identifying any criteria that are met. In yet another implementation, the criteria and properties can be used to find users that satisfy the criteria.

In block 904, if the criteria are satisfied, the object is associated with the first user. The association can be in a list that stores information as to what objects are being followed by the first user. User subscription table 940 is an example of such a list. In one implementation, the one or more criteria are satisfied if one property satisfies at least one criterion. Thus, if the criteria are that a user follows his/her manager and the object is the user's manager, then the first user will follow the object.

In one implementation, a user can also be automatically unsubscribed, e.g., if a certain action happens. The action could be a change in the user's position within the organization, e.g., a demotion or becoming a contractor. As another example, if a case gets closed, then users following the case may be automatically unsubscribed.

B. Feed and Subscription API

In one implementation, a feed and subscription center API can enable tenants to provide mechanisms for tracking and creating feed items, e.g., as described above for creating custom feeds by allowing users to add custom events for tracking. For example, after some initial feed items are created (e.g., by administrators of the database system), outside groups (e.g., tenants or software providers selling software to the tenants) can 'enable objects' for feeds through a standard API. The groups can then integrate into the subscription center and the feed tracked update feeds on their own. In one implementation, the feed and subscription center API can use a graphical user interface implemented for the default feed tracking. In one implementation, API examples include subscribing to an entity by creating a new entity subscription object for a particular user ID, or for all users of a tenant (e.g., user subscription table 940). In one implementation, obtaining all subscriptions for a given user can be performed by using a query, such as "select . . . from EntitySubscription where userid=' . . . '".

Some implementations have restriction on non-admin users, e.g., those without view all data permissions (VAD).

One restriction can be a limit clause on entity subscription queries (e.g., queries on user subscription table 940), e.g., where the limit of the number of operations is less than 100. In one implementation, users are not required to specify an order-by, but if an order-by is specified they can only order on fields on the entity subscription entity. In one implementation, filters on entity subscription can likewise only specify fields on the entity subscription entity. In one aspect, the object ID being followed can be sorted or filtered, but not the object name.

In one implementation, one or more restrictions can also be placed on the identification of feed items in a feed that a user can access. For example, if a low-level user (i.e. user can access few objects) is attempting to see a profile feed of a high level user, a maximum number of checks (e.g., 500) for access rights may be allowed. Such a restriction can minimize a cost of a feed request. In some implementations, there are restriction on the type of queries (e.g., fields for filtering) allowed to construct on feeds (e.g., on tables in FIG. 9A).

C. Sharing

As mentioned above, users may be restricted from seeing records from other tenants, as well as certain records from the tenant to which the user belongs (e.g., the user's employer). Sharing rules can refer to the access rules that restrict a user from seeing records that the user is not authorized to see or access. Additionally, in one implementation, a user may be restricted to only seeing certain fields of a record, field-level security (FLS).

In an implementation, access rule checks are done upon subscription. For example, a user is not allowed to subscribe to a record or type of record that the user cannot access. In one aspect, this can minimize (but not necessarily eliminate) cases where a user subscribes to entities they cannot access. Such cases can slow down news feed queries, when an access check is performed (which can end up removing much of the feed items). Thus, a minimization of access checks can speed up operation. In another implementation, when feed items are created dynamically, access rule checks may be done dynamically at the time of subsequent access, and not upon subscription or in addition to at time of subscription.

An example case where access checks are still performed is when a first user follows a second user, but the second user performs some actions on records or is following records that the first user is not allowed to see. The first user may be allowed to follow the second user, and thus the subscription is valid even though the first user may not be able to see all of the feed items. Before a feed tracked update is provided to a news feed of the first user, a security check may be performed to validate whether the first user has access rights to the feed item. If not, the feed item is not displayed to the first user. In one implementation, users can be blocked from feed items that contain certain terms, symbols, account numbers, etc. In one implementation, any user can follow another user. In another implementation, users may be restricted as to which users, objects, and/or records he/she can follow.

Regarding viewing privileges of a feed, in one implementation, a user can see all of his own subscriptions (even if he's lost read access to a record). For example, a user can become a contractor, and then the user may lose access to some records. But, the user may still see that he/she is following the object. This can help if there is a limit to the number of objects that can be followed. To unsubscribe a user may need to know what they are following so they can unsubscribe and subscribe to objects the user can see. In another implementation, for access to other people's subscriptions, a user can be required to need read-access on the record-id to see the subscription. In some implementations, users with authorization to modify all data can create/delete any subscription. In other implementations, a user can create/delete subscriptions only for that user, and not anyone else.

D. Configuration of which Field to Follow

There can be various feed settings for which feed items get added to profile and record feeds, and which get added to news feeds. In one implementation, for profile feeds and entity feeds, feed tracked updates can be written for all standard and custom fields on the supported objects. In one implementation, feed settings can be set to limit how many and which fields of a record are tracked for determining whether a feed tracked update is to be generated. For example, a user or administrator can choose specific fields to track and/or certain ones not to track. In another implementation, there is a separate limit for the number of trackable fields (e.g., 20) for a record. Thus, only certain changes may be tracked in an entity feed tracked update and show up in the feed. In yet another implementation, default fields may be chosen for tracking, where the defaults can be exposed in the subscriptions center.

IX. Adding Items to a Feed

As described above, a feed includes feed items, which include feed tracked updates and messages, as defined herein. Various feeds can be generated. For example, a feed can be generated about a record or about a user. Then, users can view these feeds. A user can separately view a feed of a record or user, e.g., by going to a home page for the user or the record. As described above, a user can also follow another user or record and receive the feed items of those feeds through a separate feed application (e.g., in a page or window), which is termed "chatter" in certain examples. The feed application can provide each of the feeds that a user is following and, in some examples, can combine various feeds in a single information feed.

A feed generator can refer to any software program running on a processor or a dedicated processor (or combination thereof) that can generate feed items (e.g., feed tracked updates or messages) and combine them into a feed. In one implementation, the feed generator can generate a feed item by receiving a feed tracked update or message, identifying what feeds the item should be added to, and adding the feed. Adding the feed can include adding additional information (metadata) to the feed tracked update or message (e.g., adding a document, sender of message, a determined importance, etc.). The feed generator can also check to make sure that no one sees feed tracked updates for data that they don't have access to see (e.g., according to sharing rules). A feed generator can run at various times to pre-compute feeds or to compute them dynamically, or combinations thereof.

In one implementation, the feed generator can de-dupe events (i.e. prevent duplicates) that may come in from numerous records (and users). For example, since a feed tracked update can be published to multiple feeds (e.g., John Choe changed the Starbucks Account Status) and a person can be subscribed to both the Starbucks account and John Choe, implementations can filter out duplicates before adding or displaying the items in a news feed. Thus, the Feed Generator can collapse events with multiple records and users for a single transaction into a single feed tracked update and ensure the right number of feed tracked updates for the particular feed. In some implementations, an action by a user does not create a feed item for that user (e.g., for a profile feed of that user), and it is only the feed of the object being acted upon (e.g., updated) for which a feed item is created. Thus, there should not be duplicates. For example, if someone updates the status of a record, the feed item is only for the record and not the user.

In one implementation, processor 417 in FIG. 4 can identify an event that meets criteria for a feed tracked update, and then generate the feed tracked update. Processor 417 can also identify a message. For example, an application interface can have certain mechanisms for submitting a message (e.g., "submit" buttons on a profile page, detail page of a record, "comment" button on post), and use of these mechanisms can be used to identify a message to be added to a table used to create a feed or added directly to a list of feed items ready for display.

A. Adding Items to a Pre-Computed Feed

In some implementations, a feed of feed items is created before a user requests the feed. Such an implementation can run fast, but have high overall costs for storage. In one implementation, once a profile feed or a record feed has been created, a feed item (messages and feed tracked updates) can be added to the feed. The feed can exist in the database system in a variety of ways, such as a related list. The feed can include mechanisms to remove items as well as add them.

As described above, a news feed can be an aggregated feed of all the record feeds and profile feeds to which a user has subscribed. The news feed can be provided on the home page of the subscribing user. Therefore, a news feed can be created by and exist for a particular user. For example, a user can subscribe to receive entity feeds of certain records that are of interest to the user, and to receive profile feeds of people that are of interest (e.g., people on a same team, that work for the user, are a boss of the user, etc.). A news feed can tell a user about all the actions across all the records (and people) whom have explicitly (or implicitly) been subscribed to via the subscriptions center (described above).

In one implementation, only one instance of each feed tracked update is shown on a user's news feed, even if the feed tracked update is published in multiple entities to which the user is subscribed. In one aspect, there may be delays in publishing news articles. For example, the delay may be due to queued up messages for asynchronous entity feed tracked update persistence. Different feeds may have different delays (e.g., delay for new feeds, but none of profile and entity feeds). In another implementation, certain feed tracked updates regarding a subscribed profile feed or an entity feed are not shown because the user is not allowed access, e.g., due to sharing rules (which restrict which users can see which data). Also, in one implementation, data of the record that has been updated (which includes creation) can be provided in the feed (e.g., a file or updated value of a feed can be added as a flash rendition).

Examples are provided below as how it can be determined which feed items to add to which news feeds. In one implementation, the addition of items to a news feed is driven by the following user. For example, the user's profile can be checked to determine objects the user is following, and the database may be queried to determine updates to these objects. In another implementation, the users and records being followed drive the addition of items to a news feed. Implementations can also combine these and other aspects. In one implementation, a database system can be follower-driven if the number of subscriptions (users and records the user is following) is small. For example, since the number subscriptions are small, then changes to a small number of objects need to be checked for the follower.

Regarding implementations that are follower-driven, one implementation can have a routine run for a particular user. The routine knows the users and records that the user is following. The routine can poll the database system for new feed tracked updates and messages about the users and records that are being followed. In one implementation, the polling can be implemented as queries. In one implementation, the routine can run at least partially (even wholly) on a user device.

Regarding implementations where a news feed is driven by the record (or user) being followed, processor 417 can identify followers of the record after a feed item is added to the record feed. Processor 417 can retrieve a list of the followers from the database system. The list can be associated with the record, and can be stored as a related list or other object that is a field or child of the record.

In one implementation, profile and record feeds can be updated immediately with a new feed item after an action is taken or an event occurs. A news feed can also be updated immediately. In another implementation, a news feed can be updated in batch jobs, which can run at periodic times.

B. Dynamically Generating Feeds

In some implementations, a feed generator can generate the feed items dynamically when a user requests to see a particular feed, e.g., a profile feed, entity feed, or the user's news feed. In one implementation, the most recent feed items (e.g., top 50) are generated first. In one aspect, the other feed items can be generated as a background process, e.g., not synchronously with the request to view the feed. However, since the background process is likely to complete before a user gets to the next 50 feed items, the feed generation may appear synchronous. In another aspect, the most recent feed items may or may not include comments, e.g., that are tied to feed tracked updates or posts.

In one implementation, the feed generator can query the appropriate subset of tables shown in FIG. 9A and/or other tables as necessary, to generate the feed items for display. For example, the feed generator can query the event history table 910 for the updates that occurred for a particular record. The ID of the particular record can be matched against the ID of the record. In one implementation, changes to a whole set of records can be stored in one table. The feed generator can also query for status updates, posts, and comments, each of which can be stored in different parts of a record or in separate tables, as shown in FIG. 9A. What gets recorded in the entity event history table (as well as what is displayed) can be controlled by a feed settings page in setup, which can be configurable by an administrator and can be the same for the entire organization, as is described above for custom feeds.

In one implementation, there can be two feed generators. For example, one generator can generate the record and profile feeds and another generator can generate news feeds. For the former, the feed generator can query identifiers of the record or the user profile. For the latter, the news feed generator can query the subscribed profile feeds and record feeds, e.g., user subscription table 940. In one implementation, the feed generator looks at a person's subscription center to decide which feeds to query for and return a list of feed items for the user. The list can be de-duped, e.g., by looking at the event number and values for the respective table, such as field name or ID, comment ID, or other information.

C. Adding Information to Feed Tracked Update Tables

Figure 10:
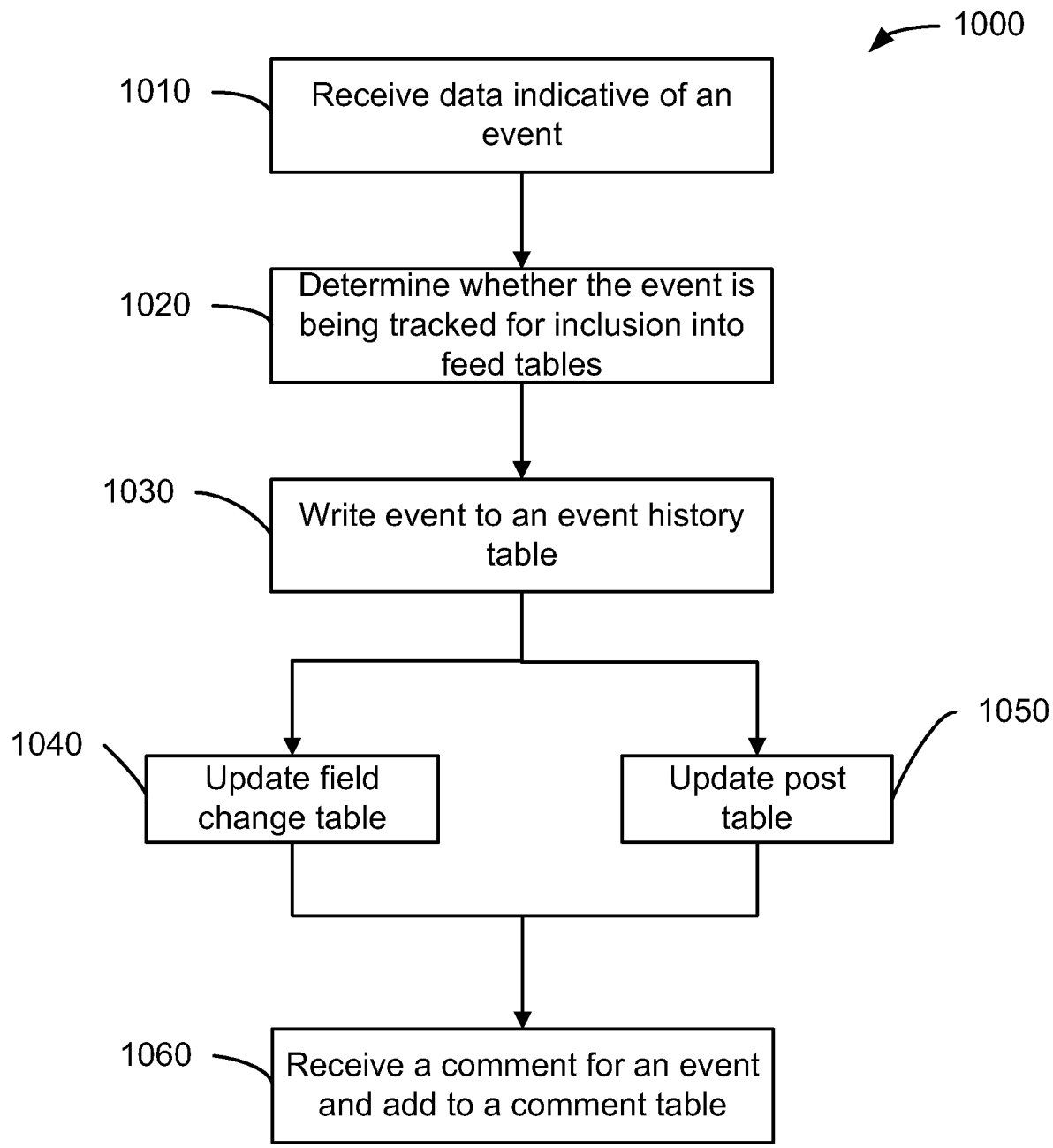
FIG. 10 shows a flowchart of an example of a method 1000 for saving information to feed tracking tables, performed in accordance with some implementations.

FIG. 10 shows a flowchart of an example of a method 1000 for saving information to feed tracking tables, performed in accordance with some implementations. In one implementation, some of the blocks may be performed regardless of whether a specific event or part of an event (e.g., only one field of an update is being tracked) is being tracked. In various implementations, a processor or set of processors (hardwired or programmed) can perform method 1000 and any other method described herein.

In block 1010, data indicative of an event is received. The data may have a particular identifier that specifies the event. For example, there may be a particular identifier for a field update. In another implementation, the transaction may be investigated for keywords identifying the event (e.g., terms in a query indicating a close, change field, or create operations).

In block 1020, it is determined whether the event is being tracked for inclusion into feed tracked update tables. The determination of what is being tracked can be based on a tenant's configuration as described above. In one aspect, the event has an actor (person performing an event), and an object of the event (e.g., record or user profile being changed).

In block 1030, the event is written to an event history table (e.g., table 910). In one implementation, this feed tracking operation can be performed in the same transaction that performs a save operation for updating a record. In another implementation, a transaction includes at least two roundtrip database operations, with one roundtrip being the database save (write), and the second database operation being the saving of the update in the feed tracked update table. In one implementation, the event history table is chronological. In another implementation, if user A posts on user B's profile, then user A is under the "created by" 913 and user B is under the object ID 912.

In block 1040, a field change table (e.g., field change table 920) can be updated with an entry having the event identifier and fields that were changed in the update. In one implementation, the field change table is a child table of the event history table. This table can include information about each of the fields that are changed. For example, for an event that changes the name and balance for an account record, an entry can have the event identifier, the old and new name, and the old and new balance. Alternatively, each field change can be in a different row with the same event identifier. The field name or ID can also be included to determine which field the values are associated.

In block 1050, when the event is a post, a post table (e.g., post table 950) can be updated with an entry having the event identifier and text of the post. In one implementation, the field change table is a child table of the event history table. In another implementation, the text can be identified in the transaction (e.g., a query command), stripped out, and put into the entry at the appropriate column. The various tables described herein can be combined or separated in various ways. For example, the post table and the field change table may be part of the same table or distinct tables, or may include overlapping portions of data.

In block 1060, a comment is received for an event and the comment is added to a comment table (e.g., comment table 930). The comment could be for a post or an update of a record, from which a feed tracked update can be generated for display. In one implementation, the text can be identified in the transaction (e.g., a query command), stripped out, and put into the entry at the appropriate column.

D. Reading Information from Feed Tracked Update Tables

Figure 11:
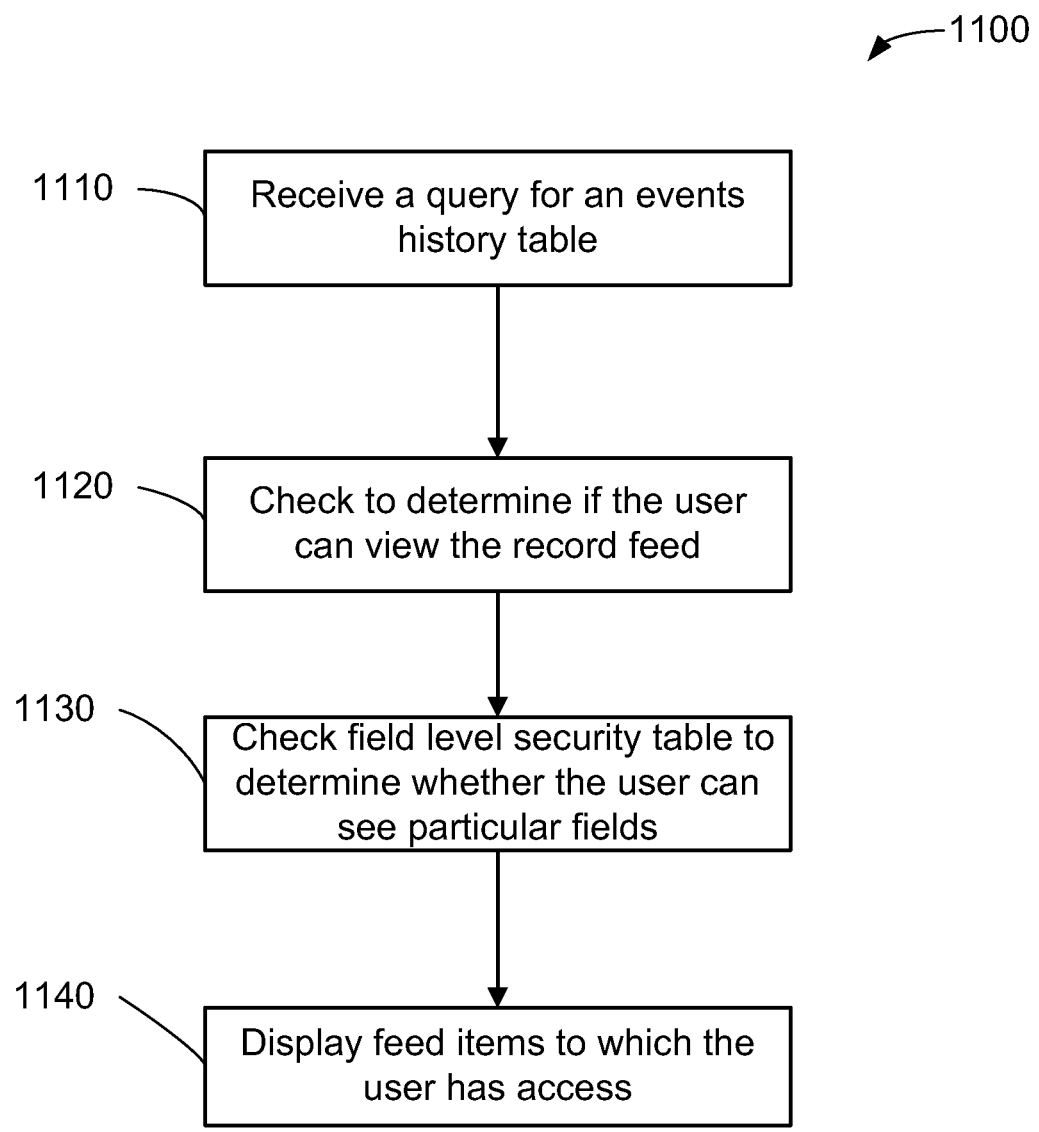
FIG. 11 shows a flowchart of an example of a method 1100 for reading a feed item as part of generating a feed for display, performed in accordance with some implementations.

FIG. 11 shows a flowchart of an example of a method 1100 for reading a feed item as part of generating a feed for display, performed in accordance with some implementations. In one implementation, the feed item may be read as part of creating a feed for a record.

In block 1110, a query is received for an events history table (e.g., event history table 910) for events related to a particular record. In one implementation, the query includes an identifier of the record for which the feed is being requested. In various implementations, the query may be initiated from a detail page of the record, a home page of a user requesting the record feed, or from a listing of different records (e.g., obtained from a search or from browsing).

In block 1120, the user's security level can be checked to determine if the user can view the record feed. Typically, a user can view a record feed, if the user can access the record. This security check can be performed in various ways. In one implementation, a first table is checked to see if the user has a classification (e.g., a security level that allows him to view records of the given type). In another implementation, a second table is checked to see if the user is allowed to see the specific record. The first table can be checked before the second table, and both tables can be different sections of a same table. If the user has requested the feed from the detail page of the record, one implementation can skip the security level check for the record since the check was already done when the user requested to view the detail page.

In one implementation, a security check is determined upon each request to view the record feed. Thus, whether or not a feed item is displayed to a user is determined based on access rights, e.g., when the user requests to see a feed of a record or a news feed of all the objects the user is following. In this manner, if a user's security changes, a feed automatically adapts to the user's security level when it is changed. In another implementation, a feed can be computed before being requested and a subsequent security check can be made to determine whether the person still has access right to view the feed items. The security (access) check may be at the field level, as well as at the record level.

In block 1130, if the user can access the record, a field level security table can be checked to determine whether the user can see particular fields. In one implementation, only those fields are displayed to the user. Alternatively, a subset of those the user has access to is displayed. The field level security check may optionally be performed at the same time and even using the same operation as the record level check. In addition, the record type check may also be performed at this time. If the user can only see certain fields, then any feed items related to those fields (e.g., as determined from field change table 920) can be removed from the feed being displayed.

In block 1140, the feed items that the user has access to are displayed. In one implementation, a predetermined number (e.g., 20) of feed items are displayed at a time. The method can display the first 20 feed items that are found to be readable, and then determine others while the user is viewing the first 20. In another implementation, the other feed items are not determined until the user requests to see them, e.g., by activating a see more link.

Figure 12:
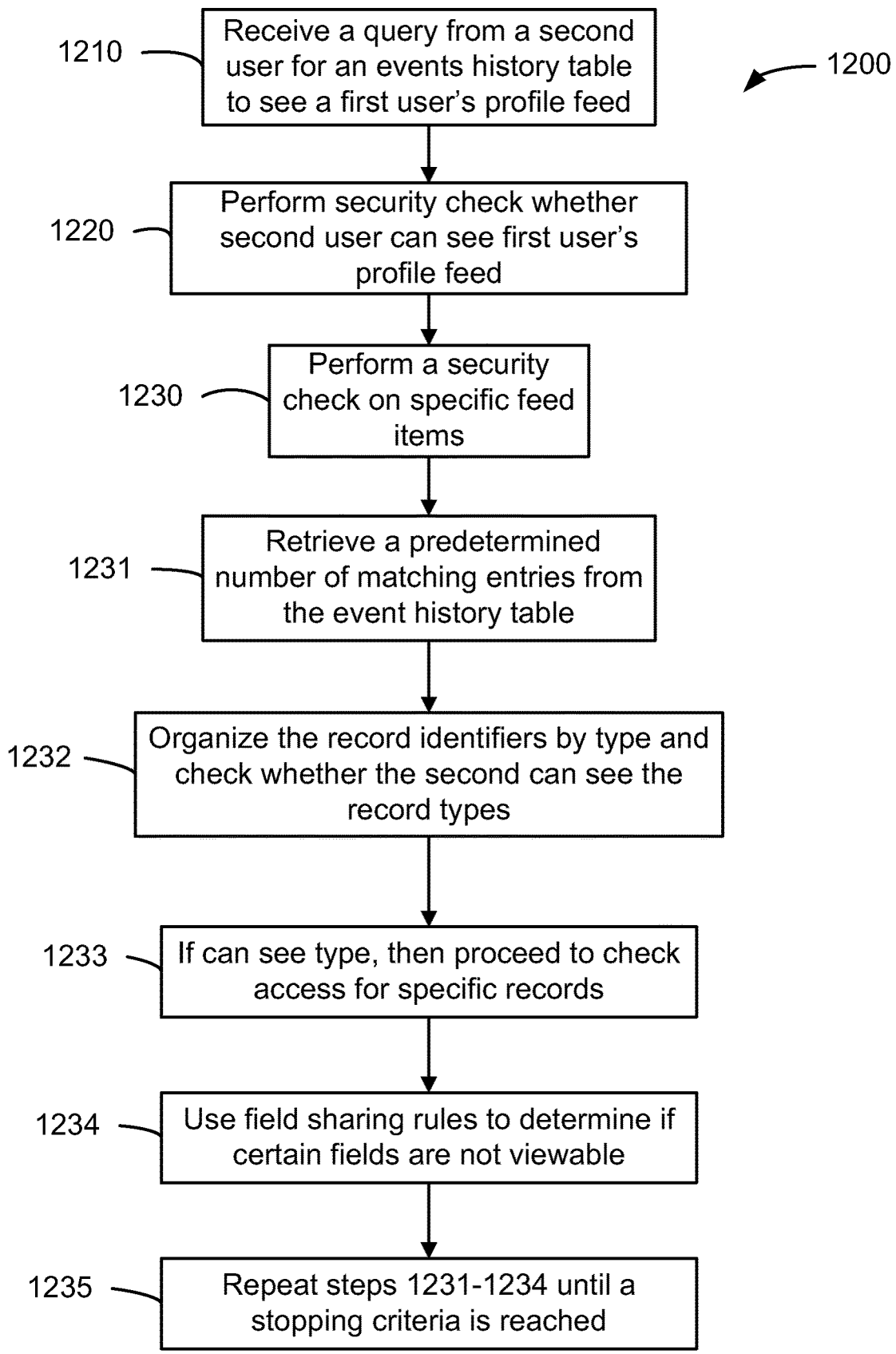
FIG. 12 shows a flowchart of an example of a method 1200 for reading a feed item of a profile feed for display, performed in accordance with some implementations.

FIG. 12 shows a flowchart of an example of a method 1200 for reading a feed item of a profile feed for display, performed in accordance with some implementations. In one implementation, the query includes an identifier of the user profile feed that is being requested. Certain blocks may be optional, as is also true for other methods described herein. For example, security checks may not be performed.

In block 1210, a query is directed to an event history table (e.g., event history table 910) for events having a first user as the actor of the event (e.g., creation of an account) or on which the event occurred (e.g., a post to the user's profile).

In various implementations, the query may be initiated by a second user from the user's profile page, a home page of a user requesting the profile feed (e.g., from a list of users being followed), or from a listing of different users (e.g., obtained from a search or from browsing). Various mechanisms for determining aspects of events and obtaining information from tables can be the same across any of the methods described herein.

In block 1220, a security check may also be performed on whether the second user can see the first user's profile. In one implementation any user can see the profile of another user of the same tenant, and block 1220 is optional.

In block 1230, a security (access) check can be performed for the feed tracked updates based on record types, records, and/or fields, as well security checks for messages. In one implementation, only the feed tracked updates related to records that the person has updated are the ones that need security check as the feed items about the user are readable by any user of the same tenant. Users of other tenants are not navigable, and thus security can be enforced at a tenant level. In another implementation, messages can be checked for keywords or links to a record or field that the second user does not have access.

As users can have different security classifications, it is important that a user with a low-level security cannot see changes to records that have been performed by a user with high-level security. In one implementation, each feed item can be checked and then the viewable results displayed, but this can be inefficient. For example, such a security check may take a long time, and the second user would like to get some results sooner rather than later. The following blocks illustrate one implementation of how security might be checked for a first user that has a lot of feed items, but the second user cannot see most of them. This implementation can be used for all situations, but can be effective in the above situation.

In block 1231, a predetermined number of entries are retrieved from the event history table (e.g., starting from the most recent, which may be determined from the event identifier). The retrieved entries may just be ones that match the user ID of the query. In one implementation, entries are checked to find the entries that are associated with the user and with a record (i.e. not just posts to the user account). In another implementation, those entries associated with the user are allowed to be viewed, e.g., because the second user can see the profile of the first user as determined in block 1220.

In block 1232, the record identifiers are organized by type and the type is checked on whether the second user can see the record types. Other checks such as whether a record was manually shared (e.g., by the owner) can also be performed. In one implementation, the queries for the different types can be done in parallel.

In block 1233, if a user can see the record type, then a check can be performed on the specific record. In one implementation, if a user can see a record type, then the user can see all of the records of that type, and so this block can be skipped. In another implementation, the sharing model can account for whether a user below the second user (e.g., the second user is a manager) can see the record. In such an implementation, the second user may see such a record. In one implementation, if a user cannot see a specific record, then comments on that record are also not viewable.

In block 1234, field level sharing rules can be used to determine whether the second user can see information about an update or value of certain fields. In one implementation, messages can be analyzed to determine if reference to a particular field name is made. If so, then field level security can be applied to the messages.

In block 1280, blocks 1231-1234 are repeated until a stopping criterion is met. In one implementation, the stopping criteria may be when a maximum number (e.g., 100) of entries that are viewable have been identified. In another implementation, the stopping criteria can be that a maximum number (e.g., 500) of entries from the entity feed tracked update table have been analyzed, regardless of whether the entries are viewable or not.

In one implementation, a news feed can be generated as a combination of the profile feeds and the entity feeds, e.g., as described above. In one implementation, a list of records and user profiles for the queries in blocks 1110 and 1210 can be obtained form user subscription table 940. In one implementation, there is a maximum number of objects that can be followed.

In various implementations, the entity feed table can be queried for any one or more of the following matching variables as part of determining items for a feed: CreatedDate, CreatedById, CreatedBy.FirstName, CreatedBy.LastName, ParentId, and Parent.Name. The child tables can also be queried for any one or more of the following matching variables as part of determining items for a feed: DataType, FieldName, OldValue, and NewValue. A query can also specify how the resulting feed items can be sorted for display, e.g., by event number, date, importance, etc. The query can also include a number of items to be returned, which can be enforced at the server.

The two examples provided above can be done periodically to create the feeds ahead of time or done dynamically at the time the display of a feed is requested. Such a dynamic calculation can be computationally intensive for a news feed, particularly if many users and records are being followed, although there can be a low demand for storage. Accordingly, one implementation performs some calculations ahead of time and stores the results in order to create a news feed.

E. Partial Pre-Computing of Items for a Feed

Figure 13:
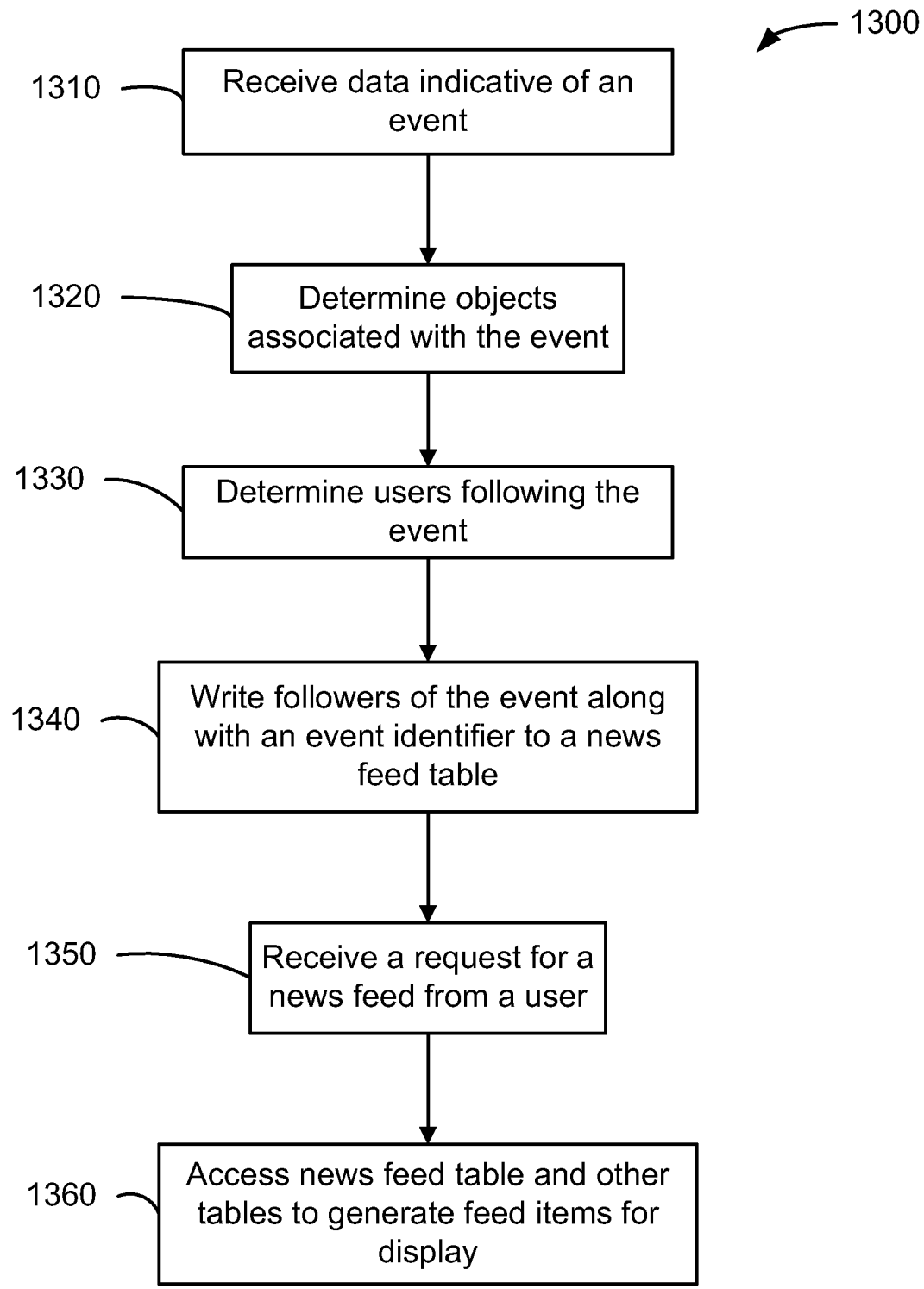
FIG. 13 shows a flowchart of an example of a method 1300 of storing event information for efficient generation of feed items to display in a feed, performed in accordance with some implementations.

FIG. 13 shows a flowchart of an example of a method 1300 of storing event information for efficient generation of feed items to display in a feed, performed in accordance with some implementations. In various implementations, method 1300 can be performed each time an event is written to the event history table, or periodically based on some other criteria (e.g., every minute, after five updates have been made, etc.).

In block 1310, data indicative of an event is received. The data may be the same and identified in the same way as described for block 1010. The event may be written to an event history table (e.g., table 910).

In block 1320, the object(s) associated with the event are identified. In various implementations, the object may be identified by according to various criteria, such as the record being changed, the user changing the record, a user posting a message, and a user whose profile the message is being posted to.

In block 1330, the users following the event are determined. In one implementation, one or more objects that are associated with the event are used to determine the users following the event. In one implementation, a subscription table (e.g., table 940) can be used to find the identified objects. The entries of the identified objects can contain an identifier (e.g., user ID 941) of each the users following the object In block 1340, the event and the source of the event, e.g., a record (for a record update) or a posting user (for a user-generated post) are written to a news feed table along with an event identifier. In one implementation, such information is added as a separate entry into the news feed table along with the event ID. In another implementation, each of the events for a user is added as a new column for the row of the user. In yet another implementation, more columns (e.g., columns from the other tables) can be added.

News feed table 960 shows an example of such a table with user ID 961 and event ID or pointer 962. The table can be organized in any manner. One difference from event history table 910 is that one event can have multiple entries (one for each subscriber) in the news feed table 960. In one implementation, all of the entries for a same user are grouped together, e.g., as shown. The user U819 is shown as following events E37 and E90, and thus any of the individual feed items resulting from those events. In another implementation, any new entries are added at the end of the table. Thus, all of the followers for a new event can be added as a group. In such an implementation, the event IDs would generally be grouped together in the table. Of course, the table can be sorted in any suitable manner.

In an implementation, if the number of users is small, then the feed items in one or more of the tables may be written as part of the same write transaction. In one implementation, the determination of small depends on the number of updates performed for the event (e.g., a maximum number of update operations may be allowed), and if more operations are performed, then the addition of the feed items is performed. In one aspect, the number of operations can be counted by the number of rows to be updated, including the rows of the record (which depends on the update event), and the rows of the feed tracked update tables, which can depend on the number of followers. In another implementation, if the number of users is large, the rest of the feed items can be created by batch. In one implementation, the feed items are written as part of a different transaction, i.e., by batch job.

In one implementation, security checks can be performed before an entry is added to the news feed table 960. In this manner, security checks can be performed during batch jobs and may not have to be performed at the time of requesting a news feed. In one implementation, the event can be analyzed and if access is not allowed to a feed item of the event, then an entry is not added. In one aspect, multiple feed items for a same user may not result from a same event (e.g., by how an event is defined in table 910), and thus there is no concern about a user missing a feed item that he/she should be able to view.

In block 1350, a request for a news feed is received from a user. In one implementation, the request is obtained when a user navigates to the user's home page. In another implementation, the user selects a table, link, or other page item that causes the request to be sent.

In block 1360, the news feed table and other tables are accessed to provide displayable feed items of the news feed. The news feed can then be displayed. In one implementation, the news feed table can then be joined with the event history table to determine the feed items. For example, the news feed table 960 can be searched for entries with a particular user ID. These entries can be used to identify event entries in event history table 910, and the proper information from any child tables can be retrieved. The feed items (e.g., feed tracked updates and messages) can then be generated for display.

In one implementation, the most recent feed items (e.g., 100 most recent) are determined first. The other feed items may then be determined in a batch process. Thus, the feed item that a user is most likely to view can come up first, and the user may not recognize that the other feed items are being done in batch. In one implementation, the most recent feed items can be gauged by the event identifiers. In another implementation, the feed items with a highest importance level can be displayed first. The highest importance being determined by one or more criteria, such as, who posted the feed item, how recently, how related to other feed items, etc.

In one implementation where the user subscription table 940 is used to dynamically create a news feed, the query would search the subscription table, and then use the object IDs to search the event history table (one search for each object the user is following). Thus, the query for the news feed can be proportional to the number of objects that one was subscribing to. The news feed table allows the intermediate block of determining the object IDs to be done at an earlier stage so that the relevant events are already known. Thus, the determination of the feed is no longer proportional to the number of object being followed.

In some implementations, a news feed table can include a pointer (as opposed to an event identifier) to the event history table for each event that is being followed by the user. In this manner, the event entries can immediately be retrieved without having to perform a search on the event history table. Security checks can be made at this time, and the text for the feed tracked updates can be generated.

X. Display of a Feed

Feeds include messages and feed tracked updates and can show up in many places in an application interface with the database system. In one implementation, feeds can be scoped to the context of the page on which they are being displayed. For example, how a feed tracked update is presented can vary depending on which page it is being displayed (e.g., in news feeds, on a detail page of a record, and even based on how the user ended up at a particular page). In another implementation, only a finite number of feed items are displayed (e.g., 50). In one implementation, there can be a limit specifically on the number of feed tracked updates or messages displayed. Alternatively, the limit can be applied to particular types of feed tracked updates or messages. For example, only the most recent changes (e.g., 5 most recent) for a field may be displayed. Also, the number of fields for which changes are displayed can also be limited. Such limits can also be placed on profile feeds and news feeds. In one implementation, feed items may also be subject to certain filtering criteria before being displayed, e.g., as described below.

A. Sharing Rules for Feeds

As mentioned above, a user may not be allowed to see all of the records in the database, and not even all of the records of the organization to which the user belongs. A user can also be restricted from viewing certain fields of a record that the user is otherwise authorized to view. Accordingly, certain implementations use access rules (also called sharing rules and field-level security FLS) to ensure that a user does not view a feed tracked update or message that the user is not authorized to see. A feed of a record can be subject to the same access rules as the parent record.

In one implementation, access rules can be used to prevent subscription to a record that the user cannot see. In one implementation, a user can see a record, but only some of the fields. In such instances, only items about fields that the user can access may be displayed. In another implementation, sharing rules and FLS are applied before a feed item is being added to a feed. In another implementation, sharing rules and FLS are applied after a feed item has been added and when the feed is being displayed. When a restriction of display is mentioned, the enforcement of access rules may occur at any stage before display.

In some implementations, the access rules can be enforced when a query is provided to a record or a user's profile to obtain feed items for a news feed of a user. The access rules can be checked and cross-references with the feed items that are in the feed. Then, the query can only return feed items for which the user has access.

In other implementations, the access rules can be enforced when a user selects a specific profile feed or record feed. For example, when a user arrives on a home page (or selects a tab to see the record feed), the database system can check to see which feed items the user can see. In such an implementation, each feed item can be associated with metadata that identifies which field the feed item is about. Thus, in one implementation, a feed tracked update is not visible unless the associated record and/or field are visible to the user.

In one example, when a user accesses a feed of a record, an access check can be performed to identify whether the user can access the object type of the record. In one implementation, users are assigned a profile type, and the profile type is cross-referenced (e.g., by checking a table) to determine whether the profile type of the user can see the object type of the record.

In some implementations, access to specific records can be checked, e.g., after it has been determined that the user can access the record type. Rules can be used to determine the records viewable by a user. Such rules can determine the viewable records as a combination of those viewable by profile type, viewable due to a profile hierarchy (e.g., a boss can view records of profile types lower in the hierarchy), and viewable by manual sharing (e.g., as may be done by an owner of a record). In one implementation, the records viewable by a user can be determined beforehand and stored in a table. In one implementation, the table can be cross-referenced by user (or profile type of a user) to provide a list of the records that the user can see, and the list can be searched to determine if the record at issue is among the list. In another implementation, the table can be cross-referenced by record to determine a list of the profile types that can access the record, and the list can be searched to find out if the requesting user is in the list. In another implementation, the records viewable by a user can be determined dynamically at the time of the access check, e.g., by applying rules to data (such as user profile and hierarchy information) obtained from querying one or more tables.

In other implementations, checks can be made as to whether a user has access to certain fields of a record, e.g., after it has been determined that the user can access the record. In one aspect, the access check on fields can be performed on results already obtained from the database, to filter out fields that the user cannot see. In one implementation, the fields associated with retrieved feed items are determined, and these fields are cross-referenced with an access table that contains the fields accessible by the user (e.g., using the profile type of the user). Such an access table could also be a negative access table by specifying fields that the user cannot see, as can other access tables mentioned herein. In one implementation, the field level access table is stored in cache at a server.

In one implementation, a user can see the same fields across all records of a certain type (e.g., as long as the user can see the record). In one implementation, there is a field level access table for each object type. The access table can be cross-referenced by user (e.g., via profile type) or field. For example, a field can be identified along with the profile types that can see the field, and it can be determined whether the user's profile type is listed. In another example, the user can be found and the fields to which the user has access can be obtained. In another implementation, the accessible fields could be specified for each record.

Regarding profile feeds and news feeds, a first user may perform an action on a record, and a feed tracked update may be generated and added to the first user's profile feed. A second user who is allowed to follow the first user may not have access rights to the record. Thus, the feed tracked update can be excluded from a news feed of the second user, or when the second user views the first user's profile feed directly. In one implementation, if a user is already on the detail page, then another access check (at least at the record level) may optionally not be performed since a check was already done in order to view the detail page.

In some implementations, for profile feeds and news feeds, the feed items can be organized by object type. IT can then be determined whether the requesting user can access to those object types. Other access checks can be done independently or in conjunction with these access checks, as is described above.

B. API Implementation

Various implementations can implement the access rules in various ways. In one implementation, all recent feed items (or more generally events) are retrieved from a feed that is ready for display (e.g., after a feed generator performs formatting) or a table. Then, bulk sharing checks can be applied on the retrieved items. The viewable feed items of the most recent set can then be displayed.

In another implementation regarding a profile feed, for non-VAD (view all data) users, i.e. users who can see everything, certain functions can be overridden. In one implementation, a FROM clause in a query can be overridden to be a pipelined function, e.g., with different parts of the query being operated on at the same time, but with different operations of a pipeline. This pipeline function can be given a row limit and the maximum number of sharing checks to run. It can loop, selecting the next batch of rows, run sharing checks against them in bulk, and pipe back any IDs which are accessible. In one aspect, in nearly all cases, the user feed can contain accessible IDs so the sharing checks can pass on the first loop. However, it is possible the sharing may have changed such that this user's access is greatly reduced. In one worst case, implementations can run sharing checks on up to the maximum number of sharing check rows (e.g., a default 500) and then terminate the function with the IDs which passed so far, possibly zero. Such an example includes a low level person viewing profile feed of CEO.

In some implementations, if the user has a small number of subscriptions (e.g., <25), then implementations can first run sharing checks on those IDs and then drive the main query from those accessible IDs, as opposed to a semi-join against the subscription and running sharing checks on the resulting rows. In other implementations, FLS is enforced by building up a TABLE CAST of the accessible field IDs from the cached values. A main query can then join against this table to filter only accessible fields.

XI. Filtering and Searching Feeds

It can be possible that a user subscribes to many users and records, which can cause a user's news feed to be very long and include many feed items. In such instances, it can be difficult for the user to read every feed item, and thus some important or interesting feed items may not be read. In some implementations, filters may be used to determine which feed items are added to a feed or displayed in the feed, even though a user may be authorized to see more than what is displayed. Section VII.E also provides a description of filtering based on criteria.

In one implementation, an "interestingness" filter can function as a module for controlling/recommending which feed tracked updates make it to the news feed when the number of items that a user subscribes to is large. In one such implementation, a user can specify a filter, which is applied to a user's news feed or to record and profile feeds that the user requests. Different filters can be used for each. For example, processing can be done on the news feed to figure out which feed tracked updates are the most relevant to the user. One implementation can use an importance weight and level/ranking, as described herein. Other implementations can include a user specifying keywords for a message and specifying which records or users are most important.

In one implementation, a filter can be used that only allows certain feed items to be added to a feed and/or to be displayed as part of a feed. A filter can be used such that the removal or non-addition of certain feed items automatically occur for any new feed items after the filter criteria are entered. The filter criteria can also be added retroactively. The criteria of such a filter can be applied via a query mechanism as part of adding a feed item to a table or displaying a feed, as described in sections above. In various implementations, a user can directly write a query or create the query through a graphical user interface.

Figure 14:
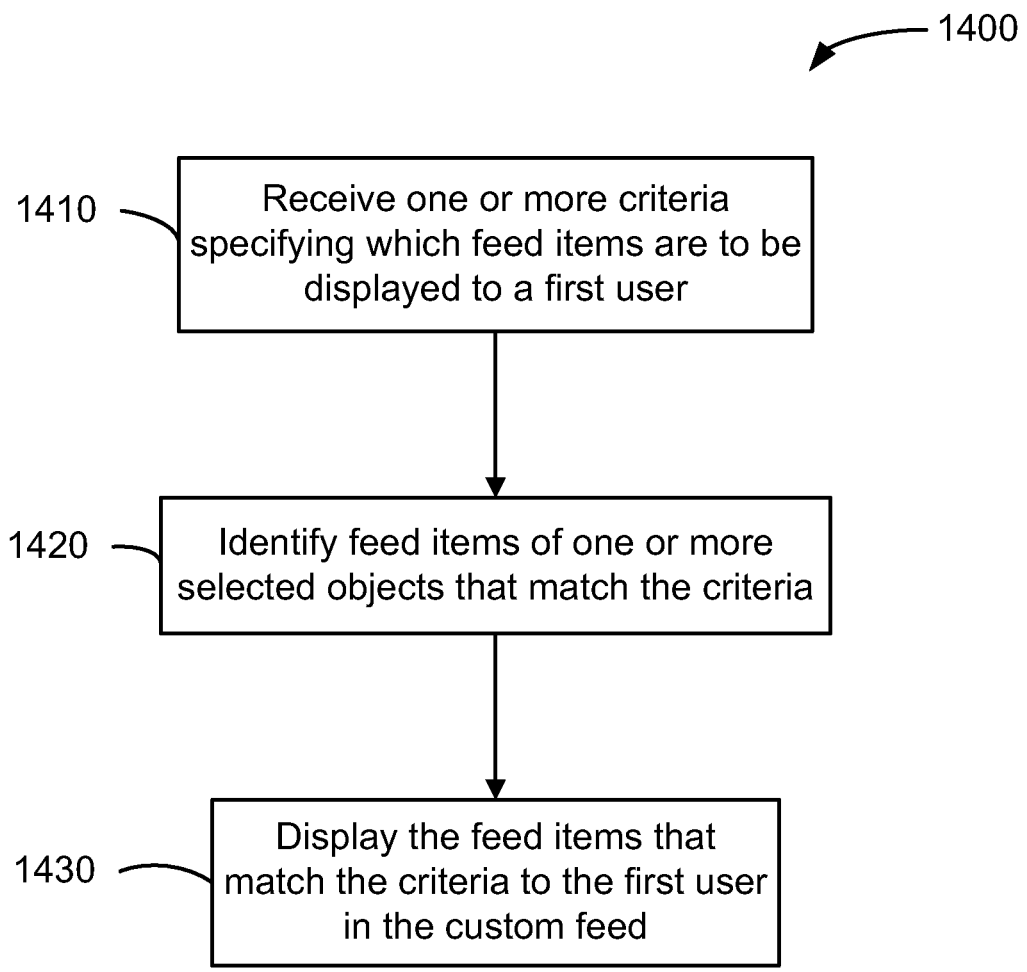
FIG. 14 shows a flowchart of an example of a method 1400 for creating a custom feed for users of a database system using filtering criteria, performed in accordance with some implementations.

FIG. 14 shows a flowchart of an example of a method 1400 for creating a custom feed for users of a database system using filtering criteria, performed in accordance with some implementations. Any of the following blocks can be performed wholly or partially with the database system, and in particular by one or more processor of the database system.

In block 1410, one or more criteria specifying which feed items are to be displayed to a first user are received from a tenant. In one implementation, the criteria specifies which items to add to the custom feed. For example, the criteria could specify to only include feed items for certain fields of a record, messages including certain keywords, and other criteria mentioned herein. In another implementation, the criteria specifies which items to remove from the custom feed. For example, the criteria could specify not to include feed items about certain fields or including certain keywords.

In block 1420, the database system identifies feed items of one or more selected objects that match the criteria. The feed items can be stored in the database, e.g., in one or more of the tables of FIG. 9A. In one implementation, the one or more selected objects are the objects that the first user is following. In another implementation, the one or more selected objects is a single record whose record feed the first user is requesting.

In block 1430, the feed items that match the criteria are displayed to the first user in the custom feed. The generation of text for a feed tracked update can occur after the identification of the feed items (e.g., data for a field change) and before the display of the final version of the feed item.

In one implementation, the criteria are received before a feed item is created. In another implementation, the criteria are received from the first user. In one aspect, the criteria may only used for determining feeds to display to the first user. In yet another implementation, the criteria are received from a first tenant and applies to all of the users of the first tenant. Also, in an implementation where a plurality of criteria are specified, the criteria may be satisfied for a feed item if one criterion is satisfied.

Some implementations can provide mechanisms to search for feed items of interest. For example, the feed items can be searched by keyword, e.g., as entered by a user. As another example, a tab (or other selection device) can show feed items about or from a particular user. In one implementation, only messages (or even just comments) from a particular user can be selected.

In another implementation, a user can enter search criteria so that the feed items currently displayed are searched and a new list of matching feed items is displayed. A search box can be used to enter keywords. Picklists, menus, or other mechanisms can be used to select search criteria. In yet another implementation, feed comments are text-indexed and searchable. Feed comments accessibility and visibility can apply on the search operation too.

In one implementation, when a user performs a search of feeds, there can be an implicit filter of the user (e.g., by user ID). This can restrict the search to only the news feed of the user, and thus to only record feeds and profile feeds that the user is subscribed. In another implementation, searches can also be done across feeds of users and records that are not being subscribed.

Besides searching for feed items that match a criteria, one also could search for a particular feed item. However, in one implementation, a user cannot directly query a feed item or feed comment. In such an implementation, a user can query to obtain a particular profile or record feed, and then navigate to the feed item (e.g., as child of the parent feed). In another implementation, the relationship from a feed to its parent entity (e.g., a record or user profile) is uni-directional. That is a user can navigate from the feed to the parent but not vice versa.

In one implementation, a user can directly query the child tables, e.g., comment table 930. Thus, a user could search for comments only that user has made, or comments that contain certain words. In another implementation, a user can search for a profile feed of only one user. In yet another implementation, a user can search for profile feeds of multiple users (e.g., by specifying multiple user names or IDs), which can be combined into a single feed.

XII. Maintaining Records for Follower's Feeds

If every feed item is stored and maintained on a follower's feed or even in the profile and/or record feeds, the amount of data to be stored could be massive, enough to cause storage issues in the system. In one implementation, the N (e.g., 50) most recent feed items for each feed are kept. However, there can be a need to keep certain older feed items. Thus, implementations can remove certain feed items, while keeping others. In other implementations, old feed tracked updates may be archived in a data store separate from where recent feed items are stored.

In some implementations, feeds are purged by a routine (also called a reaper) that can remove items deemed not worthy to keep (e.g., old items). Any underlying data structures from which feed items are created can also be purged. In one implementation, the reaper can remove certain items when new items are added (e.g., after every 5th item added). As another example, feed items may be deleted synchronously during the save operation itself. However, this may slow down each save operation. In one implementation, however, this may be better than incurring a larger cost when the items are removed at longer intervals. In another implementation, the reaper can run periodically as a batch process. Such routines can ensure that a table size does not become too large. In one aspect, a reaper routine can keep the event history table relatively small so the sharing checks are not extremely expensive.

In various implementations, the reaper can maintain a minimum number (e.g., 50 or 100) of feed items per record, maintain a minimum number of records per user (e.g., per user ID), and not deleting feed items (or entire records), which have comments against it. Such implementations can ensure that the detail page and profile page have sufficient data to display in a feed. Note that the sharing checks for feed queries can cut down the number of records further for users with less access. Thus, the number of records finally displayed for specific users can be significantly less than a minimum number for a specific profile or record feed. In one implementation, a reaper deletes data that is older than a specified time (e.g., 6 months or a year).

In one implementation, the reaper can perform the deletion of feed items (purging) as a batch up deletion. This can avoid deletion of large number of records that may lead to locking issues. In another implementation, the reaper can be run often so that the table does not become difficult to manage (e.g., size-wise). In this way the reaper can work on a limited set of records. In one implementation, the reaper may have logic that deletes certain items (e.g., by an identification) from tables (e.g., those in FIG. 9A), or sections of the tables.

XIII. External User Access to an Online Social Network of an Organization

In some implementations, users outside of an organization in which an online social network such as Chatter® is implemented are granted limited access to social network data of the organization. For instance, such external users can log into the social network to view exposed organizational data and exchange messages with some of the organization's internal users. Conceptually, internal users, such as the organization's members, employees, students, etc. can be viewed as first class citizens within the organization, in that they have access to all or a large part of the organization's social network data. Following this model, external users can be viewed as second class citizens of the organization, having limited access to a smaller portion of the same collection of social network data.

In some implementations, external users can be invited to join a particular group of the organization, and thus access at least some of the group's data. For example, an external group member can be authorized to post messages to the group feed, have access to files uploaded to and maintained by the group, and send/receive messages to/from internal group members. However, such external users can be restricted from viewing or otherwise accessing other group data and any organizational data outside of the particular group(s) of which the external users are members. Thus, the online social network can have a security model with restrictions in place to prevent an external user from following other users and/or seeing more detailed contact information than the names and, in some cases, pictures of internal users who are not members of the particular group.

In some examples, as described in greater detail below, an external user, such as a customer of the organization, can be invited to join a group of the organization in the context of the organization's online social network. When the external user is authorized as a group member, the external user can be provided with the capability of logging into the organization's social network to view a presentation of the group page tailored to external users. In some instances, this external user presentation of the group page is a partial view of the group page otherwise viewable by internal users. For instance, a GUI including the external user presentation of the group page can show a photo, group name, description, and other data. However, other group data otherwise displayed in the internal user presentation of the group page, such as a full list of group members, group member photos, group member contact information, and customers of the group, is not included in the external user presentation. In another example, the internal user presentation includes internal group member posts to the group feed, while the external user presentation blocks the posts and any other information updates submitted by internal group members from being displayed.

Figure 15:
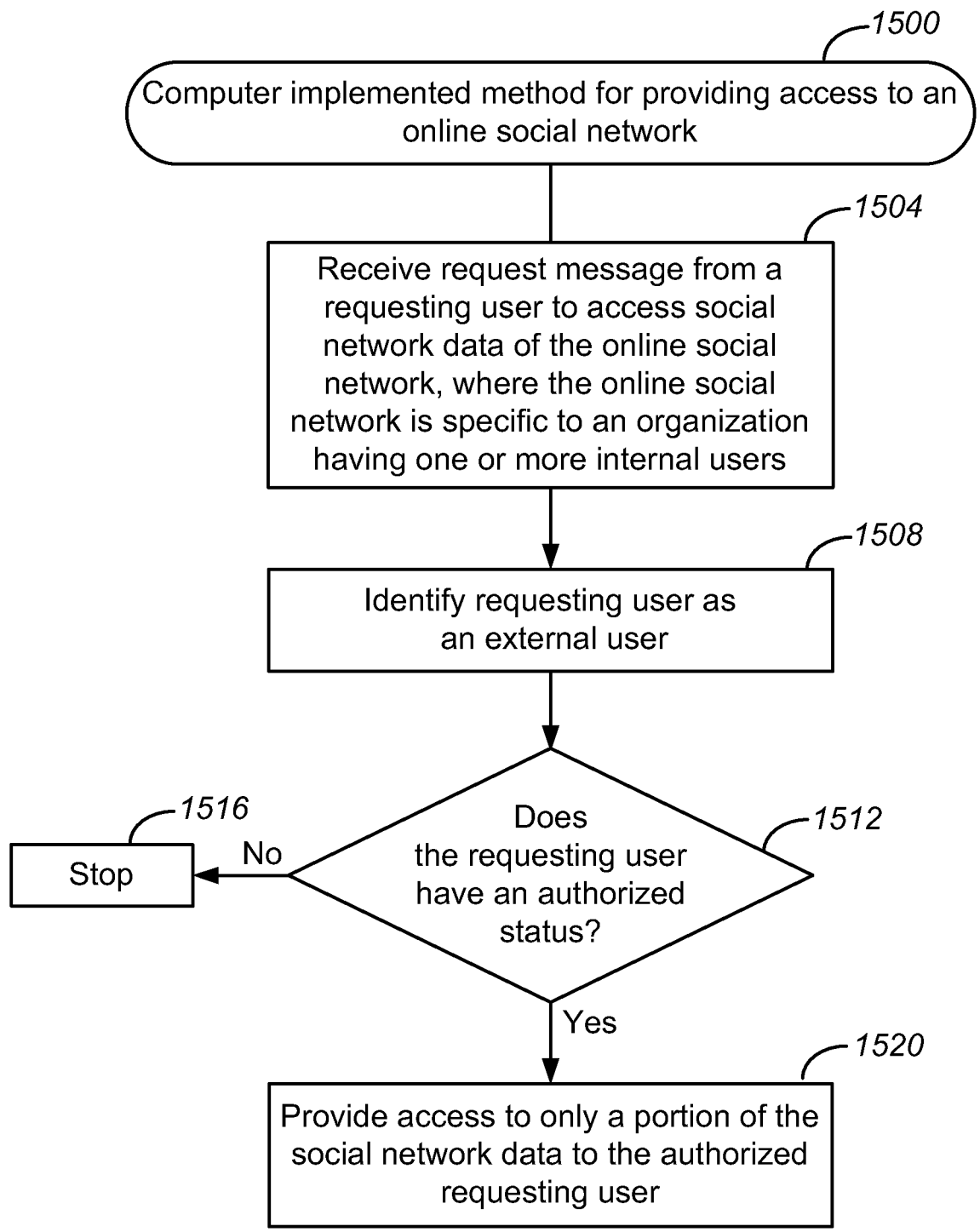
FIG. 15 shows a flowchart of an example of a method 1500 for providing access to an online social network, performed in accordance with some implementations.

FIG. 15 shows a flowchart of an example of a method 1500 for providing access to an online social network, performed in accordance with some implementations. In block 1504, a requesting user sends a request message to one or more computing devices performing method 1500. The request message requests access to social network data of the online social network. In some implementations, the online social network is specific to an organization having one or more internal users, such as employees or students of the organization. Internal users of such an organization are often individuals authorized to log in and have full access to online social network data available in the social network implemented in the organization. In some implementations, the online social network of method 1500 also has one or more external users, referring to any individuals or groups outside of the organization such as non-employee customers or venders, non-students, members of a different organization, and/or anyone not explicitly recognized as an internal user. Various types of organizations can implement the online social network.

In one example of method 1500, an app server 288 in the on-demand database service environment 200 of FIGS. 2A and 2B can receive the request message of block 1504 from an external user operating a user system 12 as shown in FIGS. 1A and 1B. In other instances, the request message is received from a proxy on behalf of another user or information source. Any of the servers described above with reference to FIG. 2B or other computing devices described herein can be configured to receive and process request messages in accordance with method 1500. In block 1504, any such request messages received by one or more computing devices performing method 1500 can be received as signals over network 14 of FIGS. 1A and 1B, that is, with any request message transmitted from one of the user systems 12.

When a request message is received in block 1504 from a requesting user, the computing device or devices receiving the message can proceed to identify the requesting user in block 1508. In some instances, the user sending the request message is an external user of the organization, and identified as such in block 1508. Various entities can serve as external users, depending on the desired implementation. For instance, when an organization is in the form of a corporation, external users of the organization could be contractors, consultants, academic individuals, and other various entities outside of the organization in which the online social network is implemented. For example, an organization such as salesforce.com could have external users in the form of graduate students working as contractors or on a part-time basis on a specific research project for salesforce.com. In this example, the external user is not a full-time employee of the organization, but is working with the organization on a limited basis. In one example of block 1508, identifying a requesting user as an external user can involve looking up a User ID of the requesting user in a database storing a list of external user IDs. Other techniques for identifying external users are described in greater detail below.

In block 1512, following identification of a requesting user in block 1508, the one or more computing devices performing method 1500 determines whether the requesting user has an authorized status, that is, whether the requesting user is authorized to access the online social network in some limited capacity. Again, the determination of block 1512 can be made by performing a database lookup in a table which stores a list of authorized external users of the organization and online social network. In some implementations, the table also stores tailored parameters defining specific permissions and restrictions to online social network data for the identified external user. Thus, different external users can have different permissions and restrictions defining individualized access to the online social network data. The databases accessed in block 1508 and 1512, by way of example, can be implemented in any of the various storage mediums described herein. For instance, tenant data storage 22 and/or system data storage 24 of FIGS. 1A and 1B can store lists of external users and authorize external users and associated security parameters. Any of the various databases and/or memory devices described herein can serve as the storage mediums accessed in blocks 1508 and 1512.

In block 1516, when the requesting external user is not identified as being authorized in block 1512, the requesting user is not granted access to any social network data of the organization in block 1516. Returning to block 1512, when the requesting user is authorized, the method 1500 proceeds to block 1520 in which the authorized requesting user is provided access to only a portion of the data of the online social network. In block 1520, in one example, providing access to only a portion of the social network data includes one or more servers transmitting the portion over network 14 to a user system 12 of FIGS. 1A and 1B. For instance, a portion of social network data can be received by the user system and displayed using a web browser program operating on user system 12 to output a graphical presentation of the portion of social network data on the display of user system 12 in a GUI.

The portion of the social network data to which the authorized requesting user is provided access in block 1520 can include various social network information and objects, as described herein. For instance, the larger collection of social network data can include any of various types of information feeds, files, and records such as cases, accounts, opportunities, leads, and contacts, as described above. In some instances, the portion of the social network data provided in block 1520 includes a relatively smaller collection of one or more types of such information, such as a subset of one or more feed items of a news feed and a subset of the records stored in the online social network. Other various combinations of selected portions of online social network data can be provided in block 1520. In another example, the social network data includes one or more user profiles. For instance, the portion of social network data provided in block 1520 can be in the form of one or more selected user profiles or certain fields of information in a particular user profile.

Figure 16:
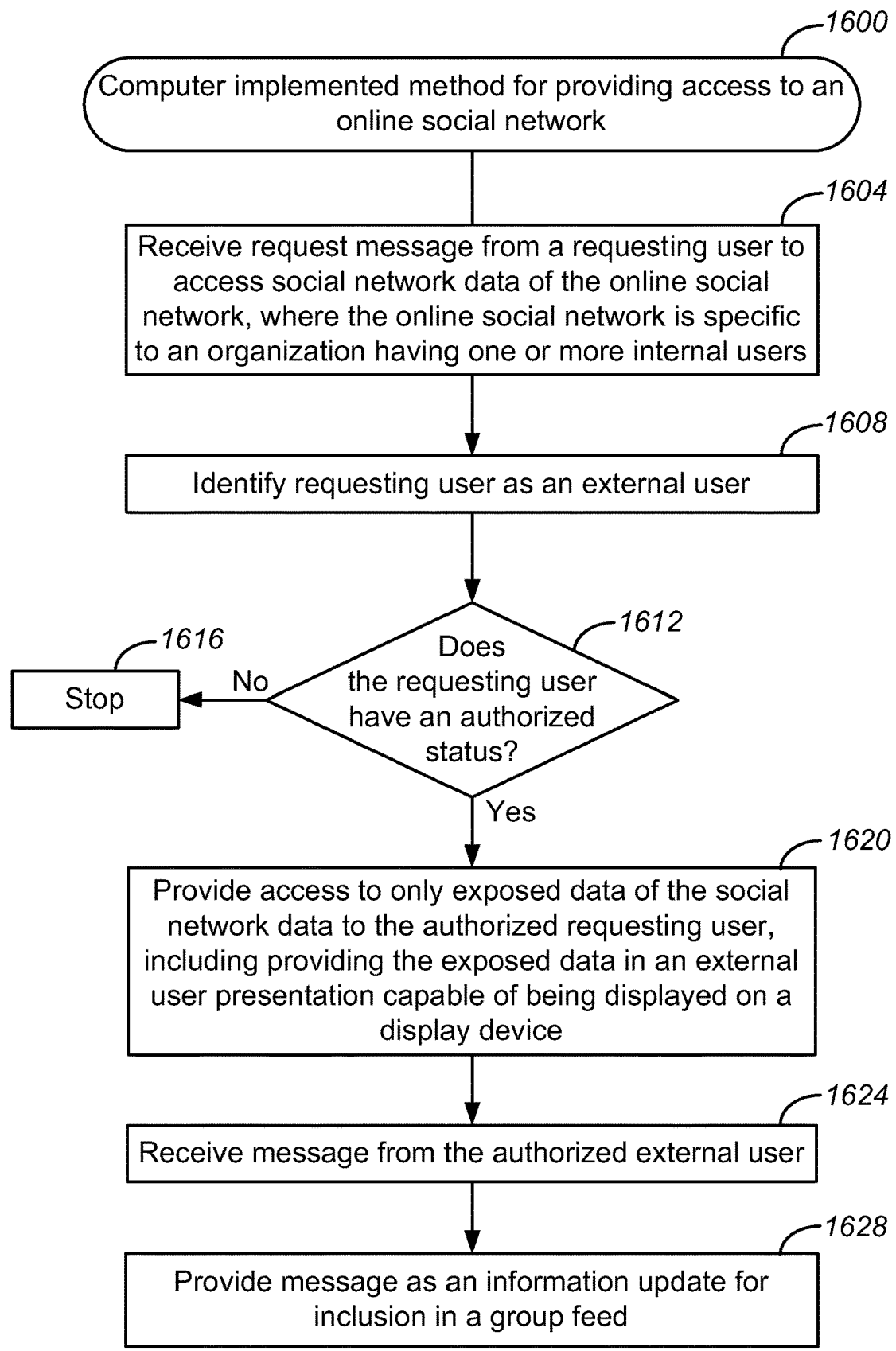
FIG. 16 shows a flowchart of an example of a method 1600 for providing access to an online social network, performed in accordance with some implementations.

FIG. 16 shows a flowchart of an example of a method 1600 for providing access to an online social network, performed in accordance with some implementations. Method 1600 is described in relation to examples of GUIs shown in FIGS. 19-21 capable of being generated and displayed on a display device in accordance with some implementations.

Figure 19A:
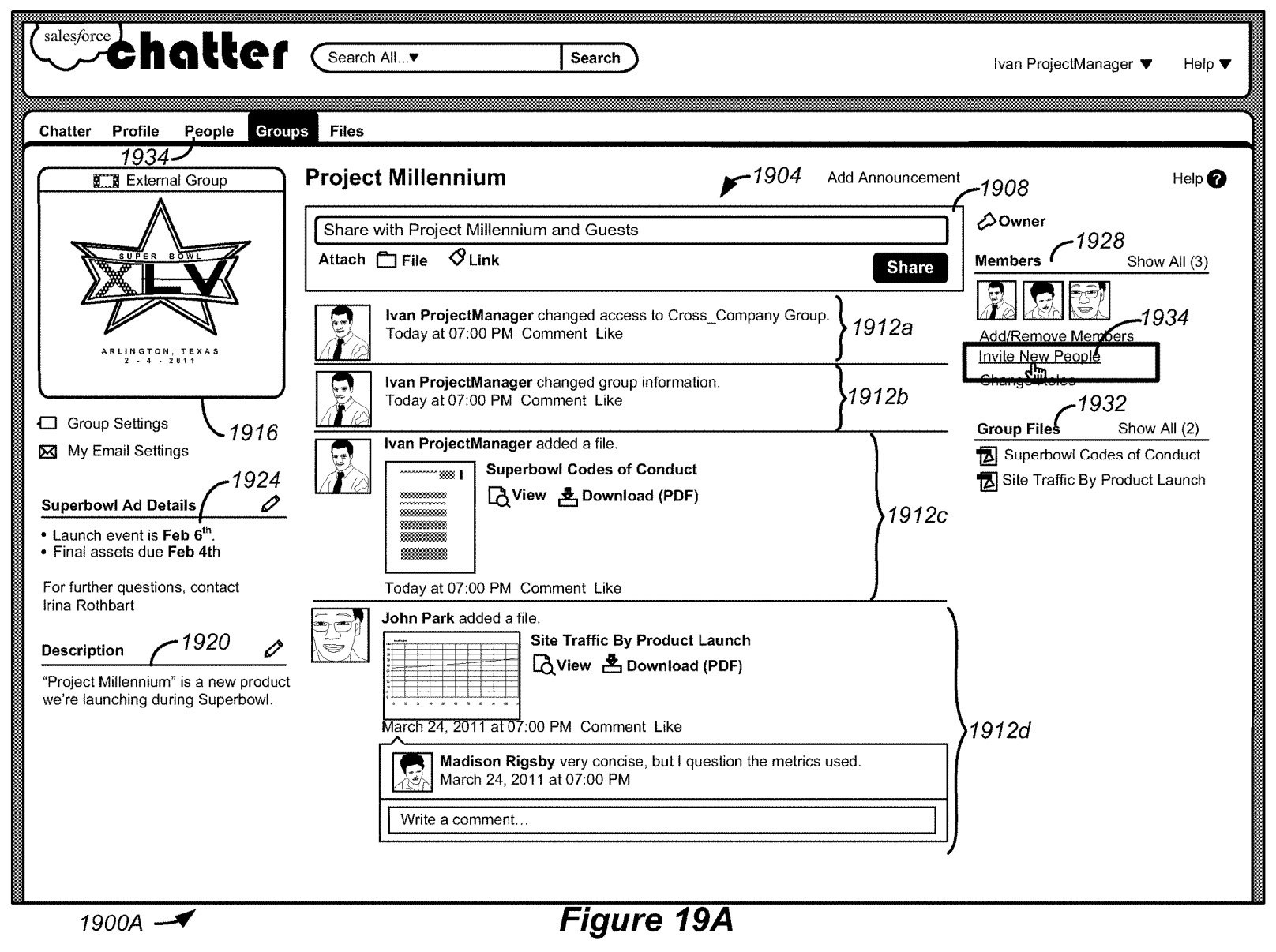
Figure 19B:
Figure 19C:
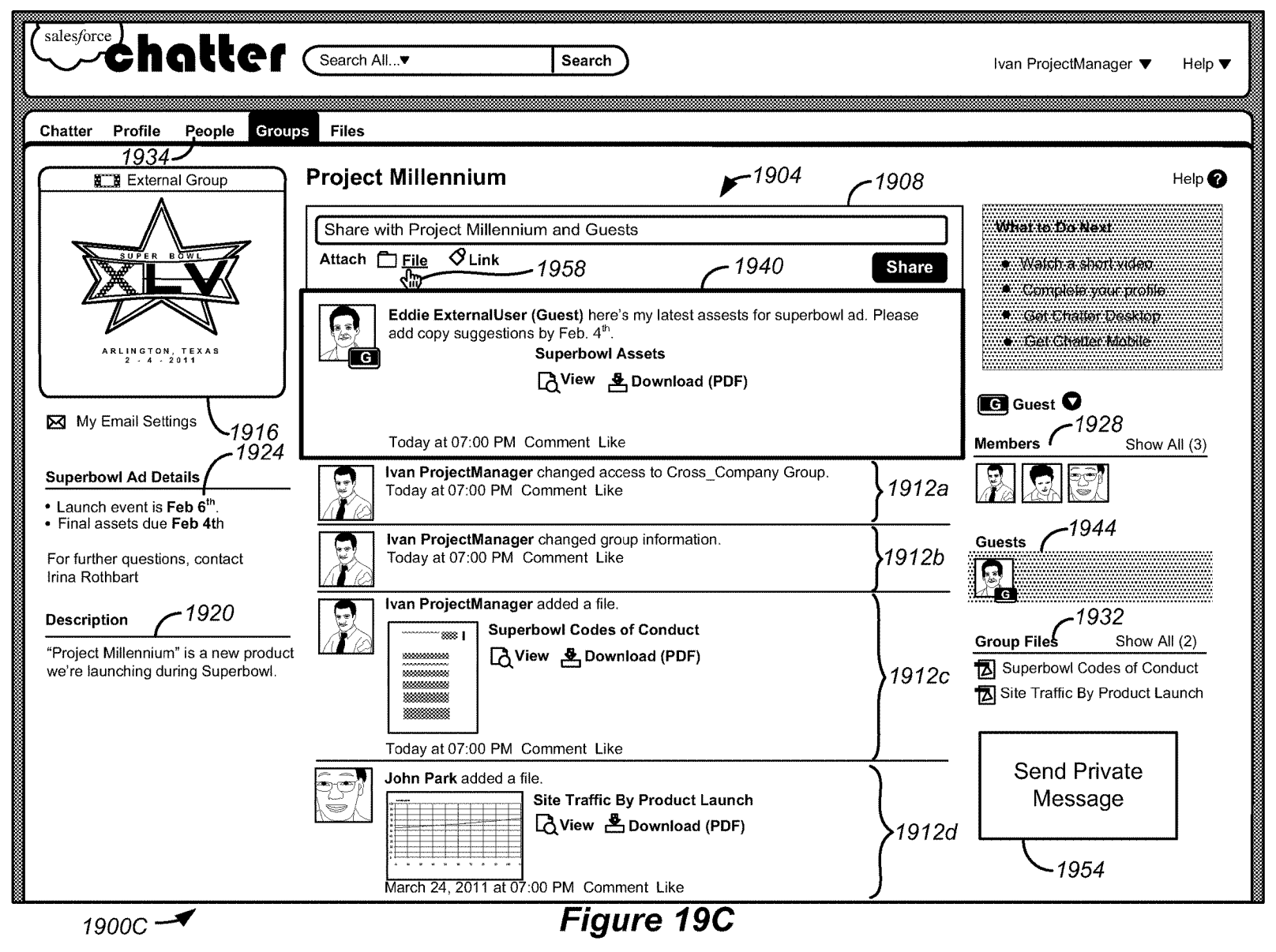

FIGS. 19A-C show examples of group pages in the form of GUIs configured to be accessible by different users of an organization, according to some implementations. For instance, internal users of the group can be internal group members, while authorized external users can be external group members granted permission to view certain group data, as explained in greater detail below. The group page 1900A of FIG. 19A has a group feed 1904 including a publisher component 1908 as well as a number of information updates presented as feed items 1912a-1912d. For instance, a user has commented on John Park's information update in feed item 1912d. The group page of FIG. 19A includes a group photo 1916 and a description 1920 of the group. Any notices are presented in details region 1924, and a members region 1928 identifies internal group members by thumbnail images. A group files region 1932 shows a list of files uploaded by any of various group members and accessible through the group page.

In FIG. 19A, the group page 1900A is in the form of a presentation to internal users, in this example, internal group members of the organization, accessing the online social network. While some of the social network data in the form of photo 1916, details 1924, description 1920, group feed 1904, members 1928, and files 1932 are private, meaning the data is accessible only to internal group members, all of such data is displayed in the internal user presentation of GUI 1900A. In some instances, described in greater detail below, such private data is omitted from a presentation of the group page to authorized external users, e.g., external group members, such that only exposed or publicly accessible data is display in the external user presentation.

Returning to FIG. 16, in block 1604, a request message can be received from a requesting user to access social network data, for instance, in the form of group data. When the requesting user is an internal user, e.g., an internal group member, the presentation of FIG. 19A is generated and displayed on a display device operated by the internal group member. In block 1608, when the requesting user is identified as an external user, the one or more servers responding to the request can check whether the requesting external user has been authorized as an external group member to access and view part or all of the group data, in block 1612. Techniques for authorizing an external user as an external group member of one or more groups of the organization, such as the "Project Millennium" group of FIG. 19A, are described in greater detail below.

When the requesting external user is not authorized, method 1600 ends in block 1616. Returning to block 1612, when the requesting external user is identified as an external group member, exposed data of the group is provided to the external group member in block 1620. For instance, in some implementations, an external group member identified in block 1612 may only be granted limited permission to exchange messages, such as emails, with internal group members while otherwise being prohibited from accessing or viewing any of the group data.

In block 1620, any exposed group data is provided to a user system operated by the external group member in an external user presentation for display on a display device of the user system. For example, in FIG. 19B, a group page 1900B is generated and displayed on a display device of a user system operated by Eddie ExternalUser. Thus, in this example, the exposed group data of FIG. 19A is provided in an external user presentation of FIG. 19B, while any group data designated as private is restricted from being viewed by Eddie ExternalUser. In this example, the group photo 1916 is shown, as well as the details 1924. However, certain feed items of feed 1904 of FIG. 19A, such as item 1912*d* of FIG. 19A, have been omitted from filtered information feed 1906 of FIG. 19B. For example, the file added by John Park in feed item 1912*d* may be intended only for internal group members. The same is true for feed item 1912*c* of FIG. 19A, in that it has also been omitted from the presentation in group page 1900B. Other publicly accessible feed items are exposed in information feed 1906 of FIG. 19B. In the example of FIG. 19B, Eddie ExternalUser is also prevented from viewing members 1928 of FIG. 19A.

Thus, when comparing and contrasting FIGS. 19A and 19B, page 1900A provides a presentation of a full set of group data, including the name of the group, "Project Millennium", the group photo 1916, the description 1920, the full group feed 1904 including both private and exposed feed items, group details 1924, identifications of other members 1928, and files 1932. The partial presentation of page 1900B includes a subset of this data, in particular, only the data designated as exposed to external group members. Thus, as mentioned above, the feed 1906 of FIG. 19B includes a subset of conversations and other feed items of feed 1904. In one example, feed 1904 of FIG. 19A includes posts and conversations including any external group members that internal group members can view and comment on. However, feed 1906 displayed in page 1900B blocks out certain posts and conversations with other external group members, so a particular external group member can only see a subset of postings from internal group members. In this way, one external group member can be blocked from accessing and conversing with other external members of the same group. To this end, in some implementations, when one or more servers are performing the method 1600, any post or other information update received from any user in relation to a particular group results in the servers first checking whether the user submitting the post or information update is an internal user, such as an employee of the organization, or an external user, such as a contractor or customer interacting with the group. Fields in one or more tables as described above with reference to FIG. 9A can store data identifying the type of user submitting the information update.

In some implementations, an external group member has the capacity to interact with other internal and external group members in one or more groups of the online social network. Returning to the example of FIGS. 19A and 19B, an external group member such as Eddie ExternalUser can be permitted to send messages and various information updates to other users in Eddie's group(s) of the online social network, in block 1624 of FIG. 16. In FIG. 19C, showing an internal user presentation of an updated group page 1900C, Eddie ExternalUser has submitted a post 1940 with an attached file, "Super Bowl Assets", to the group feed 1904, in one example of block 1628 of FIG. 16. In this example, internal group members as well as external group members can view Eddie's post 1940 in their respective presentations of the group page.

In some implementations, when a request message is received from one or more internal group members, both the private data and exposed data is provided in an internal user presentation, as shown in the pages of FIGS. 19A and 19C. These pages can be displayed on a suitable display device operated by the requesting internal group member. Also, in the example of FIG. 19C, any external group members such as Eddie are identified as guests 1944 in the internal user presentation of page 1900C.

Figure 17:
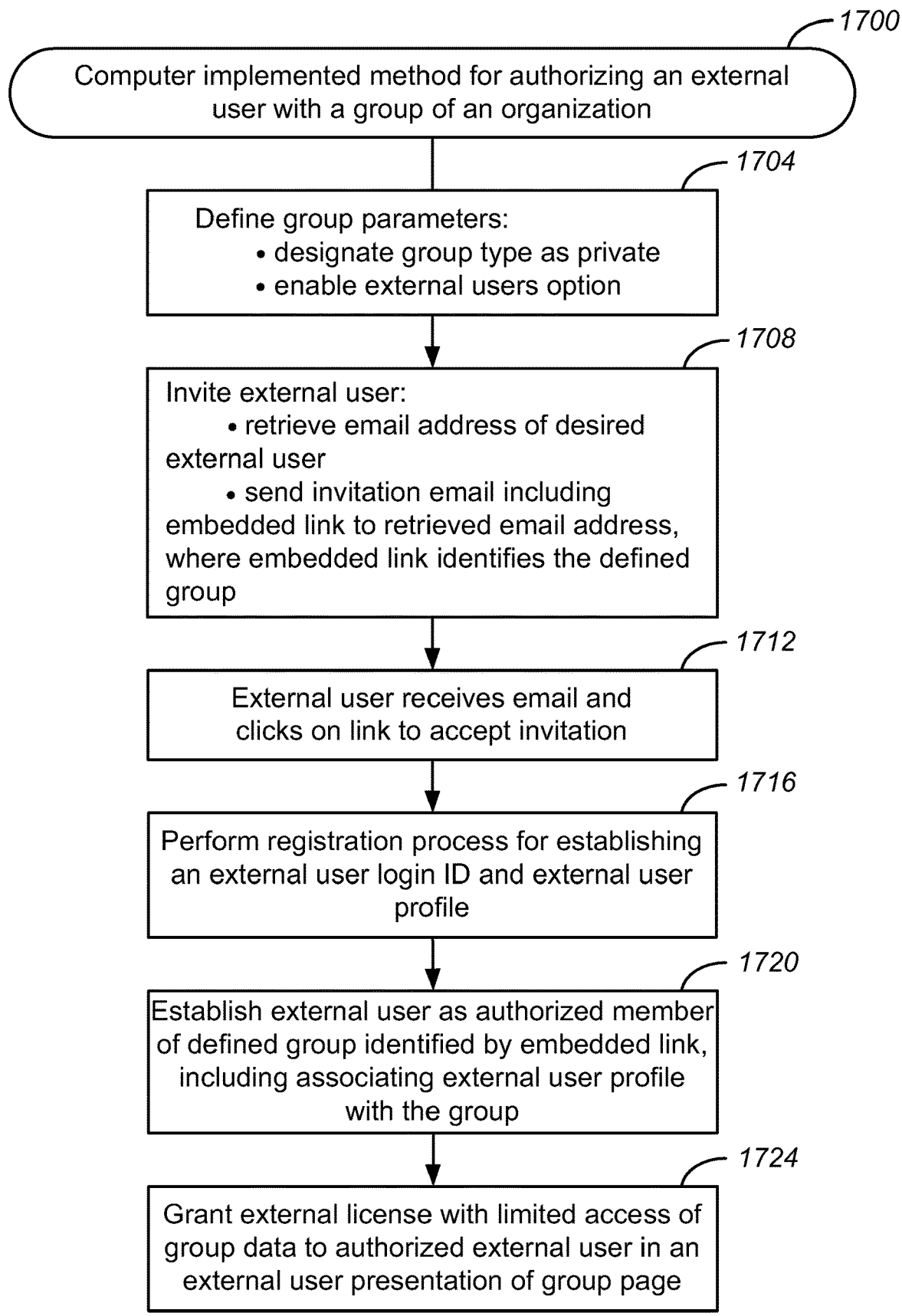
FIG. 17 shows a flowchart of an example of a method 1700 for authorizing an external user with a group of an organization, performed in accordance with some implementations.

FIG. 17 shows a flowchart of an example of a method 1700 for authorizing an external user with a group of an organization. In some implementations, groups of an organization can have different states. For instance, a group designated as "public" means that any internal user can join the group, access private and exposed group data, and otherwise view information updates for the group. Another state of the group is "private", in which an internal user can join the group by permission only. For instance, to join a private group, an internal user sends a message requesting permission to join the group, and a group leader or system administrator grants permission to the internal user to join the group before the requesting user is able to access group data. For instance, a group leader can review the requesting user's credentials and other background information before granting such permission.

In some implementations, another state for a group is "external", in which an external user can be invited to join a group as an external group member and have limited access to group data, as described herein. In some implementations, an external group is one type of a private group. That is, the external user is granted permission to view group data following a similar requesting and granting of permission from a group leader or other user.

Figure 20A:
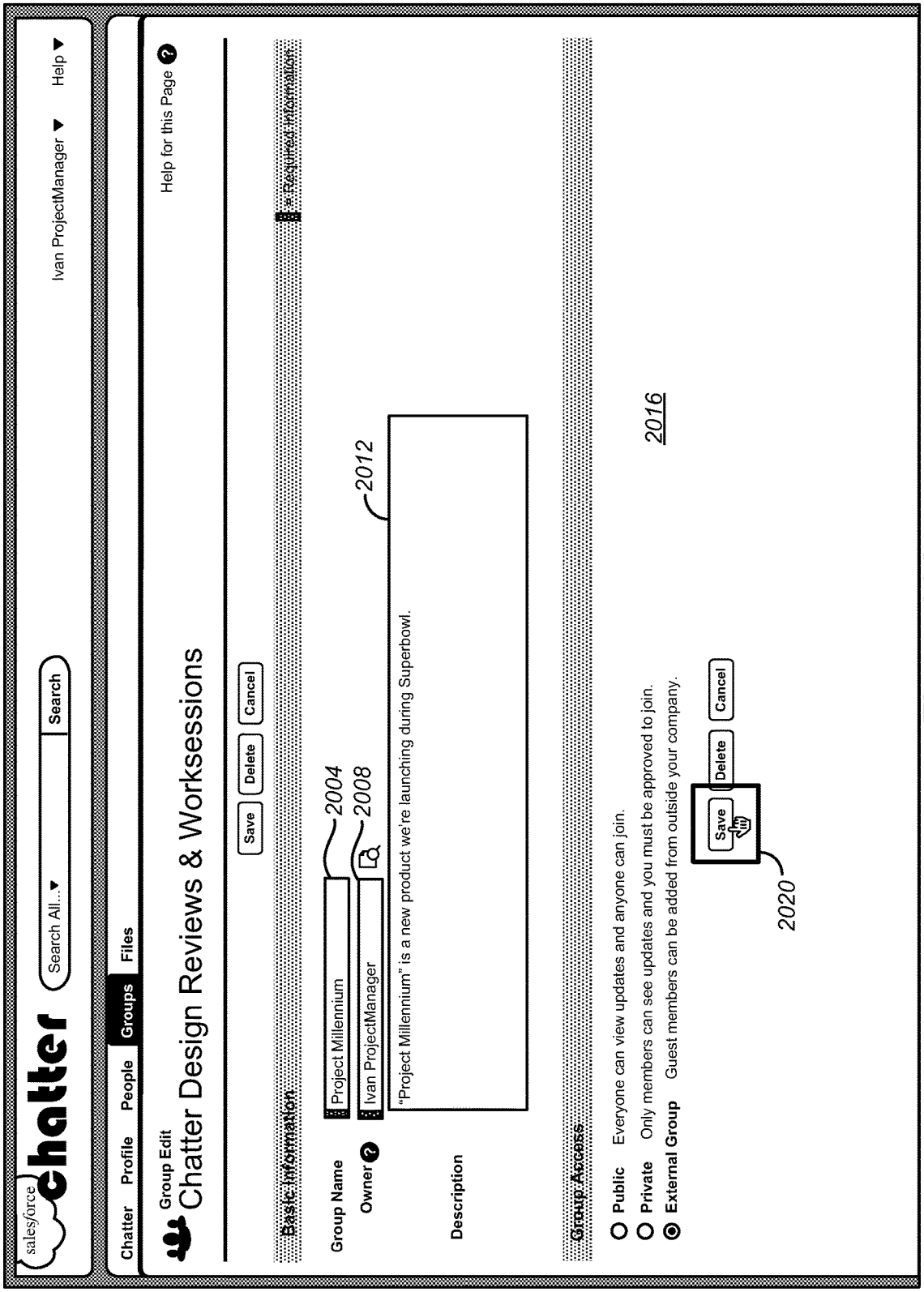
FIGS. 20A-C show examples of GUIs associated with authorization of an external user with a group of an organization, according to some implementations.

FIG. 20A shows an example of a GUI 2000A for authorizing an external user with a group of an organization. In some implementations, GUI 2000A is presented on a display device of a group leader who has the capability to invite and authorize external users as external group members. In this example, the group leader is able to create or edit a group by designating a group name in field 2004, an owner of the group in field 2008, and a description of the group in field 2012. Thus, returning to FIG. 17, in block 1704, the group leader has the capability to define parameters of the group. These parameters include name, owner, and description, as mentioned above, as well as the type of the group in "Group Access" region 2016 of GUI 2000A. In this example, the group leader can select the "external group" option, which designates one example of a private group, as described above, so it is possible to invite external users to join the group. The various parameters of the group in fields 2004-2012 and region 2016 can be saved by the group leader using save button 2020. The group leader can return to GUI 2000A to later modify and customize the various group parameters by clicking on the various fields and selections described above. In some implementations, the GUI 2000A includes additional fields and selections to define various other parameters of a group.

The parameters of a group can be customized to provide different permissions to users, depending on their status as an internal user or authorized external user. For instance, in some implementations, an internal user can be granted permission to view user profiles of all group members, while authorized external users have limited access to such data. For example, an authorized external user could be permitted to view only the names and photos of other group members or otherwise be restricted from viewing all of the user profile data of the various members of the group. In some instances, an authorized external user is only granted permission to view the names of the internal group members, that is, while preventing the display of any other external group members or other data of the internal group members. In another example, an authorized external user is prevented from using a publisher 1908, as shown in FIG. 19A, while internal group members are allowed to use the publisher 1908. In another example, the parameters defined for a group can specify that the names of the other group members 1928 of FIG. 19A are limited to users who are in the same group or groups as the authorized external user. By contrast, an internal user can be granted permission to view the names of all group members, as well as other internal users and external users of the organization. In other instances, internal users can be provided with the capability of accessing and submitting any of various files of the group, while authorized external users have limited capability to only receive files emailed from other users, that is, while being prevented from viewing any files uploaded to the group as indicated in the list of group files 1932.

Figure 20B:
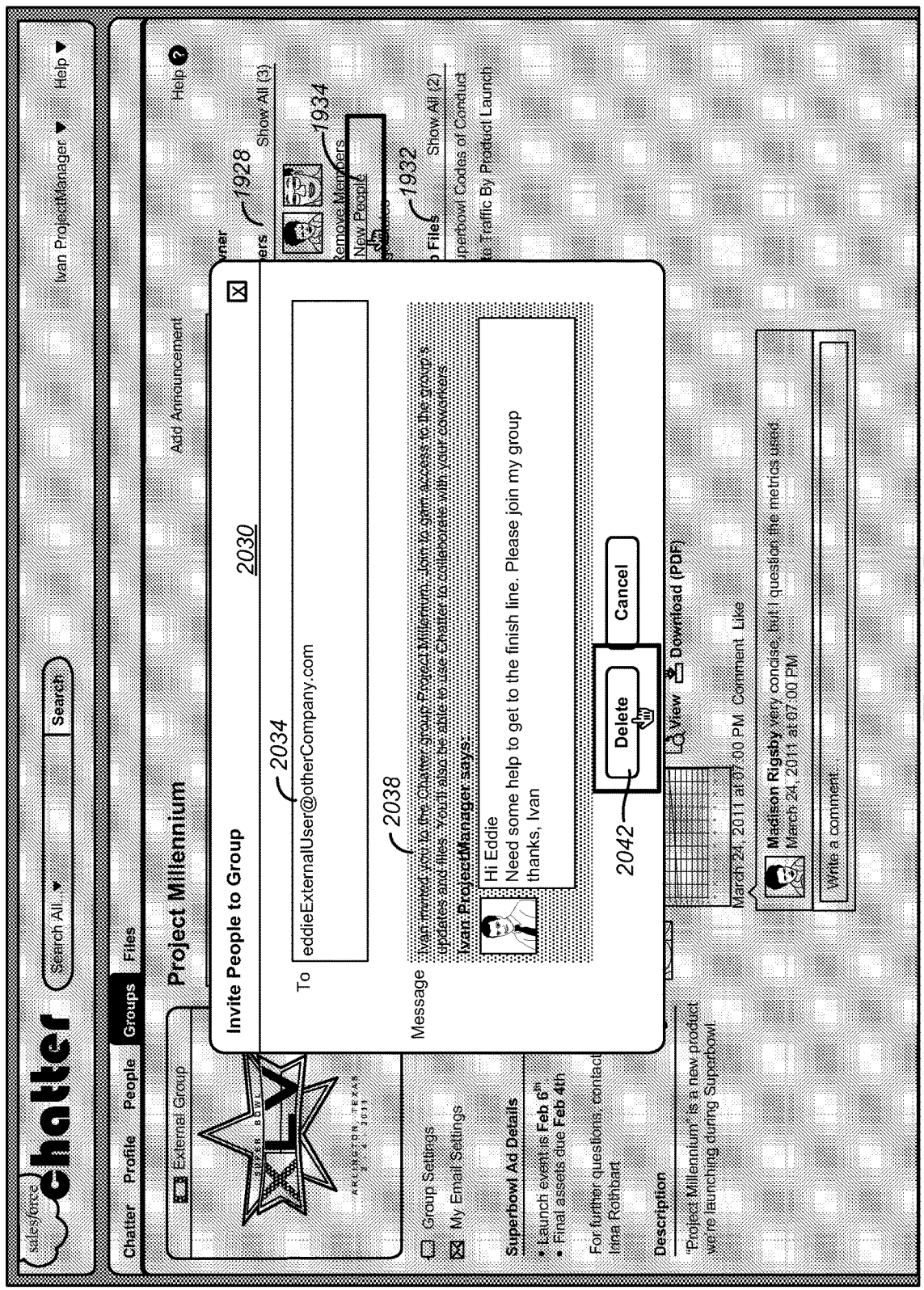

In FIG. 17, in block 1708, after group parameters are defined as described above, an external user can be identified and invited to join the group. Returning to FIG. 19A, by way of example, when a group leader clicks on an "Invite New People" link 1934, a pop-up window 2030 is generated and displayed in a GUI 2000B, as shown in FIG. 20B. In pop-up window 2030, one or more external users can be identified in "To" field 2034 by an appropriate identifier such as the designated external user's email address. An invitation message can be entered in "Message" field 2038 with appropriate content. In field 2034, the email addresses of any desired recipients of the invitation can be manually entered or retrieved from a storage medium such as a database table identifying a list of customers or consultants to the organization. When the user clicks a send button 2042, the content of message field 2038 is sent as an invitation email to the email address(es) specified in field 2034. In some other implementations, the generation and sending of invitations can be automated through an API. For instance, when a contact is created for an external user, a trigger can be coded to automatically generate and send the invitation to the external user's email address.

Figure 20C:
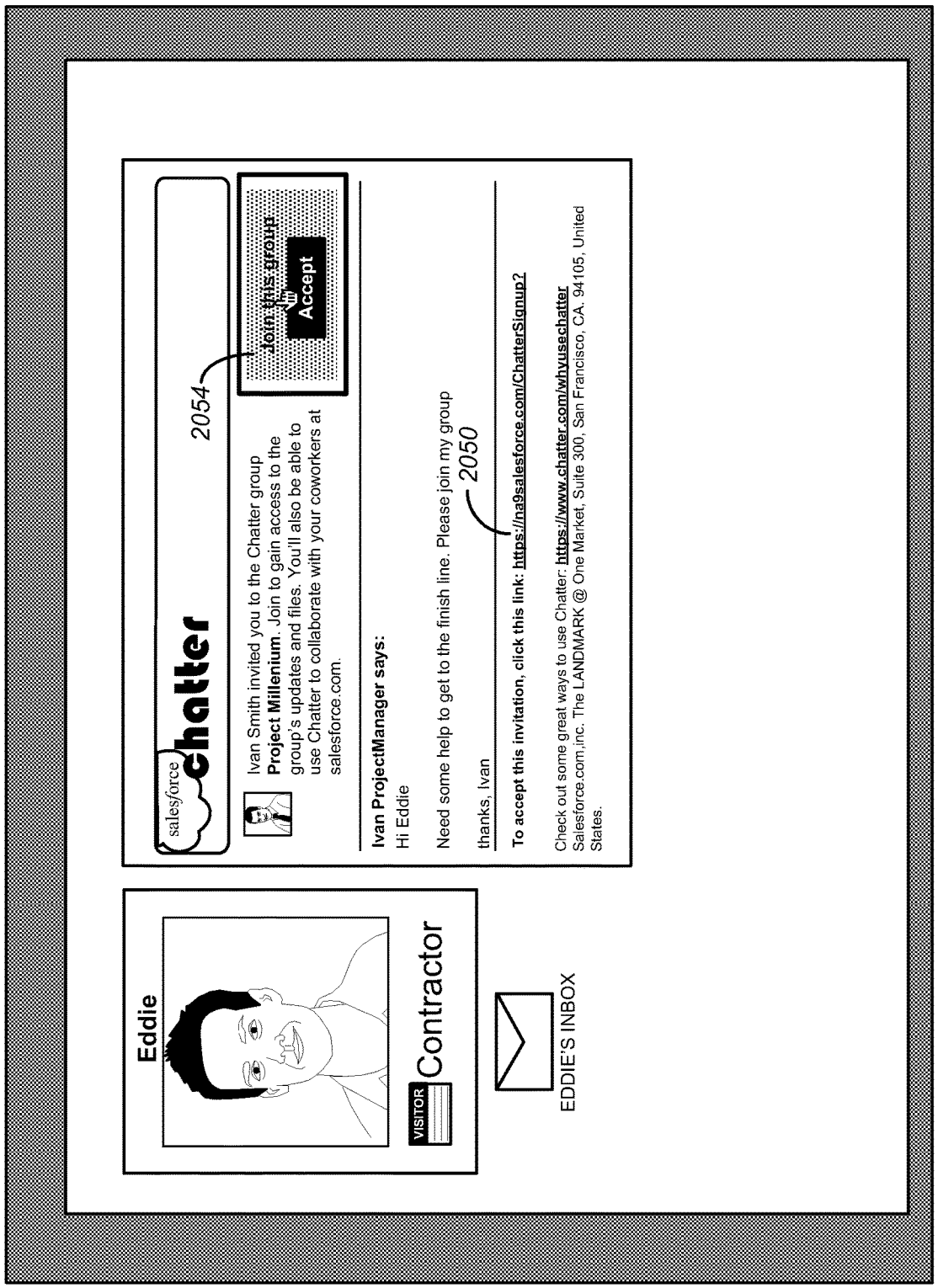

When the invitation email is received by the designated external user, in this example, the email includes an embedded link such as a URL 2050 as shown in the simplified representation of the email in the designated user's inbox, in FIG. 20C. In FIG. 20C, the content of message field 2038 of GUI 2000B is displayed in conjunction with the link 2050, which the user can select to join the group. In addition, a selectable "Accept" button 2054 is linked with URL 2050, so the receiving user can alternatively click on button 2054 to accept the invitation and join the group, in block 1712 of FIG. 17. When the external user who receives the email clicks on link 2050 or button 2054, a registration process can be performed, in block 1716, to establish an external user's User ID, password, and, in some instances, a user profile for the external user.

Figure 21A:
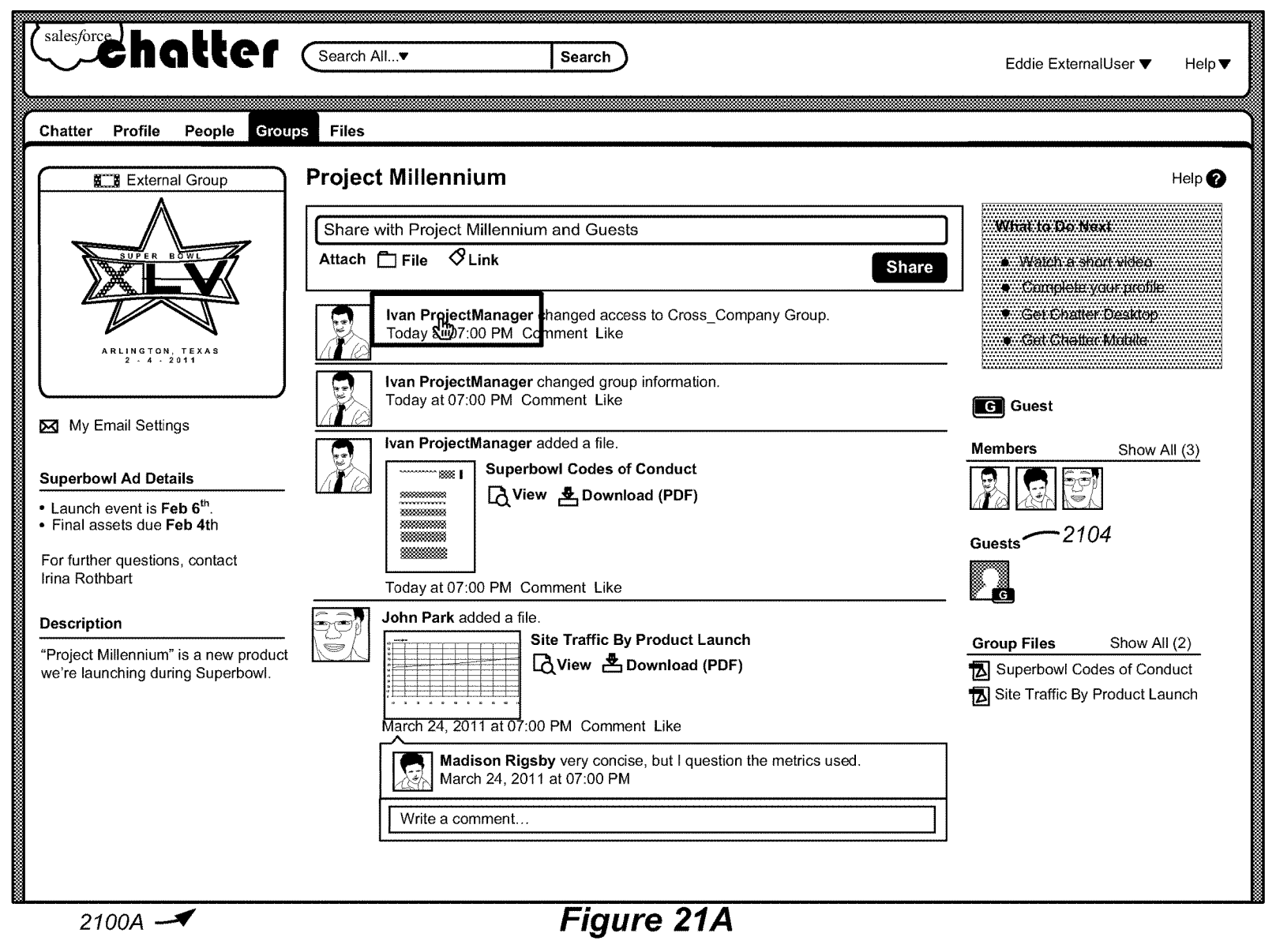

In FIG. 17, in block 1720, after the user has accepted the email invitation and registered with the group in blocks 1712 and 1716, the external user is established as an authorized member of the group identified by the link the user clicked on in block 1712. Thus, in instances when the user has created a user profile, such a profile can be accessible to other members of the group. For instance, in FIG. 21A, showing an example of an internal user presentation of a group page 2100A, authorized external users such as external group members established in block 1720 can be identified as guests 2104, with a thumbnail photo or other identifying information displayed for viewing by other members of the group.

In block 1724, when an external user is established as an authorized participant of the group, in some implementations, an external license is granted to the authorized external user. Such an external license defines permissions for access of group data by the authorized external user. For instance, the external license can specify that part or all of the various types of group data mentioned above can be hidden from the authorized external user. As a result of the different access permissions of internal users and external users, different presentations of the same group page can be generated and displayed depending on the type of user requesting access to the page. When any user requests access to a group page, an internal user presentation, such as page 2100A, or an external user presentation of the group page, such as page 1900B, can be generated based on the license of the user requesting the page.

In some implementations, in the online social network, there are different licenses defined and assigned to different types of users. In general, the license defines the access permissions and restraints, as well as permissible actions, with respect to group data. In some implementations, there is a pricing model corresponding to the licensing scheme. For instance, different licenses providing different access permissions can have different associated prices. In one example, an internal user in the form of a sales agent, who is an employee of the organization, has a customer relations management (CRM) license, which allows the sales agent to identify, access, modify and otherwise use cases. An external license assigned to any authorized external users restricts such users from viewing or otherwise accessing cases, in this example, although the authorized external user is granted permission to access a group feed with feed items submitted by at least internal users of the group. In some examples, while the external license allows the external user to view a group feed of a group of which the authorized external user is a member, the license restricts this external user from viewing group data of any other groups of which the user is not a member. In this paradigm, the external license essentially filters the larger set of group data, for instance, including cases, leads, opportunities, people, groups, and files, down to a subset of such data, for instance, where only a portion of the people, groups, and files of the larger set are displayed for access by the authorized external user.

Some of the implementations of method 1700 and other methods described herein are applicable to short-term projects, for instance, having confined time periods and/or ascertainable deadlines. For instance, an external user authorized according to one or more of the methods described above can have limited capability of communicating and collaborating with other members of the group to work on the project before the deadline. When the deadline is reached, it can be desirable to end the collaboration. At such time, the one or more computing devices configured to perform method 1700 can change the status of an authorized external user to unauthorized. Thus, an external user who completes the methods of authorization and registration as described above can have only a temporary authorized status, in some implementations, dependent upon the status of a project as being in progress or terminated. Thus, the group of an organization can be project-based. For example, a team of internal users can have a three-month time period to complete a project by collaborating with people outside of the organization. Thus, external users can be authorized for only such a three-month period, in this example, to have limited access to group data, to the group feed, and otherwise send messages and communicate with internal group members of the online social network.

Following the same methodologies as described above, the same external user can be invited to join more than one group of the same organization. Thus, another group leader, e.g., a different sales agent of the same organization, can invite the same external user to that sales agent's group, after the external user has already joined a different group of the organization. For instance, the external user can be identified in a database table within the organization for viewing by internal group leaders.

Figure 18:
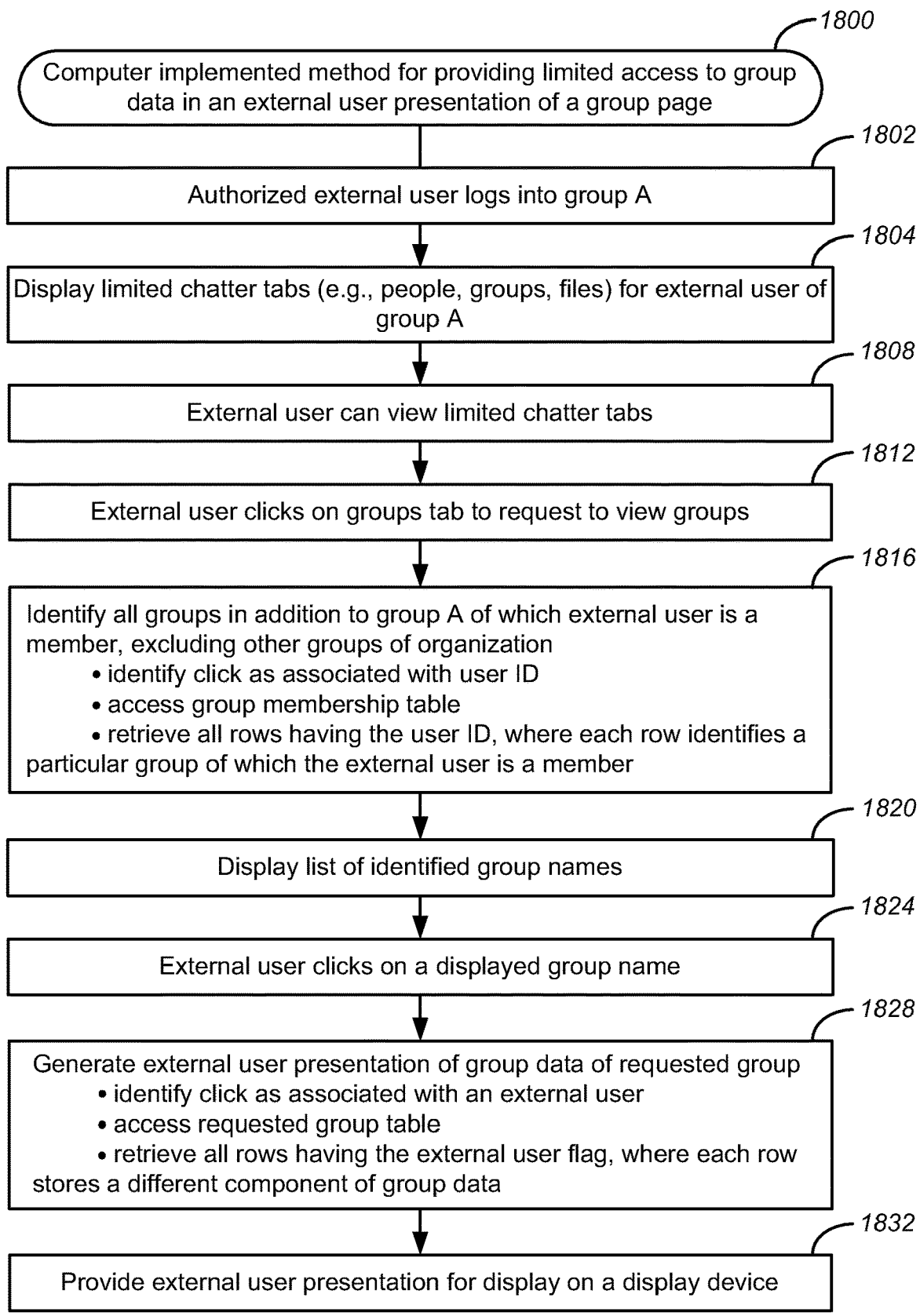
FIG. 18 shows a flowchart of an example of a method 1800 for providing limited access to group data in an external user presentation of a group page, performed in accordance with some implementations.
Figure 21B:
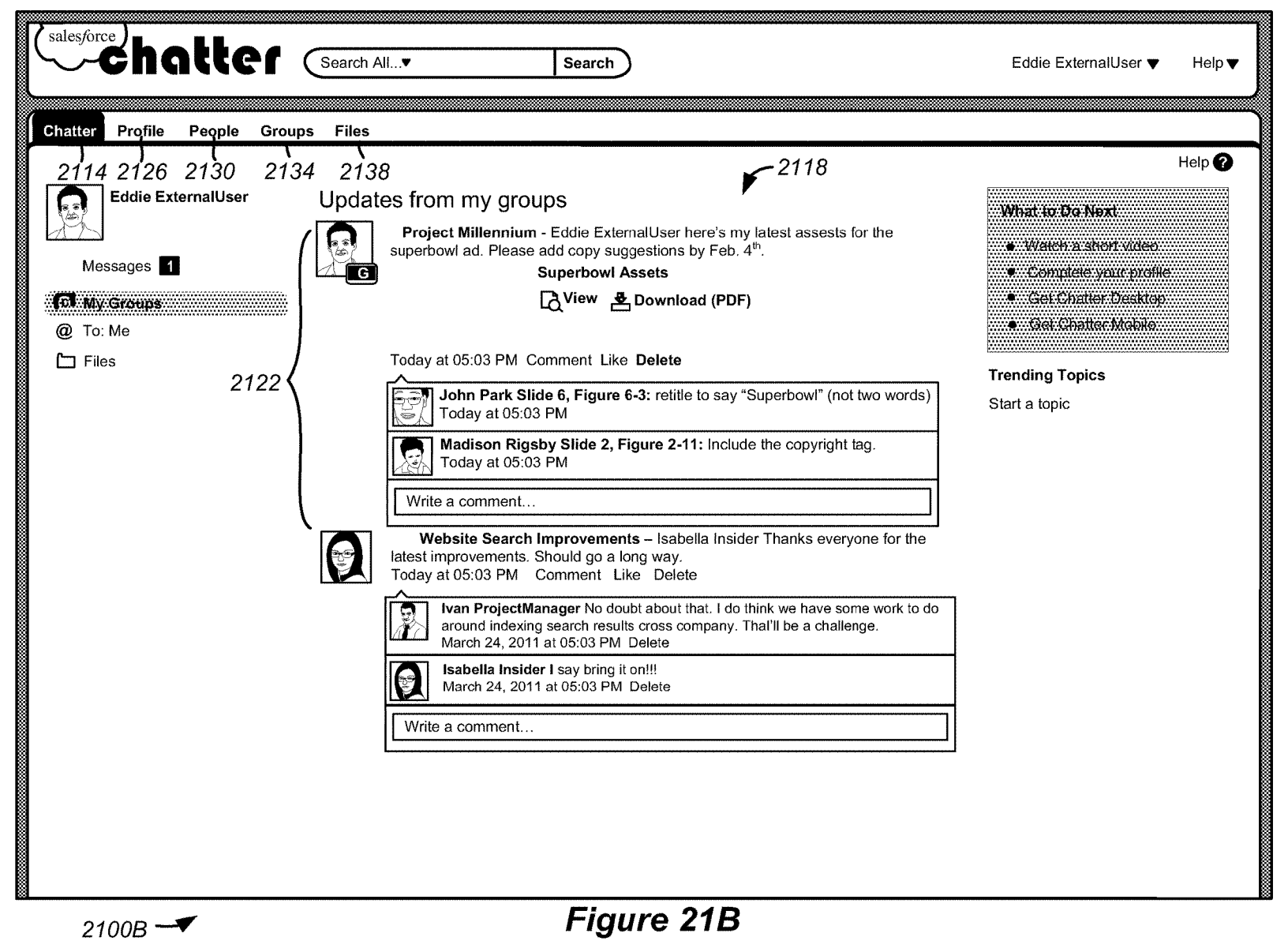

FIG. 18 shows a flowchart of an example of a method 1800 for providing limited access to group data in an external user presentation of a group page, performed in accordance with some implementations. In block 1802, an authorized external user as described above logs into group A, of which the authorized external user is a member. As shown in FIG. 21B, in block 1804 of FIG. 18, only limited portions of group data are displayed to the authorized external user of block 1802. For example, while tab 2114 provides "Chatter", in this example, represented by information feed 2118, only a portion of all of the feed items of the group feed of group A are displayed to this external user. In particular, feed 2118 only displays information updates from groups of which the external user is an authorized member. Thus, in this example, since Eddie ExternalUser is an external group member of both the "Project Millennium" and "Website Open Improvements" groups, Eddie ExternalUser is able to view information updates posted to these various groups under his Chatter tab 2114. These include an information updated submitted by Eddie ExternalUser himself and resulting comments in feed item 2122.

Thus, in FIG. 21B, the authorized external user can view Chatter tab 2114 as well as other tabs including Profile tab 2126, People tab 2130, Groups tab 2134, and Files tab 2138, in block 1808. When the authorized external user viewing page 2100B clicks on any of the respective tabs, a different presentation is generated to display the appropriately limited portion of information. In some implementations, the set of tabs 2114 and 2126-2138 are a subset of a larger group of tabs displayed to internal group users.

In block 1812, by way of example, when Eddie ExternalUser clicks on groups tab 2134, this authorized external user is requesting to view groups of the organization. While there may be a larger set of groups, a presentation is generated to display in a suitable GUI only the groups of the organization of which the authorized external user is a member. Thus, in this example, an organization may have ten or more groups, only two of which the external user is authorized to view, in block 1816.

Thus, one of the security dimensions of the techniques described herein is to show only a list of groups of which the external user is an authorized member rather than a comprehensive list of all groups of the organization. By contrast, an internal user of the organization, such as an employee, can click on a groups tab of the internal user presentation and see all of the various groups of the organization, in some implementations. Thus, in some instances, while an external user can only view groups of which the external user is a member, the internal user can view various private and public groups. Such permissions and restrictions can be desirable to provide internal user access to proprietary and/or confidential information of the organization, while restricting external user access to such information.

Returning to block 1816 of FIG. 18, when an authorized external user clicks a tab, the one or more computing devices performing the method 1800 identifies the click as associated with the User ID of the particular authorized external user. Using the user ID, a group membership table stored in a database can be accessed. In some implementations, by way of example, such a group membership table can include one or more rows for each user, indexed by User ID, where each row identifies a particular group of which the external user is a member. For example, when all of the rows matching the particular User ID are retrieved, in block 1820, a list of the identified group names from the group membership table can be displayed in a list. The list can be presented as part of a user interface, for instance, when the user clicks on the groups tab 2134 of FIG. 21B. When the list is displayed, in block 1820, the external user is then provided with the capability to click on one of the group names in the list to access group data of the requested group, for instance, in the form of a group page, in block 1824.

In block 1828, an external user presentation of the group data of the requested group is generated. As described above, a partial view of the group data, for instance, with data components designated as being exposed, are gathered. Graphical representations of such components can be provided in a suitable external user presentation, as illustrated in the Figures. In one example of block 1828, when a user clicks on a particular group, the click is identified as being associated with the requesting external user's User ID, and a group table storing the group data of the group in a suitable database or other storage medium is accessed. In this example, rows of the table storing components of group data can then be accessed. For instance, a column in the table can be an external user flag indicating which rows of data are exposed for external users. Using such a scheme, rows having the external user flag can be retrieved for presentation in a suitable user interface. In block 1832, the retrieved components can be assembled and provided as an external user presentation, for instance, in a GUI, for display on a display device. Thus, the requesting external user can view the external user presentation.

Returning to FIG. 21B, when a user clicks on the People tab 2130, in some implementations, the resulting presentation in an appropriate GUI shows a subset of the people of the organization. For example, clicking on the people tab can result in the display of only the internal members of the particular groups of which the authorized external user is a member. In some other implementations, only a designated group member, such as the group leader, is identified when clicking on tab 2130. In some other implementations, even when clicking on the people tab 2130, the external user is prevented from viewing any of the people of the organization, including all internal and external group members. Thus, different permissions can be defined according to the desired implementation.

In one example, it is desirable to prevent an authorized external user from logging into the online social network of an organization and accessing a directory of people, particularly internal users, participating in the online social network. For instance, it can be desirable to prevent a customer or potential business partner from accessing and viewing the names, titles, phone numbers, email addresses, and other contact information of employees of the company. Thus, in some implementations, no one is identified to an authorized external user when clicking on People tab 2130. In another implementation, clicking on tab 2130 can result in a presentation of a list of names of members of the group or other groups within an organization, while email addresses, phone numbers, and other contact data of such users are not displayed.

In some implementations, the list of people identified when clicking on tab 2130 only includes users who are members of the same group(s) as the authorized external user. For example, if external user A is in an organization's customer support group and the organization's annual user conference group, clicking on tab 2130 will allow the external user to view any internal users who are members of either group. The group members in the respective groups can be mutually exclusive, or there can be some overlap, depending on the particular application. In this example, when external user A clicks on the People tab 2130, external user A sees the union of the two sets of group members. In another example, when external user A is in more than one group, tab 2130 only displays names of users who are in all of the groups of which external user a is a member.

In some implementations, particularly when authorized external users are permitted to view the names of internal users outside of a particular group of which the external user is a member, the internal users can set parameters in their user profile to expose only selected personal data, which the particular user is comfortable allowing external users to view.

Returning to FIG. 21B, when the authorized external user clicks on the Files tab 2138, a subset of group files or portion of data within a given file is displayed in a suitable presentation. In one example, an authorized external user is only provided with the capability to view and access files of a group of which the external viewer is a member, such as Group Files 1932 of FIG. 19C. Alternatively, or in addition to the partial access of file data provided by clicking on Files tab 2138 in FIG. 21B, a group leader or other group member can share files with external users privately, for instance, by sending an email with the file attached on a file-by-file basis.

Figure 22:
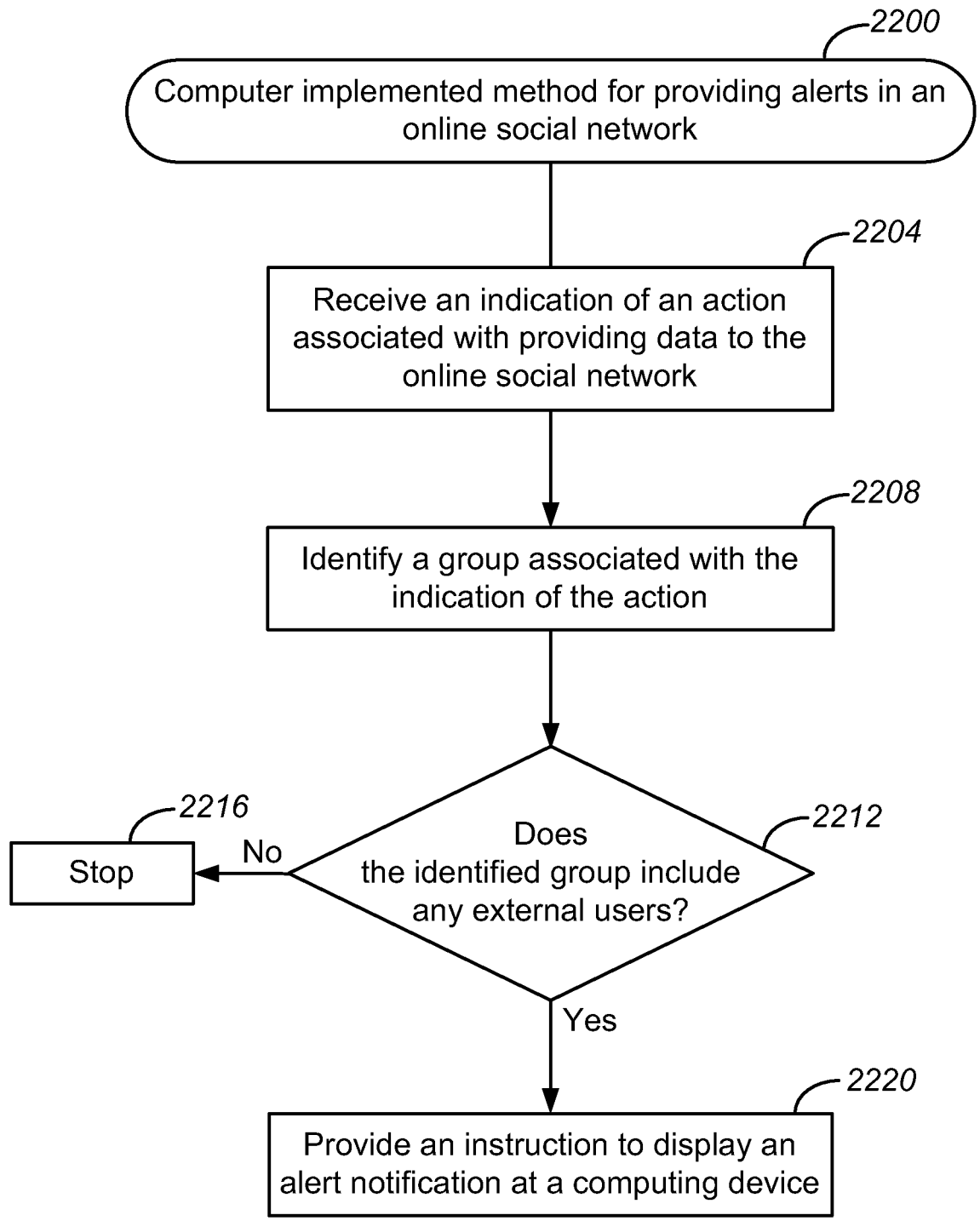
FIG. 22 shows a flowchart of an example of a method 2200 for providing alerts in an online social network, according to some implementations.
Figure 23:
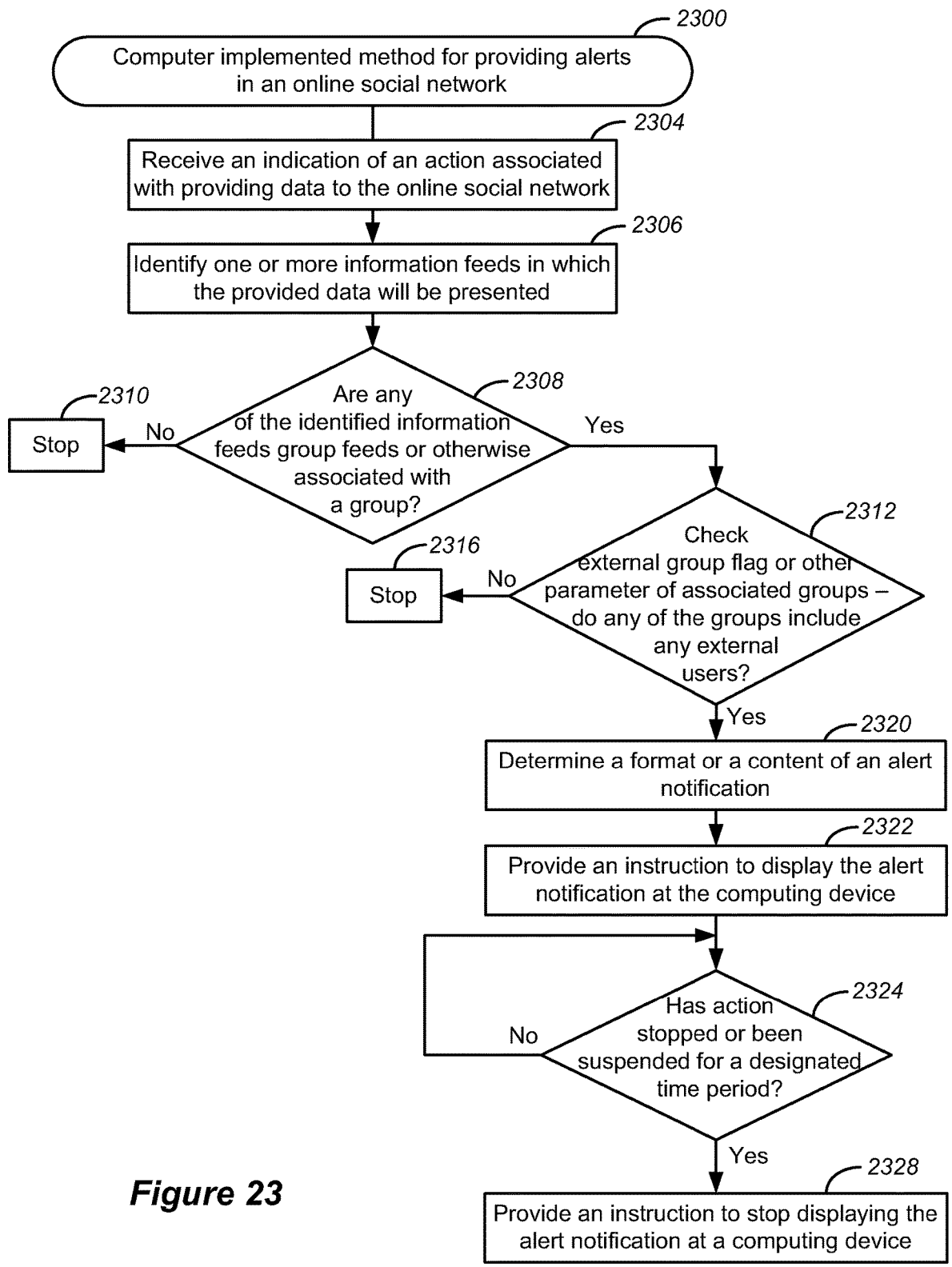
FIG. 23 shows a flowchart of an example of a method 2300 for providing alerts in an online social network, according to some implementations.
Figure 24:
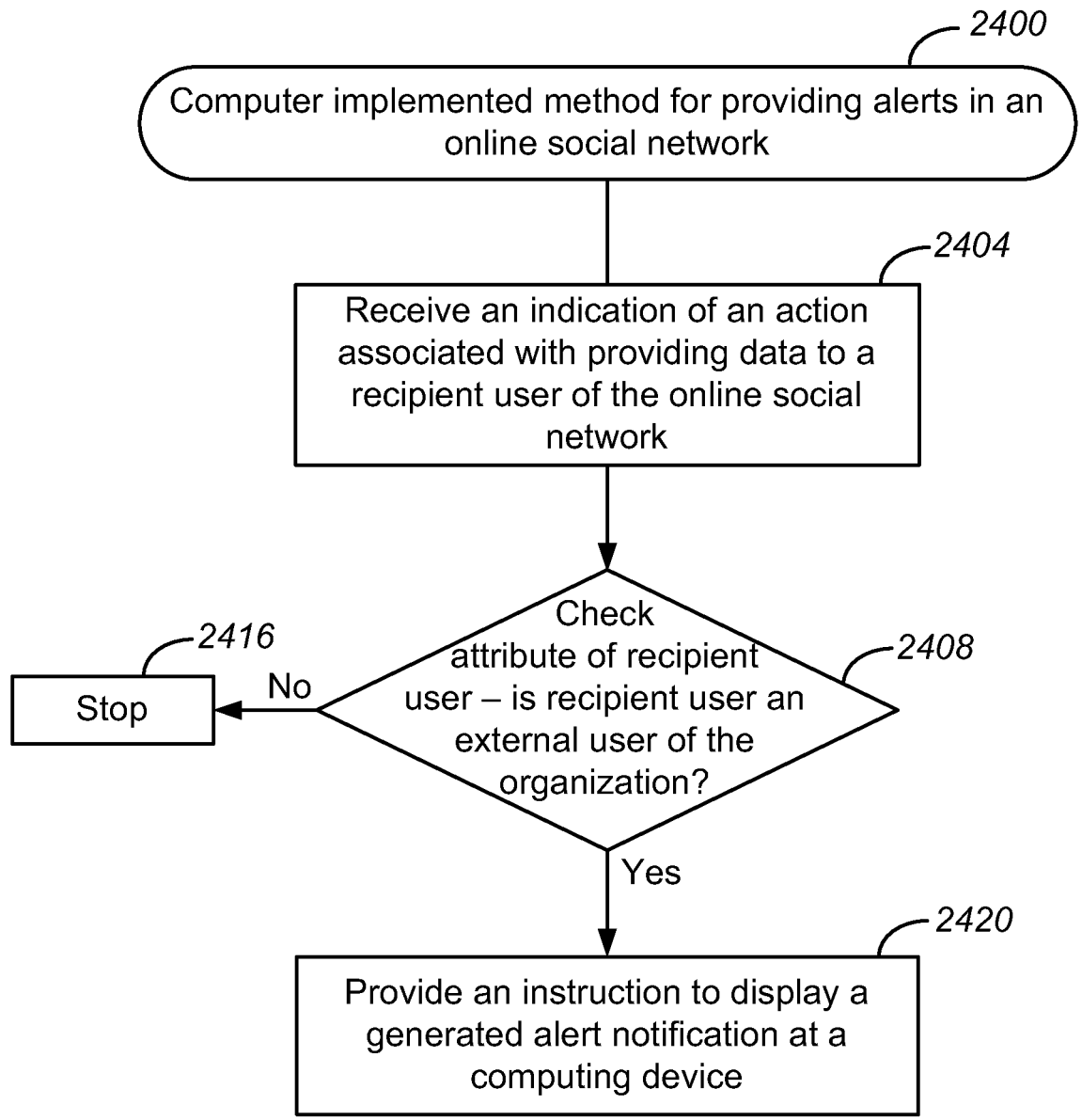
FIG. 24 shows a flowchart of an example of a method 2400 for providing alerts in an online social network, according to some implementations.

FIGS. 22-24 show flowcharts of examples of methods for providing alerts in an online social network, according to some implementations, and are generally described with reference to FIGS. 25-27.

Figure 25:
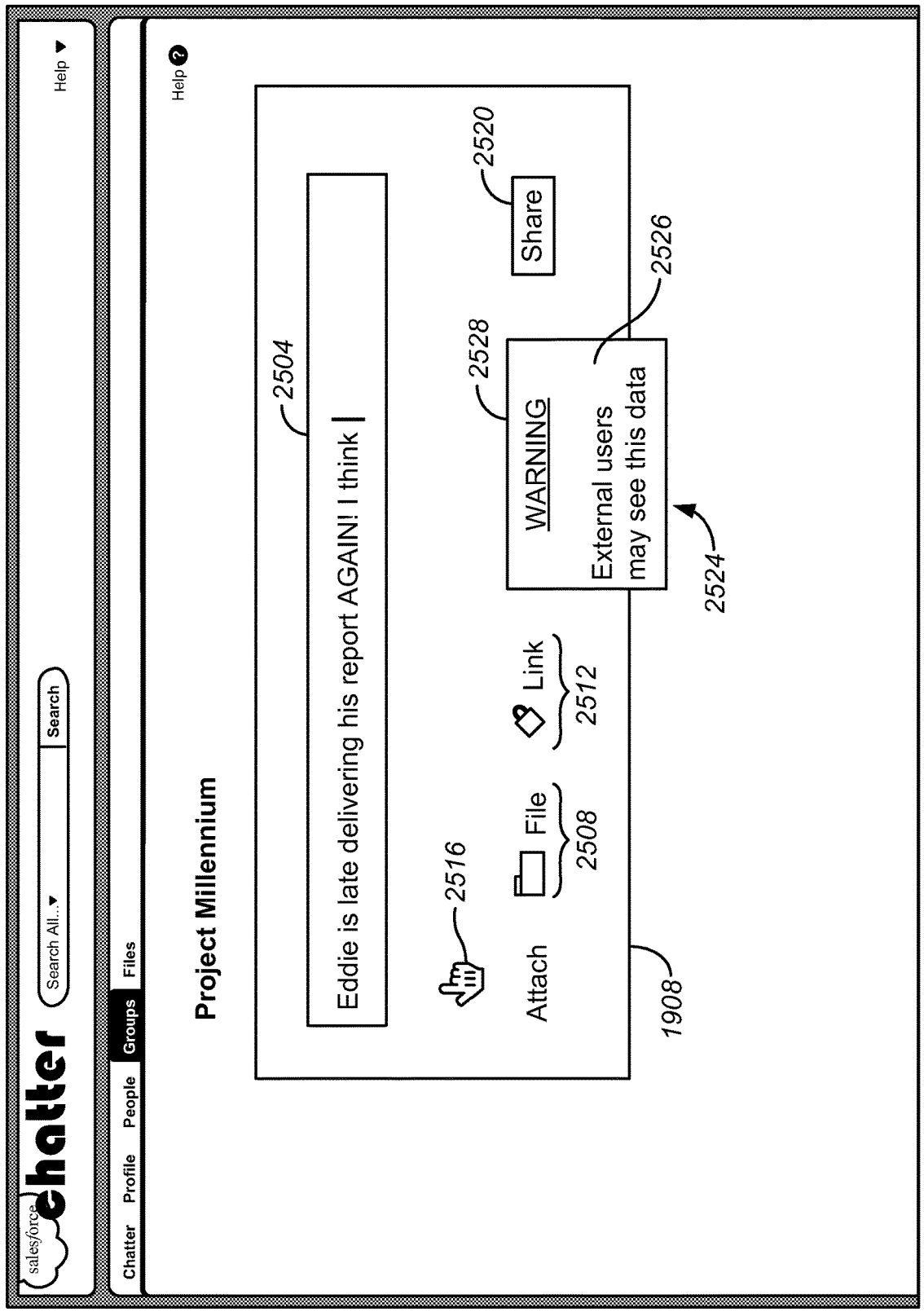
FIG. 25 shows an example of a publisher component displayed in a group page in the form of a GUI, according to some implementations.

FIG. 25 shows an example of a publisher component displayed in a group page, according to some implementations. In FIG. 25, the publisher component 1908 of the "Project Millennium" group page 1900C as described above is shown. The publisher component 1908 includes a data entry field 2504 for entering and submitting user input data as an information update to the group feed 1904 and includes several selections. The selections include an attach file selection 2508 and an attach link selection 2512. A user can use an input device such as a mouse to move a graphical pointer 2516 to appropriate regions of publisher component 1908 to click on and select any of the various fields and components. For example, a user can move the pointer 2516 over data entry field 2504 and click in the field 2504 to type text and enter various characters and symbols. When the user is satisfied with the data entered in field 2504, the user can move pointer 2516 over a share button 2520. Clicking on the share button 2520 causes the data entered in field 2504 to be submitted as a post to one or more information feeds, such as the Project Millennium group feed. Clicking on the attach file selection 2508 allows the user to attach a desired file to the post before submitting the post and the attached file(s) using share button 2520. By the same token, moving pointer 2516 over link selection 2512 allows the user to select or enter a hyperlink or link to any data objects in the online social network or other networks for submission with the post to one or more information feeds.

Figure 26:
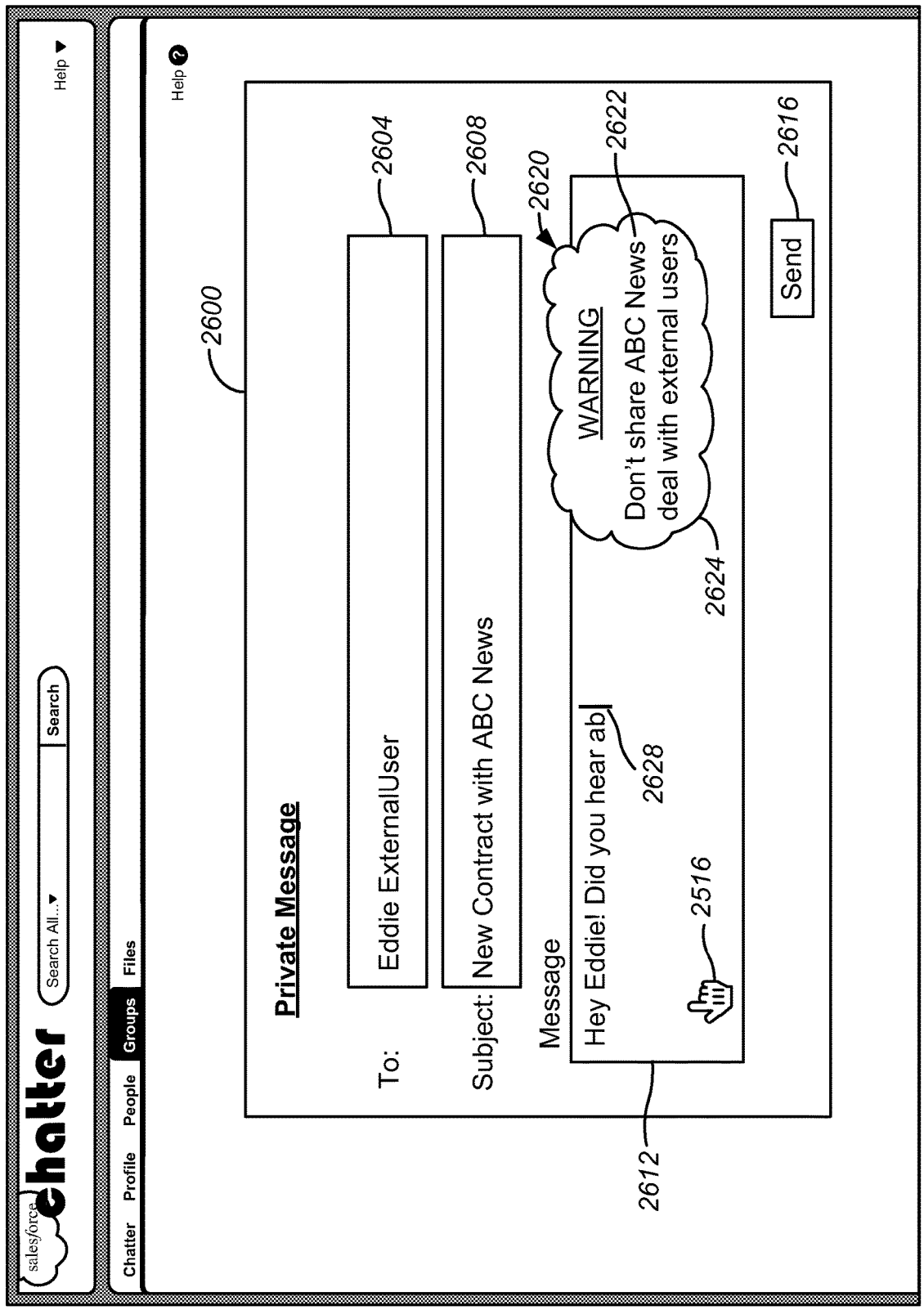
FIG. 26 shows an example of a pop-up window for generating a private message in a GUI, according to some implementations.

FIG. 26 shows an example of a pop-up window 2600 for generating a private message in a GUI, according to some implementations. Such a private message can be sent between or among users in the online social network. In some implementations, such messages are considered private because the messages are not submitted for presentation in any information feeds for possible viewing by users other than the designated recipients. For example, the private message window 2600 can be generated as an overlay over group page 1900C in a user interface when a user clicks on a "send private message" button 1954 shown in FIG. 19C. In FIG. 26, private message window 2600 includes a "To" data entry field 2604, in which a user can input or otherwise select specific users as recipients of the private message. The user creating the private message can enter an appropriate subject in "Subject" field 2608. The content of the private message can be entered in data entry field 2612. When the user is satisfied with the data entered in fields 2604, 2608, and 2612, the user can move pointer 2516 over send button 2616. Clicking the send button 2616 causes the private message created in window 2600 to be sent over one or more networks to the designated recipients in field 2604 without any indication of the private message or contents of the private message being shared in information feeds.

Figure 27:
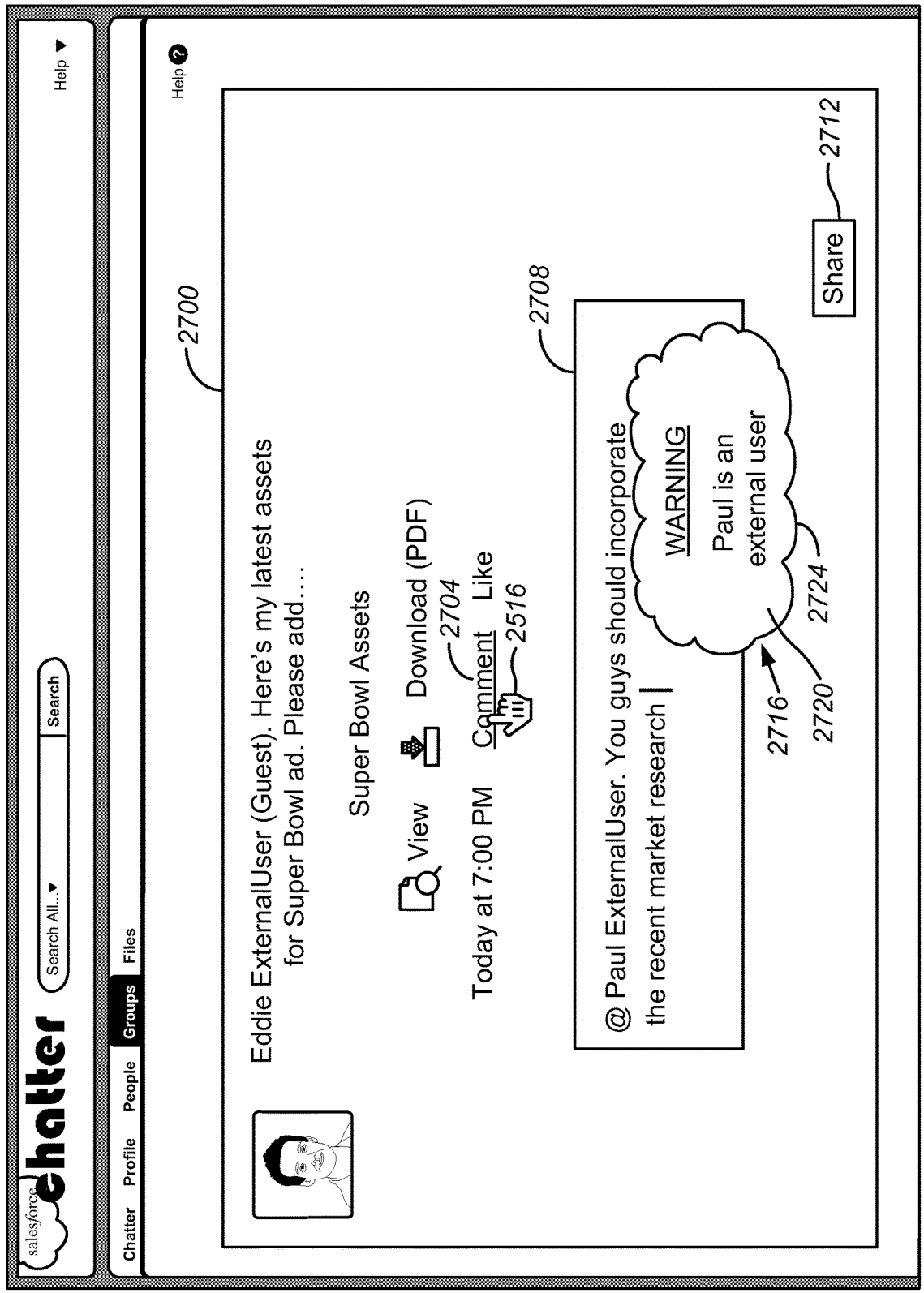
FIG. 27 shows an example of a post in an information feed as displayed in a GUI, according to some implementations.

FIG. 27 shows an example of a post in an information feed as displayed in a GUI, according to some implementations. In FIG. 27, an updated state of Eddie ExternalUser's post 1940, as shown in FIG. 19C, is shown. In FIG. 27, a user viewing post 1940 in feed 1904 of FIG. 19C or another feed has moved pointer 2516 over a comment selection 2704. Clicking on comment selection 2704 using an input device such as a mouse causes a comment field 2708 to be generated within post 2700 as displayed in the information feed. As generally described above, the user can then enter desired text and symbols to create commentary in field 2708 regarding Eddie ExternalUser's original post. When the user is satisfied with the content of field 2708, the user can move pointer 2516 to a share button 2712. Clicking on share button 2712 causes the data in comment field 2708 to be submitted for presentation in group feed 1904 and any other information feeds in which post 1940 was originally presented, in similar format as shown in FIG. 27 for viewing by other users having access to such feeds.

FIG. 22 shows a flowchart of an example of a method 2200 for providing alerts in an online social network, according to some implementations. In FIG. 22, in block 2204, one or more computing devices performing method 2200 receives an indication of an action associated with providing data to the online social network. Various data can be provided in block 2204 as can various actions associated with providing such data as described in greater detail in the examples herein. In one example of method 2200, an app server 288 in the on-demand database service environment 200 of FIGS. 2A and 2B can receive the indication of block 2204 in the form of a network communication from an internal or external user operating a user system 12 as shown in FIGS. 1A and 1B. In other instances, the indication is received from a proxy on behalf of another user or information source. Any of the servers described above with reference to FIG. 2B or other computing devices described herein can be configured to receive and process indications of actions and otherwise perform the blocks of method 2200. In block 2204, any indications of actions received by one or more computing devices performing method 2200 can be received as signals over network 14 of FIGS. 1A and 1B, that is, with any such indications transmitted from one of the user systems 12. In an alternative example, the receipt of an indication of an action in block 2204 is received at the same computing device or devices operated by a user. In such alternative examples, additional processing of the blocks of method 2200 can also be performed at the same computing device or devices.

Various actions can be identified and indicated in block 2204. Often, such actions are caused to occur by a user interacting with a user interface or component of a user interface as described in the examples herein. In other examples, such actions occur or are generated by one or more computing devices operating to cause such actions to occur. Examples of actions, which can be indicated in block

2204, include selection of a publisher component in a user interface. For example, in FIGS. 19C and 25, a user viewing the presentation of group page 1900C or a portion of page 1900C such as feed 1904 can move pointer 1958 in FIG. 19C or pointer 2516 in FIG. 25 over publisher component 1908. The publisher component can be selected by the user clicking on any region within component 1908 such as data entry field 2504 or attach file selection 2508. The selection of other data entry fields in other components and regions of a group page or other presentation in a user interface as described herein can also serve as an action in block 2204. For instance, clicking on message field 2612 of private message window 2600 in FIG. 26 or clicking on comment field 2708 of post 2700 in FIG. 27 can serve as an action. Other examples of actions to be indicated in block 2204 include activation of any designated selections in a user interface, such as clicking on a "comment" or "like" selection in post 1940 as displayed in group page 1900C in FIG. 19C, the attach file selection 2508 and attach link selection 2512 of FIG. 25, or the comment selection 2704 of FIG. 27. Other various selections that a user can click on or otherwise select as disclosed herein can be designated.

Another example of an action to be indicated in block 2204 includes a pointer hovering over any designated selection, component, or region in an appropriate user interface. For example, in FIG. 19C, the positioning of pointer 1958 over any region of group feed 1904 can be indicated in block 2204. Hovering pointer 1958 over certain types of information updates in feed 1904 can cause the indication to be generated in block 2204. In another example, the action is hovering the pointer 1958 over any guests 1944 identified in the presentation of page 1900C. In some examples, hovering pointer over publisher component 1908 of FIG. 25, private message window 2600 of FIG. 26, post 2700 of FIG. 27, or any designated selections or regions such as data entry fields within such displayed elements in a user interface can serve as actions to be indicated in block 2204. In other examples, the action indicated in block 2204 is the receipt of input data at a computing device such as a user system. For example, data entered in field 2504 of publisher component 1908, message field 2612 of private message window 2600, or comment field 2708 of post 2700 can serve as the action to be indicated in block 2204. In some instances, only the entering of designated keywords or other specified data in such fields are of interest as actions to be indicated in block 2204. For instance, the mention of the name, "Eddie," or the name of other external users in FIG. 25 can be actions to be indicated. Various characters, symbols, words, and phrases can be designated, such that only the entering of data mentioning such information, for instance, in fields 2504, 2612, and 2708 can be actions to be indicated in block 2204.

Other actions that can be indicated in block 2204 include the attachment of files or links, for example, using selections 2508 and 2512 of FIG. 25. In some instances, the actions of interest are more granular, such that only files having a designated type, a designated name, or a designated content are identified as actions in block 2204. For instance, using publisher component 1928, method 2200 can be tailored such that only the attachment of files having certain keywords or phrases in the title of the file cause the indication to be generated in block 2204. In other examples, the content of the file to be attached is screened to identify certain subjects or data of interest.

In some instances, activation of a private message selection, such as the "send private message" button 1954 of FIG. 19C, is the action indicated in block 2204. That is, in some instances, as soon as a user clicks on button 1954, this selection is indicated in block 2204 of FIG. 22. In other instances, the entering of names of particular recipients in To field 2604 or the input of certain keywords in Subject field 2608 of FIG. 26 are the actions to be indicated in block 2204. Such can be beneficial in instances where a private message may be sent to many people, one or more of whom is an external user. Thus, when an internal user hits a "Reply All" button in response to a private message, the internal user can receive an immediate notification indicating that one of the recipients of the reply private message is external. Thus, the internal user can be automatically notified even if the internal user did not check the names of all of the recipients of the reply message in To field 2604.

Other examples of actions to be indicated in block 2204 include the activation of public message selections in various user interfaces as disclosed herein. For instance, the share button 2520 of publisher component 1908 in FIG. 25 and the share button 2712 of post 2700 in FIG. 27 are examples of public message selections. In one example, when the user hovers a pointer 2516 over the share button, it can be assumed that the data entered by the user is about to be shared publicly, that is, to any viewers of the information feeds receiving such data. Thus, in some examples, the hovering of a pointer over the button can be of interest as an action indicated in block 2204.

Another example of a desired action to be indicated in block 2204 is the receipt of input data including one or more designated symbols often in conjunction with one or more identifications of recipients. For instance, a directed public message can be created in some online social networks using the @mention feature. In some online social networks, users who view an @mention in an information feed can discover a particular person and often link to his or her profile when the person's name appears in an @mention in the feed. For example, in FIG. 27, Paul ExternalUser is identified with an @mention in field 2708. That is, the user generating comments in field 2708 has specifically identified Paul ExternalUser after the @ symbol. In this way, when the comments of field 2708 are presented in an information feed, any user viewing the presented comments will see Paul explicitly identified in the content of the comments. Other characters or symbols can serve as alternatives to the @ symbol, depending on the desired implementation. In some instances, the @mention can identify an external user in the context of a conversation or group which the external user does not have permission to access or otherwise participate in. Thus, when a user is creating a comment such as the commentary in field 2708 of FIG. 27, it can be desirable to notify the user that the person identified by the @ symbol is external. Thus, the mention of designated names of persons after entering the @ symbol can be actions to be indicated in block 2204.

In FIG. 22, when the indication of the action of block 2204 is received by the one or more computing devices performing method 2200, the method proceeds to block 2208, in which the one or more computing devices are configured to identify one or more groups associated with the indication of the action. Techniques for identifying such groups are described in greater detail below. When such groups are identified, in block 2212, the one or more computing devices are configured to determine whether the identified group includes any external users. Techniques for identifying such external groups are described in greater detail below. In block 2212, when the group does not include any external users, the method terminates in block 2216. Returning to block 2212, when the identified group includes one or more external users, the method proceeds to block 2220, in which an instruction to display an alert notification is provided. In some examples, one or more computing devices such as app server 288 in the on-demand database service environment of FIGS. 2A and 2B sends the instruction to display the alert notification to a user system 12 of FIGS. 1A and 1B, when the user system 12 is where the action of block 2204 occurred. In other instances, block 2220 of method 2200 can be performed at such a user system, in cases where the user system is performing part or all of method 2200. Thus, the instruction to display the alert notification of block 2220 can be generated at a server or a user system, depending on the particular implementation.

Various implementations of the alert notification are possible. The alert notification can take various forms, as shown in FIGS. 25-27. For example, in FIG. 25, an alert notification 2524 is generated and displayed in accordance with method 2200 or method 2300, described below, as a graphical overlay partially covering a portion of publisher component 1908. The alert notification includes a warning message 2526 with appropriate text, "External users may see this data." The content of alert notification 2524 is surrounded by a graphical border 2528 in the shape of a box, in this example.

When an alert notification is generated, such as alert notification 2524 of FIG. 25, a region of the user interface in which the alert notification is displayed is caused to change state in the display of information. That is, in the example of FIG. 25, the publisher component 1908 has a first state in which the alert notification 2524 is not displayed and a second state when the alert notification 2524 is displayed, for example, responsive to the determinations of method 2200.

Other examples of alert notifications are possible, as shown in FIGS. 26 and 27. In FIG. 26, in the context of a private message, an alert notification 2620 can be generated and displayed, for example, performing method 2400 described in greater detail below. In this example, the alert notification 2620 includes content 2622 surrounded by a cloud-shaped border 2624. As with the displayed component of FIG. 25, the private message window 2600 experiences a change of state in the visual presentation of window 2600. That is, private message window 2600 has a first state in which the alert notification 2620 is not displayed and a second state in which the alert notification 2620 is generated and displayed, for example, performing method 2400 described below. Another example of an alert notification is in FIG. 27, in which an alert notification 2716 is generated having content 2720 surrounded by a cloud-shaped border 2724. Again, as with FIGS. 25 and 26, the displayed post 2700 experiences a change of state in visual presentation from a first state in which alert notification 2716 is not displayed to a second state in which alert notification 2716 is displayed. The alert notification 2716 can be generated by performing method 2200 or method 2300, by way of example.

Various changes of state in the presentation of the alert notification in various contexts such as FIGS. 25-27 are possible. While the display of alert notifications 2524, 2620, and 2716 represent a change of state of a visual presentation of one or more components to a state in which the alert notification overlays at least a portion of such components, other changes of state are possible. For example, the alert notification can be in the form of a color change or highlight in a designated field or region of the user interface. For instance, in FIG. 25, the color of text entered in data entry field 2504 can change color from black to red. In another example, a color of the displayed publisher component 1908 can change, or publisher component 1908 can be highlighted or have a graphical border generated and displayed around publisher component 1908 as one form of the alert notification. In other examples, the display of publisher component 1908 in FIG. 25 changes state back and forth between the display and non-display of alert notification 2524, to provide a flashing on/off presentation of alert notification 2524. In another example, other flashing indicators such as warning symbols and flashing red lights can be displayed in a region in which publisher component 1908 or another component is displayed in a user interface. These same examples of various formats of alert notifications are equally applicable to FIGS. 26 and 27. The color of the interior or border of message field 2612 can change color or be highlighted as one form of alert notification. Other fields of private message window 2600 such as fields 2604 or 2608 or the data entered in those fields can be made to change color or be highlighted as one form of alert notification. The same general examples are applicable to comment field 2708 and other regions of feed item 2700 in FIG. 27. In another example, the send button 2616 or share buttons 2520 and 2712 can flash, be highlighted, or change color as one form of the alert notification.

When an alert notification is generated and displayed in a user interface, for instance, according to an instruction as described above in block 2220 in FIG. 22, in some examples, the alert notification is caused to be displayed in a designated region of a user interface. For example, in FIG. 25, the alert notification 2524 is positioned such that the notification is in close spatial proximity to both data entry field 2504 and share button 2520. In some alternative examples, the alert notification 2524 can be positioned between field 2504 and button 2520. In these various examples, it can be desirable to position the alert notification in such a manner so a user's eyes are more likely to see the notification when entering data in field 2504 or moving pointer 2516 between regions such as field 2504 and button 2520. In the example of FIG. 25, the location of alert notification 2524 adjacent to share button 2520 and immediately below field 2504 at least partially overlaying the publisher component 1908 is intentional so the pointer 2516 and/or the user's eyes see notification 2524 after entering commentary in field 2504 but before clicking on share button 2520. The same is true for the spatial positioning of alert notification 2716 in FIG. 27 in relation to comment field 2708 and share button 2712. In FIG. 26, the alert notification 2620 is positioned so that it overlays a significant amount of space of comment field 2612. In this way, the user's cursor will pass under alert notification 2620 as the user continues to enter commentary, with the intent of forcing the user's eyes to see notification 2620 before pressing send button 2616.

In other implementations, other designated regions of a user interface, such as a designated alerts region or other notification region can be configured to receive and display alert notifications, for example, responsive to instructions in block 2220 of method 2200.

FIG. 23 shows a flowchart of an example of a method 2300 for providing alerts in an online social network, according to some implementations. In block 2304, an indication of an action associated with providing data to the online social network is received at a computing device, as generally described above with reference to block 2204 of method 2200. In some instances, when the indication is received in block 2304, the one or more computing devices performing method 2300 are configured to identify a user or users causing or otherwise associated with the action. In particular, in some instances it can be desirable to identify whether the user inputting data is an internal user or external user. For example, in some implementations, alert notifications as described herein are only displayed to internal users before sharing information with a group that may include external users. In other implementations, such alert notifications are desirably displayed only to external users, while in some other implementations, such alert notifications are generated and displayed to both internal and external users. The identification of a user or users associated with the action of block 2304 can be achieved by checking a user ID or user profile identified at the user system at which the action occurs.

In block 2306, the one or more computing devices performing method 2300 are configured to identify one or more information feeds in which provided data will be presented. For instance, a user operating a user system to cause the various actions described above can be viewing any of various pages. Various types of information feeds such as news feeds, records feeds, user profile feeds, and group feeds can be displayed in the context of a user interface and designated by a user as an intended destination for data provided in block 2304. In some instances, a system can be configured so that group feeds receive messages and other information updates indirectly when the user submits such information to another type of feed. Thus, in block 2306, any and all such feeds can be identified in some implementations.

In block 2308, the one or more computing devices performing method 2300 are configured to determine whether any of the identified information feeds of block 2306 are group feeds or are otherwise associated with a group. For example, while the information feed or feeds indicated as intended destinations for a submitted post or comment in block 2306 are not group feeds, in some implementations, the system can be configured so that one or more group feeds receive posts or comments indirectly from other information feeds, such as a user profile feed, a news feed, or a record feed. In block 2308, the identification of any group feeds or feeds indirectly providing data to a group can be performed by checking group IDs and linked feeds stored in a suitable database table. If the identified feeds are not group feeds or otherwise associated with a group, the method 2300 terminates in block 2310.

If one or more group feeds are identified in block 2308, the method proceeds to block 2312, in which a group flag or other parameter of any identified groups can be checked to determine whether the group has one or more external users. For example, a database table can be maintained with group information for particular groups including a column with a flag indicating whether the group is configured to have external users. Thus, in some implementations, by checking a group parameter, it is irrelevant who particular members of the group are.

If any of the groups identified in block 2308 do not have any external users, for instance, by checking an external group flag in block 2312, the method stops in block 2316. Returning to block 2312, when any of the groups do include an external user, the one or more computing devices performing method 2300 are configured to determine a format or content of the alert notification to be displayed. Thus, in some instances, the format or content of the particular alert notification can be dependent on and governed by particulars of the action, the indication of the action, and/or the data provided in block 2304. Returning to the various examples of actions described above with respect to FIGS. 19C and 25-27, different alert notifications can be generated or selected depending on the type of action, such as selection of a publisher component, selection of a data entry field, activation of a designated selection, a pointer hovering over a designated selection, component, or region, the receipt of input data, such as designated keywords or other data, the attachment of a file, such as a file having a designated type, a designated name, or designated content, the activation of a private message selection, the activation of a public message selection, the receipt of input data including a designated symbol and/or identification of a designated recipient user, and other actions.

In one example, a list of a variety of different formats and contents of alert notifications is stored on a storage medium, and the particular action of block 2304 determines which alert notification is selected for display in a particular context. For instance, in FIGS. 25-27 the selection of the shape of a border 2528, 2624, or 2724 of the alert notifications can be selected according to the action, indication of the action, or data input from a particular user. In the example of FIG. 25, the name "Eddie" entered in data field 2504 is a keyword identifying an external user. Thus, the act of inputting the name "Eddie" in field 2504 can cause alert notification 2524 to be generated and displayed in a particular form. In FIG. 26, whether or not the keyword "Eddie" entered in comment field 2612 is identified, the mention of "ABC News" in subject field 2608 triggers the selection, generation, and display of alert notification content 2622, "Don't share ABC News deal with external users." In this case, the content 2622 of the alert notification as well as the generation and display of the alert notification can be dependent on the content or type of data entered in any of various fields 2604, 2608, and/or 2612. In FIG. 27, the entering of the @ symbol in comment field 2708 immediately followed by a user's name can cause the one or more computing devices performing method 2300 to search and identify Paul ExternalUser as an external user who will receive the commentary entered in field 2708 as a directed public message, as described above. Thus, the entering of the @ symbol followed by the name of the external user can cause alert notification 2716 to have customized content 2720 including the word, "Paul".

Various characters, symbols, words, phrases, and categories of data provided in any of the various fields and components of FIGS. 25-27 can be used as criteria to select, generate, and display particular customized alert notification formats and content to users, depending on the particular implementation. Customizable alert notifications can enforce certain rules about which users and groups of users should be permitted to view or otherwise access certain messages and other input data generated by users in the online social network. Such rules can enforce the confidentiality of certain topics, such as the ABC News deal of FIG. 26 or other various sensitive or proprietary topics which should not be shared with external users. The content of various alert notifications can be customized to warn users to not post about certain designated keywords, subjects, or other topics. That is, in one example, such as alert notification 2620 of FIG. 26, the message can be customized to warn the user to not post about the designated subject, keyword, or topic. Various keywords, subjects, and topics can be identified in the system so that any input data received from a user is automatically filtered to identify such terms to trigger an appropriate alert notification. The same automatic identification filtering of input data can be applied to the names and content of attached files, using the same principles. In some implementations, only when the designated keywords, subjects, or topics are identified is an appropriate alert notification generated and displayed.

Returning to FIG. 23, when an appropriate alert notification format and/or content is selected or generated in block 2320, method 2300 proceeds to block 2322 in which an instruction to display the alert notification at the computing device is provided, as generally described above with respect to block 2220. In some implementations, the display of an alert notification can be temporary. For instance, in block 2324, the one or more computing devices performing method 2300 can monitor whether the action or indication of the action of block 2304 has stopped or been suspended for some designated period of time. For instance, if no user input has been received for two minutes or some other designated time since the action first occurred, such can be an indication that an alert notification is no longer necessary. In some implementations, when the action has not stopped or has not been suspended, block 2324 repeats. When the action has stopped or has been suspended for the designated time period, in block 2328, an instruction is provided to stop displaying the alert notification at the computing device.

FIG. 24 shows a flowchart of an example of a method 2400 for providing alerts in an online social network, according to some implementations. In FIG. 24, in block 2404, an indication of an action associated with providing data to a recipient user of the online social network is received at a computing device, as generally described above in blocks 2204 and 2304. Here, in the context of method 2400, the input data identifies a designated recipient user of the online social network. For example, a private message generated in private message window 2600 of FIG. 26 is to be provided to one or more specified recipients in To field 2604. In another example, the @mention of Paul ExternalUser in comment field 2708 of post 2700 of FIG. 27 indicates that Paul is the intended recipient user of the commentary entered in field 2708.

In block 2408, it is determined whether any intended recipient users identified in block 2404, for instance, by name, user ID, or login, such as Eddie ExternalUser or Paul ExternalUser of FIGS. 26 and 27, are external users. In some examples, various attributes of the identified intended recipients can be checked to make the determination of block 2408. A suitable list of user IDs with a column providing a bit to indicate whether the particular user is internal or external can be maintained in a database accessible by the one or more computing devices performing method 2400. In some other examples, such an attribute can be stored in the user profile and checked when a user name, ID, or login is input in an appropriate field, such as the data entry fields of FIGS. 26 and 27. For example, in FIG. 26, there can be an on-the-fly check of whether any of the identified recipients in the To field 2604 are external customers.

In block 2408, if no identified intended recipients are external users, the method 2400 stops in block 2416. Returning to block 2408, if one or more recipients are identified as external users, the method proceeds to block 2420, in which an instruction to display an appropriate alert notification is provided at the computing device. For example, a customized alert notification 2716 in FIG. 27 can be generated and displayed, warning that the particular intended recipient, Paul, identified in comment field 2708 is an external user.

The specific details of the specific aspects of implementations disclosed herein may be combined in any suitable manner without departing from the spirit and scope of the disclosed implementations. However, other implementations may be directed to specific implementations relating to each individual aspect, or specific combinations of these individual aspects.

While the disclosed examples are often described herein with reference to an implementation in which an on-demand database service environment is implemented in a system having an application server providing a front end for an on-demand database service capable of supporting multiple tenants, the present implementations are not limited to multi-tenant databases nor deployment on application servers. Implementations may be practiced using other database architectures, i.e., ORACLE®, DB2® by IBM and the like without departing from the scope of the implementations claimed.

It should be understood that some of the disclosed implementations can be embodied in the form of control logic using hardware and/or using computer software in a modular or integrated manner. Other ways and/or methods are possible using hardware and a combination of hardware and software.

Any of the software components or functions described in this application may be implemented as software code to be executed by a processor using any suitable computer language such as, for example, Java, C++ or Perl using, for example, conventional or object-oriented techniques. The software code may be stored as a series of instructions or commands on a computer-readable medium for storage and/or transmission, suitable media include random access memory (RAM), a read only memory (ROM), a magnetic medium such as a hard-drive or a floppy disk, or an optical medium such as a compact disk (CD) or DVD (digital versatile disk), flash memory, and the like. The computer-readable medium may be any combination of such storage or transmission devices. Computer-readable media encoded with the software/program code may be packaged with a compatible device or provided separately from other devices (e.g., via Internet download). Any such computer-readable medium may reside on or within a single computing device or an entire computer system, and may be among other computer-readable media within a system or network. A computer system, or other computing device, may include a monitor, printer, or other suitable display for providing any of the results mentioned herein to a user.

While various implementations have been described herein, it should be understood that they have been presented by way of example only, and not limitation. Thus, the breadth and scope of the present application should not be limited by any of the implementations described herein, but should be defined only in accordance with the following and later-submitted claims and their equivalents.

What is claimed is:

1. A computer implemented method for providing access to an online social network, the method comprising:

receiving a request message from a requesting user to access social network data of the online social network, the online social network being specific to an organization having a group of a plurality of groups, the group including a plurality of internal users of the organization and at least one external users of the organization, the requested social network data being associated with the group and being fully accessible only to internal users of the organization that are members of the group and partially accessible to authorized external users of the organization that are members of the group;

determining that the requesting user is an external user of the organization;

determining that the requesting external user of the organization has an authorized status as an external member of the group of the plurality of groups in response to the determination that the requesting user is an external user of the organization;

identifying a portion of the requested social network data flagged by one of the plurality of internal users as being available for the external member of the group, the requested social network data further comprising data that is not flagged by one of the plurality of internal users as being available for the external member of the group such that the requesting external member, in response to the request to access the social network data, can access social network data that is flagged and cannot access social network data that is not flagged; and providing access to only the identified flagged portion of the requested social network data to the authorized requesting external member of the group and blocking access to the social network data that is not flagged;

providing a message received from the authorized external member as an information update for inclusion in an information feed; and changing the status of the requesting external member of the group from authorized to unauthorized after expiration of a time period or occurrence of an event.

2. The method of claim 1, wherein determining that the requesting external member of the group has an authorized status includes:

identifying the requesting external member of the group as an external member of one or more groups of the organization.

3. The method of claim 2, wherein providing access to the portion of the social network data includes:

providing access to one or more pages of the one or more groups.

4. The method of claim 1, wherein providing access to the portion of the social network data includes:

providing the portion of the social network data in an external user presentation capable of being displayed on a display device.

5. The method of claim 1, wherein providing access to the portion of the social network data includes:

providing access to the portion of the social network data to a user system associated with the requesting external member of the group over a data network.

6. The method of claim 1, wherein:

the social network data includes exposed data and private data, the exposed data being flagged as available for external users, and the portion of the social network data includes the exposed data and excludes the private data.

7. The method of claim 1, further comprising:

identifying the portion of the social network data as accessible based on a license of the requesting external member of the group.

8. The method of claim 1, further comprising:

receiving a request message from the internal users; and providing access to the social network data to the internal users.

9. The method of claim 8, wherein providing access to the social network data to the internal users includes:

providing the social network data in an internal user presentation capable of being displayed on a display device.

10. The method of claim 1, wherein the social network data includes an information feed.

11. The method of claim 1, wherein the social network data includes one or more files.

12. The method of claim 1, wherein the social network data includes one or more records.

13. The method of claim 10, wherein the one or more records includes one or more of: a case, an account, an opportunity, a lead, and a contact.

14. The method of claim 1, wherein the social network data includes one or more user profiles.

15. The method of claim 1, wherein the social network data includes group data, and the portion of the social network data includes one or more of: a group photo, a group name, a group description, a group feed, a group information update, a group record, a group file, and a group user name.

16. The method of claim 1, wherein the online social network is specific to a plurality of organizations.

17. One or more computing devices for providing access to an online social network, the one or more computing devices comprising:

one or more processors operable to execute one or more instructions to:

receive a request message from a requesting user to access social network data of the online social network, the online social network being specific to an organization having a group of a plurality of groups, the group including a plurality of internal users of the organization and at least one external users of the organization, the requested social network data being associated with the group and being fully accessible only to internal users of the organization that are members of the group and partially accessible to authorized external users of the organization that are members of the group;

determining that the requesting user is an external user of the organization;

determine that the requesting external user of the organization has an authorized status as an external member of the group in response to the determination that the requesting user is an external user of the organization;

identify a portion of the requested social network data flagged by one of the plurality of internal users as being available for the external member of the group, the requested social network data further comprising data that is not flagged by one of the plurality of internal users as being available for the external member of the group such that the requesting external member, in response to the request to access the social network data, can access social network data that is flagged and cannot access social network data that is not flagged; and provide access to only the identified flagged portion of the requested social network data to the authorized requesting external member of the group and blocking access to the social network data that is not flagged;

provide a message received from the authorized external member as an information update for inclusion in an information feed; and change the status of the requesting external member of the group from authorized to unauthorized after expiration of a time period or occurrence of an event.

18. The one or more computing devices of claim 15, wherein determining that the requesting external user has an authorized status includes:

identifying the requesting external member of the group as an external member of one or more groups of the organization.

19. The one or more computing devices of claim 16, wherein providing access to the portion of the social network data includes:
provideng access to one or more pages of the one or more groups.

20. The one or more computing devices of claim 15, wherein providing access to the portion of the social network data includes:
providing the portion of the social network data in an external user presentation capable of being displayed on a display device.

21. The one or more computing devices of claim 15, wherein:
the social network data includes exposed data and private data, and
the portion of the social network data includes the exposed data and excludes the private data.

22. A non-transitory tangible computer-readable storage medium storing instructions executable by a computing device to perform a method for providing access to an online social network, the method comprising:
receive a request message from a requesting user to access social network data of the online social network, the online social network being specific to an organization having a group of a plurality of groups, the group including a plurality of internal users of the organization and at least one external users of the organization, the requested social network data being associated with the group and being fully accessible only to internal users of the organization that are members of the group and partially accessible to authorized external users of the organization that are members of the group;
determine that the requesting user is an external user of the organization;
determine that the requesting external user of the organization has an authorized status as an external member of the group in response to the determination that the requesting user is an external user of the organization;
identify a portion of the requested social network data flagged by one of the plurality of internal users as being available for the external member of the group, the requested social network data further comprising data that is not flagged by one of the plurality of internal users as being available for the external member of the group such that the requesting external member, in response to the request to access the social network data, can access social network data that is flagged and cannot access social network data that is not flagged; and
provide access to only the identified flagged portion of the requested social network data to the authorized requesting external member of the group and blocking access to the social network data that is not flagged;
provide a message received from the authorized external member as an information update for inclusion in an information feed; and
change the status of the requesting external member of the group from authorized to unauthorized after expiration of a time period or occurrence of an event.

23. The non-transitory tangible computer-readable storage medium of claim 20, wherein determining that the requesting external member of the group has an authorized status includes:
identifying the requesting external member of the group as an external member of one or more groups of the organization.

24. The non-transitory tangible computer-readable storage medium of claim 21, wherein providing access to the portion of the social network data includes:
providing access to one or more pages of the one or more groups.

25. The non-transitory tangible computer-readable storage medium of claim 20, wherein providing access to the portion of the social network data includes:
providing the portion of the social network data in an external user presentation capable of being displayed on a display device.

26. The non-transitory tangible computer-readable storage medium of claim 20, wherein:
the social network data includes exposed data and private data, the exposed data being flagged as available for external users, and
the portion of the social network data includes the exposed data and excludes the private data.

* * * * *